(12) United States Patent
Maeda

(10) Patent No.: US 8,322,204 B2
(45) Date of Patent: Dec. 4, 2012

(54) UNBALANCE CORRECTION DEVICE OF HIGH SPEED ROTARY APPARATUS

(75) Inventor: Osamu Maeda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 525 days.

(21) Appl. No.: 12/667,056

(22) PCT Filed: Jun. 18, 2008

(86) PCT No.: PCT/JP2008/061509
§ 371 (c)(1),
(2), (4) Date: Dec. 29, 2009

(87) PCT Pub. No.: WO2009/011208
PCT Pub. Date: Jan. 22, 2009

(65) Prior Publication Data
US 2010/0191380 A1    Jul. 29, 2010

(30) Foreign Application Priority Data

Jul. 19, 2007  (JP) .................................. 2007-188553

(51) Int. Cl.
*G01M 15/02* (2006.01)
(52) U.S. Cl. ....................................... 73/116.04; 73/460
(58) Field of Classification Search ......... 73/66, 114.77, 73/116.02, 116.03, 116.04, 455, 460
See application file for complete search history.

(56) References Cited

U.S. PATENT DOCUMENTS

| | | | | |
|---|---|---|---|---|
| 4,716,761 A | * | 1/1988 | Ito et al. ..................... | 73/114.77 |
| 4,976,147 A | * | 12/1990 | Okochi et al. ................. | 73/455 |
| 2003/0230142 A1 | * | 12/2003 | Tamura et al. ................. | 73/462 |
| 2006/0010976 A1 | * | 1/2006 | Kyogoku ........................ | 73/468 |

FOREIGN PATENT DOCUMENTS

| | | |
|---|---|---|
| DE | 103 05 714 A1 | 8/2004 |
| JP | 50-26316 | 8/1975 |
| JP | 5-19611 | 3/1993 |
| JP | 5-162524 | 6/1993 |
| JP | 2598406 | 6/1999 |
| JP | 2002-39904 | 2/2002 |
| JP | 2005-96746 | 4/2005 |
| JP | 2007-132928 | 5/2007 |
| WO | WO 2009/004956 A1 | 1/2009 |

* cited by examiner

*Primary Examiner* — Eric S McCall
(74) *Attorney, Agent, or Firm* — Finnegan, Henderson, Farabow, Garrett & Dunner, LLP

(57) ABSTRACT

An unbalance correction device of a high speed rotary apparatus which can prevent the lowering of productivity in the production line of a high speed rotary apparatus while reducing variation in the posture of a workpiece supported by a jig and suppressing vibration of a member (clamp member) for securing the workpiece to the jig, and can enhance the precision of unbalance correction. The unbalance correction device (1) of a high speed rotary apparatus includes a plurality of claw structures (10) (clamp members) for fixing, by clamping, a workpiece (20) to a turbine housing section (3); a cylinder mechanism (30) for moving and energizing the claw structures (10), a solenoid valve (35) for adjusting the moving amount and energizing force of the claw structure (10) by the cylinder mechanism (30); a position sensor (37) for detecting the position of the claw structure (10); and posture control means for controlling each solenoid valve (35) such that the position shift of the claw structure (10) detected by the position sensor (37) becomes smaller than its acceptable value.

5 Claims, 18 Drawing Sheets

F I G. 2
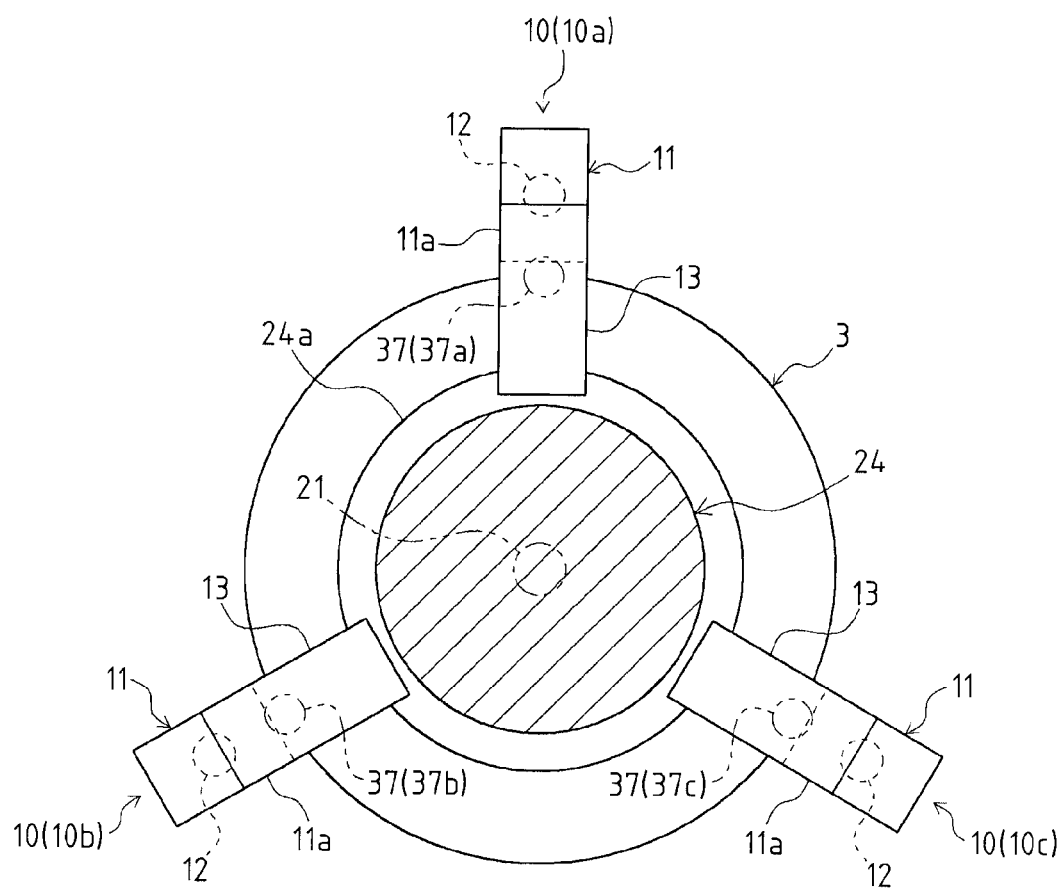

(a)

(b)

(a)

(b)

(c)

(a)

(b)

(c)

(d)

UNBALANCE CORRECTION DEVICE OF HIGH SPEED ROTARY APPARATUS

FIELD OF THE INVENTION

The present invention relates to a device for correcting an unbalance of a high-speed rotary apparatus used for correcting the unbalance of a rotating portion thereof, with reference to the high-speed rotary apparatus having the rotating portion that rotates at relatively high speed, such as a turbocharger provided with, for example, an automobile engine.

RELATED ART

In a high-speed rotary apparatus having a rotating portion which rotates at relatively high speed, when residual unbalance in the rotating portion thereof (unbalance remaining after machining or assembling components of the rotating portion) is large, the rotating portion fluctuates too much with rotation thereof, so that troubles such as fluctuation of a housing around the rotating portion or a corresponding noise may be caused. As an example of such high-speed rotary apparatus, there is a turbocharger provided with an automobile engine. In the turbocharger, for example, the rotation number of the rotating portion thereof may amount to 150,000 rpm or more. Thus, when the residual unbalance of the rotating portion in the turbocharger is large, phenomenon such as burn-in of bearing at a bearing portion supporting the rotating portion may be generated, besides the above-mentioned troubles, due to the too much fluctuation of the rotating portion.

In this regard, for example, in the turbocharger, a mechanism for generating the troubles due to the unbalance in the high-speed rotary apparatus will be described, with reference to FIG. 17.

A turbocharger 102 includes a rotating portion. The rotating portion has a rotating shaft 121, a turbine rotor 122 provided on one end (on the left end in FIG. 17) of the rotating shaft 121, a compressor rotor 123 provided on the other end (the right end in FIG. 17) of the rotating shaft 121. In other words, the rotating portion in the turbocharger 102 is a rotating body comprising of the rotating shaft 121, the turbine rotor 122 and the compressor rotor 123, which integrally rotate.

The rotating shaft 121 is rotatably supported on a center housing 124. The rotating shaft 121 is supported via two bearings 125 provided on the center housing 124. In other words, the bearings 125 are interposed between the rotating shaft 121 and the center housing 124. The turbine rotor 122 is incorporated into a turbine housing 126 attached to one side (the left side in FIG. 17) of the center housing 124. Incidentally, although not shown in the figure, when the turbocharger 102 is actually used as a product, the compressor rotor 123 is incorporated into a compressor housing mounted on the other side (the right side in FIG. 17) of the center housing 124.

Due to the turbocharger 102 including the above-described construction, the exhaust air from the engine is recovered and compressed, so that it is supplied to the engine as an intake air once again. Briefly, in the turbocharger 102, the turbine rotor 122 in the turbine housing 126 is rotated with the exhaust air from the engine. The compressor rotor 123 is rotated via the rotating shaft 121 with rotation of the turbine rotor 122. The exhaust air from the engine, which is recovered in the turbocharger 102, is compressed and supplied to the engine as the intake air once again, with rotation of the compressor rotor 123.

In the turbocharger 102 including the above-described construction, as shown in FIG. 17 (a), it would be assumed that unbalance having a mass m exists at a position of distance r from the rotating shaft line C of the rotating portion (of the rotating shaft 121) in the rotating portion, for example, due to an unbalance portion 127 in the compressor rotor 123. In this case, due to the rotation of the rotating portion (the rotating body comprising of the rotating shaft 121, the turbine rotor 122 and the compressor rotor 123), the bearings 125 receive reaction forces of mr ω 2 as centrifugal forces from the rotating shaft 121 (see FIG. 17 (b)).

The reaction force that the bearings 125 received from the rotating shaft 121 is transmitted to the center housing 124 (see FIG. 17 (c)). In the center housing 124, the fluctuation is generated due to the forces received via the bearings 125. The fluctuation in the center housing 124 is transmitted to the turbine housing 126 (see FIG. 17 (d)). In this respect, in the turbocharger 102, as shown in FIG. 17 (d), the center housing 124 and the turbine housing 126 are fastened and fixed using bolts 128. Consequently, a good fluctuation transmissibility can be achieved between the center housing 124 and the turbine housing 126, so that the fluctuation generated due to the unbalance in the rotating portion as a shaking origin is easy to be transmitted to the turbine housing 126. Incidentally, the bolts 128 are threaded into the turbine housing 126 via a flange portion 124a formed on the end portion of the center housing 124. Accordingly, the noise in the turbocharger 102 is generated due to the fluctuation of the turbine housing 126 accompanying the rotation of the rotating portion.

Thus, in the turbocharger 102, the trouble as the noise with the fluctuation of the turbine housing 126 is caused, due to the unbalance of the rotating portion.

The fluctuation in the turbine housing 126 has a high correlation with the noise in the vehicle such as the automobile equipped with the engine having the turbocharger 102. For this reason, reducing the fluctuation in the turbine housing 126 is defined as an intermediate characteristic on lowering the noise in the turbocharger 102. Specifically, in the turbocharger 102, the unbalance in the rotating portion is corrected, and the fluctuation in the turbine housing 126 is restrained, so that the noise generated in the turbocharger 102 is reduced.

In this regard, in the high-speed rotary apparatus such as the turbocharger, the correction for the unbalance in the rotating portion is performed, so as to prevent the trouble due to the residual unbalance in the rotating portion (for example, see JP2002-39904). An example of the unbalance correction, for example, in case of the aforementioned turbocharger 102 as the high-speed rotary apparatus will be described, with reference to FIG. 18.

An unbalance correction device is utilized for correcting the unbalance in the turbocharger 102. In the unbalance correction device, a turbine housing portion 103 is provided on a mounting having vibration-proofing support or the like, as a jig supporting the turbocharger 102. The turbine housing portion 103 is comprised of the member corresponding to the turbine housing 126 (see FIG. 17) in the turbocharger 102 as a product. The construction, (hereinafter, referred to as "a work 120") including the rotating portion (the rotating body comprising of the rotating shaft 121, the turbine rotor 122 and the compressor rotor 123) in the turbocharger 102, as well as the center housing 124, is attached to the turbine housing portion 103. When the work 120 is attached to the turbine housing portion 103, the center housing 124 is fixed at the turbine housing portion 103. The unbalance correction device is provided at the given position thereof (for example, at the turbine housing portion 103) with an acceleration pickup as a fluctuation detecting means.

With the work 120 attached to the turbine housing portion 103, the same air as the exhaust air from the engine (a compressed air having a pressure corresponding to the exhaust air pressure) is supplied from the air source to the turbine housing portion 103, whereby the rotating portion including the turbine rotor 122 is rotated via the rotor 122.

In case of the unbalance correction, the rotating portion of the work 120 (hereinafter, referred to as "a work rotating portion") is rotated at the predetermined rotation number (for example, 70,000 rpm, hereinafter, referred to as "an unbalance correction rotation number). In other words, the vibrational acceleration on condition that the work rotating portion rotates at the unbalance correction rotation number is detected by the acceleration pickup. The unbalance in the work rotating portion is measured, based on the value of the detected vibrational acceleration.

The unbalance in the work rotating portion is corrected, based on the measured value of the unbalance. The correction for the unbalance in the work rotating portion is performed by grinding the given portion such as a portion of a nut used for fixing the compressor rotor 123 to the rotating shaft 121 using a grinding machine, for example, in the work rotating portion.

With respect to the unbalance correction for the turbocharger 102 performed using the above-mentioned method, it is conceivable that a bolt fastening is utilized for fixing the work 120 (the center housing 124) on the turbine housing portion 103, as is the case with fixing the center housing 124 in the turbocharger 102 as the product on the turbine housing 126 (see FIG. 17 (d)).

However, fixing the work 120 to the jig (the turbine housing portion 103) for the unbalance correction in the turbocharger 102 leads to the reduction of the productivity in the production line for the turbocharger 102. Briefly, it is not preferable from the aspect of the productivity, to fix the work 120 to the jig by fastening plurality of bolts, every time the unbalance correction is performed in the production line for the turbocharger 102.

With respect to the unbalance correction for the turbocharger 102, a clamp method may be utilized for fixing the work 120 to the jig. The concrete procedure goes as follows.

As shown in FIG. 18, in the clamp method, a locking pawl 111 is used for fixing the work 120 to the turbine housing portion 103. Multiple (two in FIG. 18) locking pawls 111 are provided at specified intervals in the rotational direction of the work rotating portion. The flange portion 124a of the center housing 124 is clamped toward the turbine housing portion 103 using the locking pawls 111, so that the work 120 is fixed to the turbine housing portion 103. Specifically, the locking pawls 111 have a locking portion 113 so as to clamp the flange portion 124a of the center housing 124 toward the turbine housing portion 103. With the locking portion 113 engaged on the flange portion 124a, the locking pawls 111 is biased toward the direction clamping the flange portion 124a of the center housing 124 by the locking portion 113 (the left direction in FIG. 18), so that the center housing 124 is fixed to the turbine housing portion 103. In this regard, the locking pawls 111 are pulled via a rod portion 112 extending from one end thereof (the left side in FIG. 18), using, for example, a cylinder mechanism, so as to be biased toward the clamping direction.

As described above, the following problem is caused, in the unbalance correction device using the clamp method for fixing the work 120 to the jig.

In case of the unbalance correction, as mentioned above, the turbine housing portion 103 as the jig is used as a common jig for plurality of works 120. In the construction that the works 120 are clamped and fixed on the turbine housing portion 103, there is sometimes variability among the attitudes of the works 120 toward the turbine housing portion 103 (hereinafter, referred to as "a work attitude"), with the works 120 clamped on the turbine housing portion 103 (hereinafter, referred to as "a clamped condition").

Specifically, as shown in FIG. 18, the work 120 is supported on the surface portion in the approximately vertical direction of the turbine housing 103, on the condition that a direction of the rotating shaft line of the work rotating portion thereof becomes the approximately horizontal one (the lateral direction in FIG. 18). Therefore, in the work 120 supported on the turbine housing 103, the gravity under it's own weight works in the different direction (the downward direction in FIG. 18) from the supported direction (the left direction FIG. 18).

As exaggeratingly shown in FIG. 19, the gravity by it's own weight acting on the work 120 on the clamped condition works so that the work 120 is tilted, with the lower end portion of the flange portion 124a in the center housing 124 contacted with the turbine housing 103. When the working position is tilted, the locking position (the clamped position) of the work 120 (the flange portion 124a) by the locking portion 113 of the locking pawl 111 is changed.

Due to these action on the work 120 on the clamped condition by the gravity under it's own weight or the individual difference in the work 120, the working position on the clamped condition is varied depending on the types of the work 120. In other words, when the clamping for plurality of works 120 is randomly performed, different works 120 may change the working positions, thereby causing the variations of the working positions between plurality of works 120.

As mentioned above, when the working position is widely varied, the locking position (the clamped position) of the work 120 by the locking pawl 111 is highly variable, thereby causing the variations in the fluctuation of the work 120 itself with rotating of the work rotating portion, the largeness o the vibration transmitted to the acceleration pickup via the turbine housing 103 or the like. Briefly, the variation in the working position causes the lowering of accuracy in the unbalance correction for the work 120.

In the construction that the work 120 is clamped and fixed on the turbine housing 103, the member clamping the work 120 (the locking pawl 111) vibrates relative to the turbine housing 103 (with natural frequency different from the construction including the turbine housing 103) (see arrows X1 and X2 in FIG. 18). The vibration of the member clamping the work 120 leads to the destabilization of the clamping force, i.e., the force that the work 120 is pressed on the turbine housing 103. When the clamping force for the work 120 is instable, the work 120 clamped on multiple portions of the turbine housing 103 may be largely vibrated (see an arrow X3 in FIG. 18), and in some cases, the work 120 on the clamped condition may run wildly.

Thus, when the work 120 is largely vibrated, the accurate vibration measurement could not be performed during the unbalance correction, thereby lowering the accuracy in the unbalance correction. In other words, it is preferable that the member clamping the work 120 is prevented from vibrating with rotating the work rotating portion, so as to improve the accuracy in the unbalance correction.

It is an object of the prevent invention to provide an unbalance correction device for the high-speed rotary apparatus, which can prevent the lowering of productivity in the production line for the high-speed rotary apparatus, as well as can reduce the positional variations of the works supported by the jig and can restrain the vibration of the member for fixing the work to the jig (the clamping member), so as to improve the accuracy in the unbalance correction.

SUMMARY OF THE INVENTION

The first aspect of the present invention is a device for correcting an unbalance of a high-speed rotary apparatus, comprising a jig for supporting a work having a rotating portion and including means for detecting vibration, wherein when fixing the work to the jig where the rotating portion being rotatable, the rotating portion rotated at a given rotation number and performing an unbalance correction of the rotating portion, based on a detected value by the detecting means, the device comprising: a plurality of clamping members for clamping and fixing the work on the jig, with being biased in given directions where the work is fixed on the jig in the engaged condition where they are engaged with the work supported by the jig; a plurality of means for moving the clamping members in moving directions including the given directions and for biasing the clamping members on the engaged condition in the given directions, provided with respect to the each clamping members; a plurality of means for adjusting moving amounts of the clamping members in the moving directions by the moving and biasing means and biasing forces for the clamping members in the given directions, provided with respect to the each moving and biasing means; a plurality of means for detecting positions of the clamping members in the moving direction on the engaged condition, provided with respect to the each clamping members; and a plurality of means for controlling each of the adjusting means, such that shifting amounts of the positions in the moving direction of the clamping members, from the predetermined reference positions, on the engaged condition detected by the position detecting means, based on detected signals from the each position detecting means, become smaller than given acceptable values preliminarily determined for the shifting amounts.

Preferably, the device further comprises means for detecting displacements of the vibrations in the moving directions of the clamping members clamping the work on the jig with respect to the device body integrally constructed including the jig with the rotation of the rotating portion, provided with respect to the each clamping members; means for switching moving and biasing directions in the moving directions of the clamping members by means of the moving and biasing means, provided with respect to the each moving and biasing means; means for controlling the biasing forces biasing the clamping members by means of the moving and biasing means in the moving and biasing directions of the clamping members defined by the switching means, provided with respect to the each moving and biasing means; means for calculating excitation forces acting on the clamping members in the moving directions with the rotation of the rotating portion, based on the displacements of the clamping members detected by the displacement detecting means, as well as total mass of the clamping members, total damping of the clamping members in the moving directions and total rigidity of the clamping members in the moving directions; means for calculating damping forces acting on the clamping members in an opposite directions and the same sizes to the excitation forces calculated by the excitation force calculating means; and means for controlling the switching means and biasing force controlling means, such that the damping forces calculated by the damping force calculating means act on the clamping members.

Preferably, in the device of the present invention, the moving and biasing means is constituted as a fluid pressure cylinder mechanism using magnetic fluid as the working fluid, the device further comprising: means for detecting displacements of the vibrations in the moving directions of the clamping members clamping the work on the jig with respect to the device body integrally constructed including the jig with the rotation of the rotating portion, provided with respect to the each clamping members; means for applying magnetic field to the magnetic fluid, provided with respect to the each moving and biasing means; means for memorizing pre-calculated data for relationship between the total damping and an intensity of the magnetic field applied to the magnetic fluid by the magnetic field applying means; means for calculating the total damping of the clamping members in the moving directions, counteracting the excitation forces acting on the clamping members in the moving directions with the rotation of the rotating portion, based on the displacements of the clamping members detected by the displacement detecting means, as well as the total mass of the clamping members and the total rigidity of the clamping members in the moving directions; and means for controlling the magnetic field applying means, such that the intensity of the magnetic field applied to the magnetic fluid corresponds to the total damping calculated by the damping calculating means, based on the data memorized by the data memorizing means.

The second aspect of the present invention is a device for correcting an unbalance of a high-speed rotary apparatus, comprising a jig for supporting a work having a rotating portion and including means for detecting vibration, wherein when fixing the work to the jig where the rotating portion being rotatable, the rotating portion rotated at a given rotation number and performing an unbalance correction of the rotating portion, based on a detected value by the detecting means, the device comprising: a plurality of clamping members for clamping and fixing the work on the jig, with being biased in given directions where the work is fixed on the jig in the engaged condition where they are engaged with the work supported by the jig; a plurality of means for moving the clamping members in moving directions including the given directions and for biasing the clamping members on the engaged condition in the given directions, provided with respect to the each clamping members; means for detecting displacements of the vibrations in the moving directions of the clamping members clamping the work on the jig with respect to the device body integrally constructed including the jig with the rotation of the rotating portion, provided with respect to the each clamping members; means for switching moving and biasing directions in the moving directions of the clamping members by means of the moving and biasing means, provided with respect to the each moving and biasing means; means for controlling the biasing forces biasing the clamping members by means of the moving and biasing means in the moving and biasing directions of the clamping members defined by the switching means, provided with respect to the each moving and biasing means; means for calculating excitation forces acting on the clamping members in the moving directions with the rotation of the rotating portion, based on the displacements of the clamping members detected by the displacement detecting means, as well as total mass of the clamping members, total damping of the clamping members in the moving directions and total rigidity of the clamping members in the moving directions; means for calculating damping forces acting on the clamping members in an opposite directions and the same sizes to the excitation forces calculated by the excitation force calculating means; and means for controlling the switching means and biasing force controlling means, such that the damping forces calculated by the damping force calculating means act on the clamping members.

The third aspect of the present invention is a device for correcting an unbalance of a high-speed rotary apparatus, comprising a jig for supporting a work having a rotating portion and including means for detecting vibration, wherein when fixing the work to the jig where the rotating portion being rotatable, the rotating portion rotated at a given rotation number and performing an unbalance correction of the rotating portion, based on a detected value by the detecting means, the device comprising: a plurality of clamping members for clamping and fixing the work on the jig, with being biased in given directions where the work is fixed on the jig in the engaged condition where they are engaged with the work supported by the jig; a plurality of means for moving the clamping members constituted as a fluid pressure cylinder mechanism using magnetic fluid as the working fluid in moving directions including the given directions and for biasing the clamping members on the engaged condition in the given directions, provided with respect to the each clamping members; means for detecting displacements of the vibrations in the moving directions of the clamping members clamping the work on the jig with respect to the device body integrally constructed including the jig with the rotation of the rotating portion, provided with respect to the each clamping members; means for applying magnetic field to the magnetic fluid, provided with respect to the each moving and biasing means; means for memorizing pre-calculated data for relationship between the total damping and an intensity of the magnetic field applied to the magnetic fluid by the magnetic field applying means; means for calculating the total damping of the clamping members in the moving directions, counteracting the excitation forces acting on the clamping members in the moving directions with the rotation of the rotating portion, based on the displacements of the clamping members detected by the displacement detecting means, as well as the total mass of the clamping members and the total rigidity of the clamping members in the moving directions; and means for controlling the magnetic field applying means, such that the intensity of the magnetic field applied to the magnetic fluid corresponds to the total damping calculated by the damping calculating means, based on the data memorized by the data memorizing means.

According to the present invention, the reduction in productivity the reduction of the productivity in the production line of the high-speed rotary apparatus can be prevented, and the variations in the attitudes of the work supported on the jig can be reduced, as well as, the fluctuation of the member (the clamping member) so as to fix the work to the jig can be restrained, thereby improving the accuracy of the unbalance correction.

BRIEF DESCRIPTION OF THE DRAWINGS

FIG. 2 is a cross-sectional view of FIG. 1 along the line A-A.

DETAILED DESCRIPTION OF THE INVENTION

An unbalance correction device for a high-speed rotary apparatus according to the present invention is utilized, in the high-speed rotary apparatus having a rotating portion which relatively rotates at high speed, such as a turbocharger provided with an automobile engine, for correcting the unbalance in the rotating portion thereof.

Specifically, in the unbalance correction device for the high-speed rotary apparatus, the rotating portion of the high-speed rotary apparatus is rotated at the given rotation number and the vibration acceleration with rotation of the rotating portion thereof is measured. The unbalance in the rotating portion is measured, based on the measured vibration acceleration. The unbalance in the rotating portion of the high-speed rotary apparatus is corrected, based on the measured value of the unbalance.

The first embodiment of the unbalance correction device for the high-speed rotary apparatus according to the present invention (hereinafter, simply referred to as "the unbalance correction device" will be described with reference to FIGS. 1 and 2. Incidentally, in the present embodiment, the high-speed rotary apparatus that the unbalance is corrected by using the unbalance correction device is defined as the turbocharger provided with the automobile engine.

Figure 1:
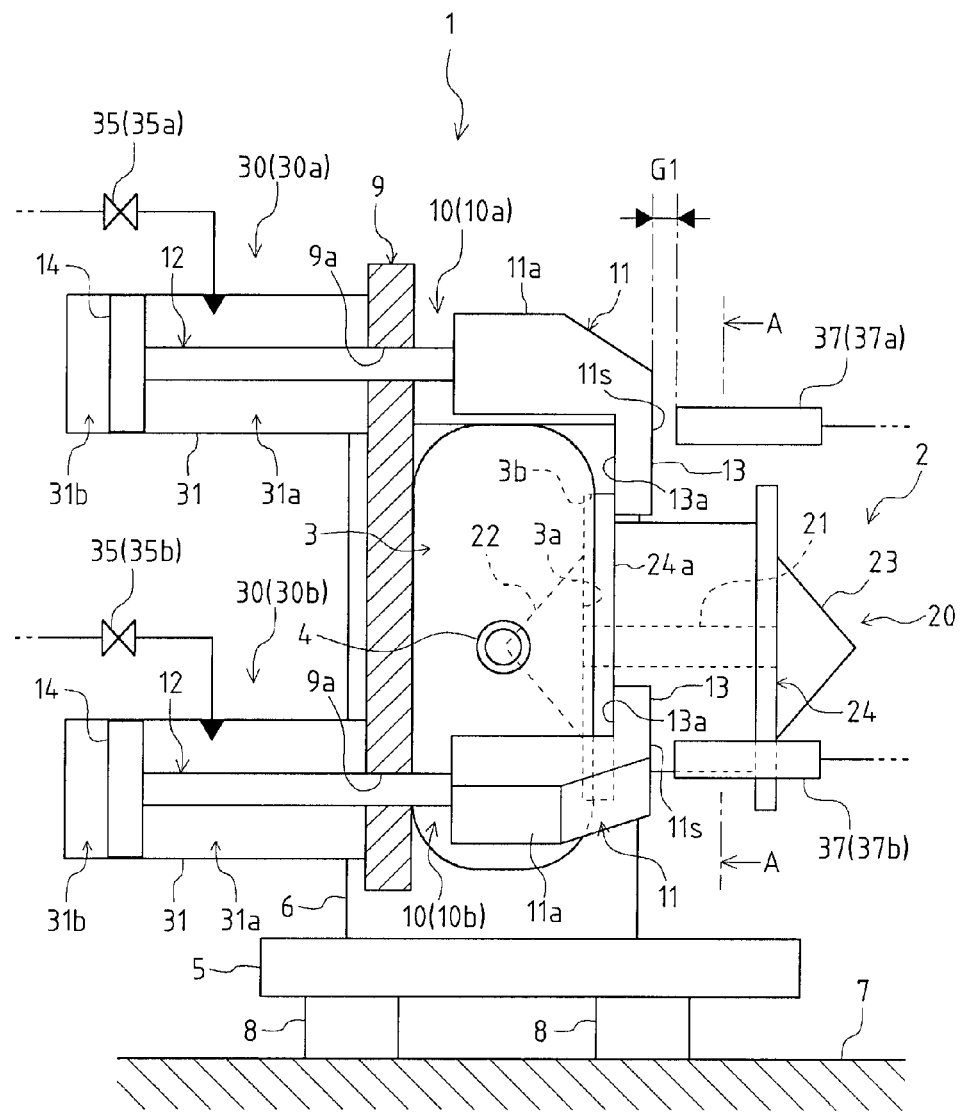
FIG. 1 is a diagram of an entire construction of an unbalance correction device according to the first embodiment of the present invention.

As shown in FIG. 1, an unbalance correction device 1 of the present embodiment is used for correcting the unbalance correction of a turbocharger 2.

The turbocharger 2 includes a rotating portion. In the present embodiment, the rotating portion in the turbocharger 2 has a rotating shaft 21, a turbine rotor 22 provided on one end (on the left end in FIG. 1) of the rotating shaft 21 and a compressor rotor 23 on the other end (on the right end in FIG. 1) of the rotating shaft 21. In other words, in the present embodiment, the rotating portion in the turbocharger 2 is constituted as a rotating body comprising of the rotating shaft 21, the turbine rotor 22 and the compressor rotor 23, which they integrally rotates.

The rotating shaft 21 is rotatably supported on a center housing 24 that is approximately cylindrically constructed as a whole. The rotating shaft 21 is supported via a bearing (not shown) on the center housing 24.

When the turbocharger 2 is used as an actual product, the turbine rotor 22 is incorporated into a turbine housing attached to one side (the left side in FIG. 1) of the center housing 24. Similarly, when the turbocharger 2 is used as the actual product, the compressor rotor 23 is incorporated into a compressor housing attached to the other side (the right side in FIG. 1) of the center housing 24.

Due to the turbocharger 2 including the above-described construction, the exhaust air from the engine is recovered and compressed, so that it is supplied to the engine as an intake air once again. Briefly, in the turbocharger 2, the turbine rotor 22 in the turbine housing is rotated with the exhaust air from the engine. The compressor rotor 23 in the compressor housing is rotated via the rotating shaft 21 with rotation of the turbine rotor 22. The exhaust air from the engine, which is recovered in the turbocharger 2, is compressed and supplied to the engine as the intake air once again, with rotation of the compressor rotor 23.

In the turbocharger 2, the construction including the rotating portion thereof and the center housing 24 is formed as a work 20 in the unbalance correction device 1. In other words, the center housing 24, which rotatably supports the rotating portion having the rotating shaft 21, the turbine rotor 22 and the compressor rotor 23, becomes the work 20 in the unbalance correction device 1. Therefore, the work 20 becomes the turbocharger 2 on the partially assembled condition. The unbalance in the rotating portion of the work 20 is corrected, during the unbalance correction for the turbocharger 2.

Hereinafter, the rotating portion in the turbocharger 2, i.e., the rotating body comprising of the rotating shaft 21, the turbine rotor 22 and the compressor rotor 23 is also referred to as "the work rotating portion".

The unbalance correction device 1 of the present embodiment supports the work 20 having the rotating portion and has a turbine housing portion 3, as a jig having an acceleration pickup 4 as a vibration detecting means.

The turbine housing portion 3 is made up of the same member as the turbine housing incorporating the turbine rotor 22 in the turbocharger 2 as the product as described previously. The turbine housing portion 3 is used as a common jig for plurality of works 20 that the unbalance correction is performed by the unbalance correction device 1. Therefore, in the unbalance correction device 1, the center housing 24 is supported on the turbine housing portion 3, so that the work 20 is supported on the turbine housing portion 3.

The turbine housing portion 3 is provided at the predetermined position on a trestle 5. In the present embodiment, the turbine housing portion 3 is provided on the condition that a direction of the rotating shaft line of the rotating portion in the work 20, which the turbine housing portion 3 supports, becomes the approximately horizontal one. Therefore, the work 20, which is supported by the turbine housing portion 3, is disposed so that the direction of the rotating shaft line of the rotating portion thereof becomes the approximately horizontal one (the lateral direction in FIG. 1). The turbine housing portion 3 is supported and fixed at the predefined position on a supporting wall 6 which is vertically provided on the trestle 5, whereby it is provided at the given position on the trestle 5

The trestle 5 is provided so that it is prevented from vibrating and supported via a rubber mount 8 on a floor surface 7. The acceleration pickup 4 is provided at the given position on the turbine housing portion 3. The acceleration pickup 4 is comprised of an acceleration sensor or the like and detects (picks up) the vibration acceleration at the given position of the turbine housing 3. The unbalance in the work rotating portion is measured, based on the value of the vibration acceleration detected by the acceleration pickup 4

In other words, the acceleration pickup 4 is connected to an arithmetic device (not shown), and a detection signal output from the acceleration pickup 4 is input into the arithmetic device. In the arithmetic device, measuring the unbalance and calculation for correcting it in the work 20 is performed.

In the unbalance correction device 1, the work 20 is fixed on the turbine housing portion 3, with the work rotating portion rotatable, and the work rotating portion is rotated at the predefined rotation number. The unbalance in the work rotating portion is corrected, based on the detected value by the acceleration pickup 4 with the work rotating portion rotated at the predefined rotation number.

More specifically, the unbalance correction in the unbalance correction device 1 is performed as follows.

In the unbalance correction in the unbalance correction device 1, first, the work 20 is attached to the turbine housing portion 3. In the assembly of the work 20 on the turbine housing portion 3, the center housing 24 is fixed on the turbine housing portion 3.

With the work 20 attached to the turbine housing portion 3, the same air as the exhaust air from the engine (a compressed air having a pressure corresponding to the exhaust air pressure) is supplied from the air source to the turbine housing portion 3, whereby the work rotating portion including the turbine rotor 22 is rotated via the rotor 22.

In case of the unbalance correction, the work rotating portion is rotated at the predetermined rotation number (for example, 70,000 rpm, hereinafter, referred to as "an unbalance correction rotation number). In other words, the vibrational acceleration on condition that the work rotating portion rotates at the unbalance correction rotation number is detected by the acceleration pickup 4. The unbalance in the work rotating portion is measured, based on the value of the detected vibrational acceleration.

The unbalance in the work rotating portion is corrected, based on the measured value of the unbalance. The correction for the unbalance in the work rotating portion is performed by grinding the given portion such as a portion of a nut used for fixing the compressor rotor 23 to the rotating shaft 21 using a grinding machine, for example, in the work rotating portion.

The unbalance correction device 1 used for correcting the unbalance in the turbocharger 2 as described above includes plurality of pawl structures 10 for fixing the work 20 to the turbine housing portion 3, during the unbalance correction. The pawl structure 10 is one embodiment of clamping member that clamps and fixes the work 20 on the turbine housing portion 3.

The pawl structure 10 is biased toward the predetermined direction where the work 20 is fixed on the turbine housing portion 3, on the engaged condition that it is engaged on the work 20 supported on the turbine housing portion 3 (hereinafter, referred to as "the engaged condition"), thereby clamping and fixing the work 20 on the turbine housing portion 3.

In the present embodiment, as shown in FIG. 1, the pawl structure 10 has a pawl portion 11 and a rod portion 12.

The pawl portion 11 has a locking portion 13 that locks the work 20 supported on the turbine housing portion 3. Briefly, in the present embodiment, the locking portion 13 locks the work 20, so that the pawl structure 10 is on the engaged condition. The locking portion 13 is a plate-like portion which is projected and formed on one end portion (the apical end) of a body portion 11a that is comprised in the form of approximately rectangular solid in the pawl portion 11

The rod portion 12 is extended from the side that the locking portion 13 is provided in the pawl portion 11 (on the front end side, on the right side in FIG. 1) and from the opposite side thereof (on the rear end portion, on the left side in FIG. 1). The rod portion 12 is constituted as a rod-like portion having a smaller diameter than that of the pawl portion 11.

The work 20 supported on the turbine housing portion 3 is fixed thereon by the pawl structure 10 having above-mentioned construction.

The turbine housing portion 3 has a supporting surface 3a as the surface in the approximately perpendicular direction to the rotating shaft line of the work rotating portion. The supporting surface 3a is formed as the surface of the bottom side (the back side) of a supporting recessed portion 3b formed on the side supporting the work 20 on the turbine housing portion 3. The work 20 is supported on the supporting surface 3a of the turbine housing portion 3. The center housing 24 in the work 20 is provided on one end thereof (on the side to which the turbine housing is attached) with a annular flange portion 24a. The flange portion 24a of the center housing 24 is in contact with the supporting surface 3a of the turbine housing portion 3, with the work 20 supported. In other words, the supporting recessed portion 3b in the turbine housing portion 3 has a circular geometry along the shape of the flange portion 24a of the center housing 24, and the flange portion 24a contacts the supporting surface 3a, with a part of the flange portion 24a fixed on the supporting recessed portion 3b. Under the circumstances, the flange portion 24a is pressed on the supporting surface 3a by the pawl structure 10, so that the work 20 is fixed on the turbine housing portion 3.

The pawl structure 10 presses the flange portion 24a on the supporting surface 3a of the turbine housing portion 3, with the locking portion 13 engaged on the flange portion 24a of the center housing 24. Briefly, the flange portion 24a of the center housing 24 in the work 20 works as a portion engaged on the locking portion 13 of the pawl structure 10.

In this regard, in case of pressing the flange portion 24a by the locking portion 13, as described above, the surface on one end of the locking portion 13 as the plate-like portion works as a pressing surface 13a to the flange portion 24a. In other words, the pressing surface 13a of the locking portion 13 is formed as the surface parallel to the supporting surface 3a of the turbine housing portion 3. When the work 20 is fixed on the turbine housing portion 3 by the pawl structure 10, the flange portion 24a of the center housing 24 is interposed between the supporting surface 3a of the turbine housing portion 3 and the pressing surface 13a of the locking portion 13. In this way, the pressing surface 13a contacts the flange portion 24a, so that the pawl structure 10 is on the engaged condition.

Therefore, in the unbalance correction device 1, the pawl structure 10 is provided so that the pressing surface 13a of the locking portion 13 is opposed to the flange portion 24a that contacts the supporting surface 3a of the turbine housing portion 3. In the present embodiment, in the unbalance correction device 1, the pawl structure 10 is provided so that the extending direction of the rod portion 12 is approximately parallel to the direction of the rotating shaft line of the work rotating portion. The pawl structure 10 is provided so that the projecting direction of the locking portion 13 in the pawl portion 11 from the body portion 11a is along the radial direction of the work rotating portion (the radial direction of the rotating shaft 21 or the like) (so that the projecting direction is the direction to the rotating shaft line of the work rotating portion.

The pawl structure 10 is provided so that the pressing surface 13a thereof is movable to the direction moving to or from the flange portion 24a (to the lateral direction in FIG. 1).

The pawl structure 10 is provided so that it can be biased to the direction pressing the flange portion 24a by the locking portion 13, with the pressing surface 13a contacting the flange portion 24a, i.e., with the locking portion 13 engaged on the work 20. In other words, in the present embodiment, the pawl structure 10 is provided so that it can be biased in the extending direction of the rod portion 12 from the pawl portion 11 (in the left direction in FIG. 1).

Thus, in the present embodiment, the predetermined direction where the work 20 is fixed on the turbine housing portion 3, to which the pawl structure 10 is biased is the direction where the pawl structure 10 presses the flange portion 24a by the pressing surface 13a of the locking portion 13. Hereinafter, the predetermined direction to which the pawl structure 10 is biased is defined as "the work fixing direction". The moving direction including the work fixing direction as the direction, to which the pawl structure 10 is moved (the direction moving to or from the flange portion 24a, is simply referred to as "the moving direction".

The biases of the pawl structures 10 toward the work fixing direction are performed by cylinder mechanisms 30. The cylinder mechanisms 30 are provided in each of plurality of pawl structures 10 equipped with the unbalance correction device 1 as mentioned previously. Specifically, the cylinder mechanisms 30 are provided on the respective pawl structures 10 and functions as moving and biasing means that move the pawl structures 10 to the moving direction and bias the pawl structures 10 on the engaged condition to the work fixing direction.

The cylinder mechanisms 30 are constituted as hydraulic cylinders. The cylinder mechanisms 30 have cylinder cases 31 which movably incorporate the rod portions 12 of the pawl structures 10 as cylinder rods. Specifically, the rod portions 12, which is incorporated into the cylinder cases 31 via the piston portions 14, have piston portions 14 as diameter expanding portions, and are slidably provided in the cylinder cases 31. The piston portions 14 are disposed on the side opposite to the side of the pawl portion 11 in the rod portion 12 (on the left side in FIG. 1). The piston portions 14 are plug-like portions having shapes slidable to inner walls of the cylinder cases 31.

The cylinder cases 31 are fixed and supported on cylinder plates 9. The cylinder plates 9, which are plate-like members, are fixed on the opposite sides to the sides of the supporting surfaces 3a in the turbine housing portions 3, so that the plate surfaces thereof are the surfaces approximately perpendicular to the directions of the rotating shaft lines of the work rotating portions. The cylinder cases 31 are supported on the plate surface portions on the opposite sides to the sides of the turbine housing portions 3 in the cylinder plates 9, so that the sliding directions of the rod portions 12 therein are the corresponding ones to the moving directions of the aforementioned pawl structures 10.

Incidentally, through-holes 9a are provided so as to allow the movements of the pawl structures 10 in the cylinder plates 9, with the rod portions 12 penetrating therethrough In the cylinder mechanisms 30 having the above-mentioned construction, the pressure oils having the given pressure are supplied from oil tanks via oil pumps or the like to the cylinder cases 31, in case of biasing the pawl structures 10 to the work fixing direction. The pawl structures 10 are pulled to the work fixing direction due to the given biasing forces via the piston portions 14, by adjusting the hydraulic pressure in the cylinder cases 31. In this way, the pawl structures 10 are biased to the work fixing direction due to the thrust forces in the cylinder mechanisms 30. Thus, the pawl structures 10 are biased to the work fixing direction, and the flange portions 24a, which are interposed between the pressing surfaces 13a of the locking portions 13 and the supporting surfaces 3a of the turbine housing portions 3, are pressurized so as to contact the supporting surfaces 3a by the predefined pressing forces from the locking portions 13, so that the works 20 are fixed on the turbine housing portions 3.

In this regard, the cylinder mechanisms 30 are constructed as hemi-rod typed double-acting cylinder projecting the rod portions 12 of the pawl structures 10 from one side of the cylinder cases 31. Briefly, in the cylinder mechanisms 30, cylinder chambers in the cylinder cases 31 are divided into two cylinder chambers 31a, 31b via the piston portions 14 of the rod portions 12 in the pawl structures 10. The respective cylinder chambers 31a, 31b have doorways for the oils. The doorways for the oils in the respective cylinder chambers alternately become inlets or outlets for the oils by circuit switching such as changeover valves, thereby reciprocating in the moving directions of the pawl structures 10.

Therefore, when the pressure oils are supplied in the cylinder chambers 31 on the projecting sides of the rod portions 12 (the right side in FIG. 1), the pawl structures 10 are pulled, so that the pawl structures 10 are moved to the work fixing directions and accordingly the pawl structures 10 on the engaged condition are biased to the work fixing directions. Meanwhile, when the pressure oils are supplied in cylinder chambers 31b on opposite side to the projecting sides of the rod portions 12 (the left side in FIG. 1), the pawl structures 10 are pushed outward, so that the pawl structures 10 are moved to the opposite directions to the work fixing directions and the engaged condition of the pawl structures 10 are canceled (the pawl structures 10 are biased to the opposite directions to the work fixing directions).

In the following descriptions, the cylinder chambers 31a on the sides that the pawl structures 10 are pulled due to the supplies of the pressure oils (on the projecting side of the rod portions 12) are defined as "the first cylinder chambers 31a", and the cylinder chambers 31b on the sides that the pawl structures 10 are pushed outward due to the supplies of the pressure oils are defined as "the second cylinder chambers 31b".

Incidentally, in the unbalance correction device 1 of the present embodiment, the cylinder mechanisms 30 are provided as hydraulic cylinders, but the moving and biasing means, which move the pawl structures 10 to the moving directions and bias the pawl structures 10 on the engaged condition to the work fixing directions, are not limited to the aforementioned mechanisms. In other words, another fluid pressure cylinder mechanisms such as air cylinders may be utilized as the moving and biasing means provided with the unbalance correction device according to the present invention.

As seen from the above, in the unbalance correction device 1 of the present embodiment, the pawl structures 10 press the flange portions 24a of the center housings 24 on the supporting surfaces 3a of the turbine housing portions 3, by the locking portions 13 in the pawl portions 11, thereby clamping and fixing the works 20 on the turbine housing portions 3. Therefore, in the pawl structures 10, the pawl portions 11 as the portions comprising the locking portions 13 become portions having intensities and rigidities enough for fixing the works 20 by the locking portions 13 (without damages or deformations due to the biasing by the cylinder mechanisms 30).

In the present embodiment, three pawl structures 10 are used for fixing the work 20 on the turbine housing portion 3. In other words, the unbalance correction device 1 of the present embodiment includes three pawl structures 10. The flange portions 24a of the center housing 24 is pressed at three points, whereby the work 20 is fixed on the turbine housing portion 3 (see FIG. 2).

In the unbalance correction device 1 of the present embodiment, three pawl structures 10 are provided as follows.

The annular flange portion 24a is provided at equal intervals in the circumferential direction thereof with three pawl structures 10. Thus, as shown in FIG. 2, angular intervals between (the central positions of) the respective pawl structures 10 are 120° on the circumference centered at the position of the rotating shaft line, in the directional vision of the rotating shaft line of the work rotating portion (hereinafter, referred to as "in the directional vision of the rotating shaft line").

As shown in FIG. 2, one pawl structure 10a out of three pawl structures 10 is disposed at the position where it is along the radial direction of the aforementioned work rotating portion in the circumferential direction of the flange portion 24a and the projecting direction of the locking portion 13 from the body portion 11a becomes the approximately vertical direction. Briefly, in the pawl structure 10a, the locking portion 13 thereof is engaged on the upper end portion of the flange portion 24a with reference to the floor surface 7 (see FIG. 1). Accordingly, the other two pawl structures 10b, 10c out of three pawl structures 10 provided at equal intervals in the aforementioned circumferential direction are located so that the pawl portions 11 are approximately symmetric in the circumferential direction of the flange portion 24a in the directional vision of the rotating shaft line as shown in FIG. 2 (in the directional vision of the rotating shaft line when the floor surface 7 is on the down side).

In this respect, the cylinder mechanisms 30 are provided corresponding to the respective pawl structures 10a, 10b and 10c. Three cylinder cases 31 corresponding to the respective pawl structures 10a, 10b and 10c are supported and fixed on the cylinder plate 9.

Hereinafter, when three pawl structures 10 are distinctly described based on the provided positions, the pawl structure 10a, which is disposed at the position where the projecting direction of the locking portion 13 from the body portion 11a becomes the approximately vertical direction as stated previously, is defined as "the first pawl structure 10a". In the other two pawl structures 10b, 10c out of three pawl structures 10, the pawl structure 10b at the position next to the first pawl structure 10a in the counterclockwise direction in the directional vision of the rotating shaft line as shown in FIG. 2 is defined as "the second pawl structure 10b", and the remaining pawl structure 10c (the pawl structure 10c on the right side in FIG. 2) is defined as "the third pawl structure 10c".

By the same token, when three cylinder mechanisms 30 are distinctly described based on the pawl structure 10 supported in a moving and biasing manner, the cylinder mechanism 30 supporting the first pawl structure 10a in a moving and biasing manner is defined as "the first cylinder mechanism 30a", and the cylinder mechanism 30 supporting the second pawl structure 10b in a moving and biasing manner is defined as "the second cylinder mechanism 30b", as well as the cylinder mechanism 30 supporting the third pawl structure 10c in a moving and biasing manner is defined as "the third cylinder mechanism 30c".

In the unbalance correction device 1, the respective cylinder mechanisms 30 are provided with the solenoid valves 35. In other words, the unbalance correction device 1 includes three solenoid valves 35.

The solenoid valves 35 are provided with pipings so as to supply the pressure oils to the first cylinder chambers 31a in the cylinder mechanisms 35. In other words, the pressure oils supplied from the oil tanks to the first cylinder chambers 31a of the cylinder mechanisms 30 by the oil pumps are supplied via the solenoid valves 35. Therefore, the distances of the pawl structures 10 to the work fixing directions and the biasing forces of the pawl structures 10 on the engaged condition to the work fixing directions are adjusted, by adjusting the switching or the opening degree of the solenoid valves 35, i.e., by controlling the switching of the solenoid valves 35.

Thus, the solenoid valves 35 are provided with the respective cylinder mechanisms 30 and function as clamp controlling means for controlling the distances of the pawl structures 10 to the moving directions by the cylinder mechanisms 30 and the biasing forces for biasing the pawl structures 10 to the work fixing directions.

Hereinafter, when three solenoid valves 35 are distinctly described based on the cylinder mechanisms 30 with which they are provided, the solenoid valve 35 provided with the first cylinder mechanism 30a is defined as "the first solenoid valve 35a", and the solenoid valve 35 provided with the second cylinder mechanism 30b is defined as "the second solenoid valve 35b", as well as the solenoid valve 35 provided with the third cylinder mechanism 30c is defined as "the third solenoid valve 35c".

The unbalance correction device 1 includes position sensors 37 in the respective pawl structures 10. In other words, the unbalance correction device 1 of the present embodiment includes three position sensors 37.

The position sensors 37 detect the positions of the pawl structures 10 on the engaged condition in the moving directions. The position sensors 37 are constituted as contact-free gap sensors (displacement sensors) that detect the positions (the displacements) of the pawl structures 10 to be measured in the moving directions, by detecting gaps between the pawl structures 10 in the moving directions.

In the embodiment, the position sensors 37 use apical surfaces 11s which are end faces on one ends of the pawl structures 10 in the moving directions and which are end faces of the pawl portions 11, as detection target surfaces. In other words, the position sensors 37 detect the positions (the displacements) of the pawl structures 10 in the moving directions, by detecting gaps G1 between the apical surfaces 11s of the pawl structures 10 (see FIG. 1). As the position sensors 37 which are gap sensors, for example, eddy current type sensors, capacitance type sensors, laser sensors, ultrasonic sensors or the like can be utilized.

Thus, the position sensors 37 are provided with the respective pawl structures 10 and function as position detecting means that detect the positions of the pawl structures 10 on the engaged condition in the moving directions.

Hereinafter, when three position sensors 37 are distinctly described based on the pawl structures 10 with which the they are provided, the position sensor 37 provided with the first pawl structure 10a is defined as "the first position sensor 37a", and the position sensor 37 provided with the second pawl structure 10b is defined as "the second position sensor 37b", as well as the position sensor 37 provided with the third pawl structure 10c is defined as "the third position sensor 37c".

A controlling construction for the attitude control of the work 20, in the unbalance correction device 1 of the present embodiment equipped with the above-mentioned construction, will be described with reference to FIG. 3.

Figure 3:
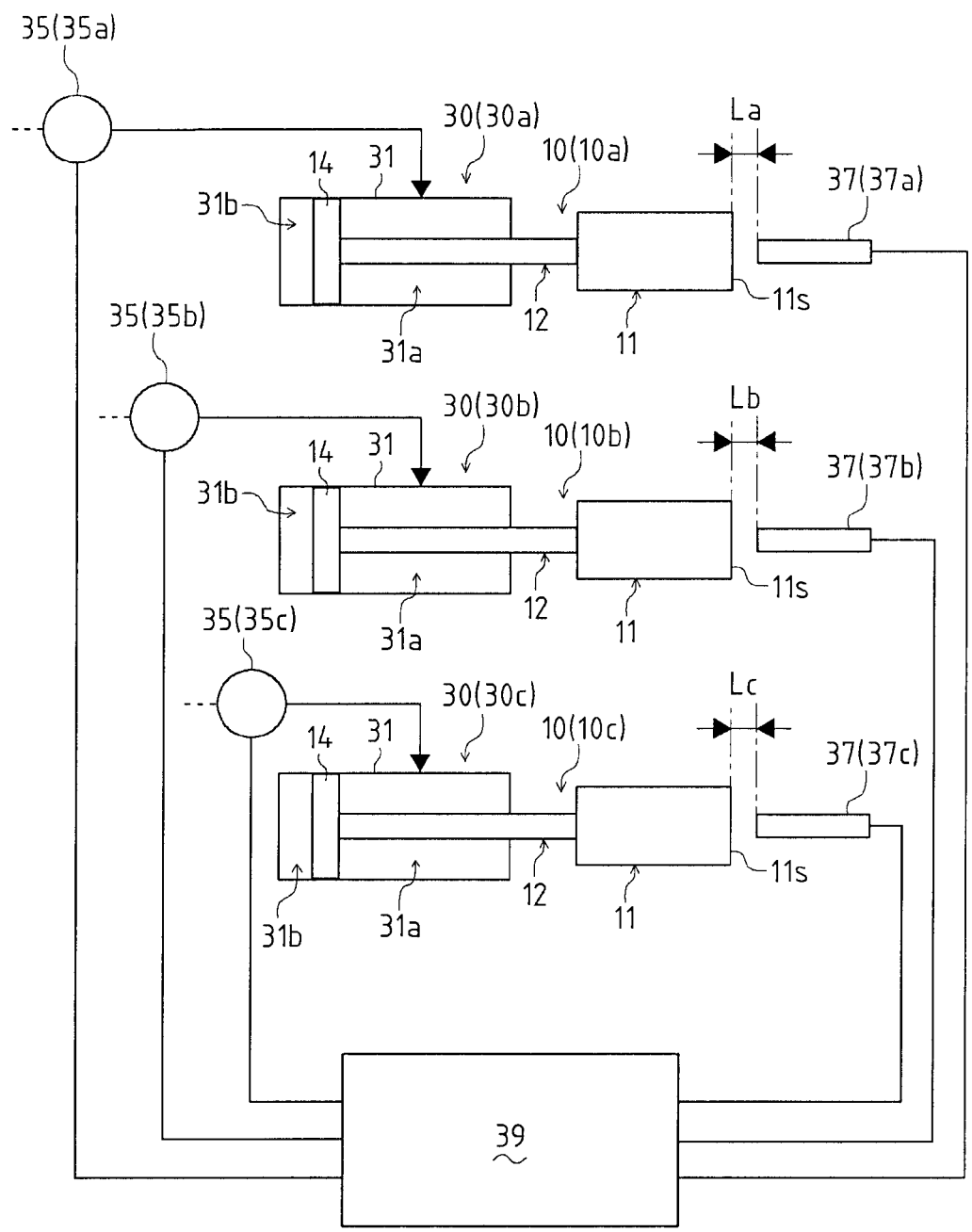
FIG. 3 is a diagram of a controlling construction on the positional control for the unbalance correction device according to the first embodiment of the present invention.

As shown in FIG. 3, the unbalance correction device 1 of the present embodiment includes a control portion 39 for performing the attitude control of the work 20. The control portion 39 controls the respective solenoid valves 35, on the basis of detection signals output from the respective position sensors 37. Accordingly, the position of the pawl structure 10 in the moving direction is controlled, and the attitude of the work 20 toward the turbine housing portion 3 is controlled.

The control portion 39 is connected to the respective solenoid valves 35 and the respective position sensors 37 via signal lines or the like. The control portion 39 issues signals so as to adjust the switching or the opening degrees of the solenoid valves 35, i.e., to perform the switching operation of the solenoid valves 35 to the respective solenoid valves 35. Accordingly, the control portion 39 performs the switching controls of the respective solenoid valves 35. The control portion 39 receives signals on the positions of the respective pawl structures 10 on the engaged condition in the moving directions, detected by the respective position sensors 37. In this way, the control portion 39 obtains information on the positions of the respective pawl structures 10 on the engaged condition in the moving directions.

The control portion 39 independently controls the respective solenoid valves 35, based on the detection signals from the respective position sensors 37. Specifically, the control portion 39 controls the first solenoid valve 35a, based on the detection signal from the first position sensor 37a, and the second solenoid valve 35b, based on the detection signal from the second position sensor 37b, as well as the third solenoid valve 35c, based on the detection signal from the third position sensor 37c. Accordingly, the positions of the respective pawl structures 10 on the engaged condition in the moving directions are independently controlled, whereby the attitude of the work 20 toward the turbine housing portion 3 is controlled.

The control portion 39 includes a storage portion which stores a program or the like, an expanding portion which expands the program or the like, a calculating portion which performs the predefined calculation according to the program or the like, a filing portion which files the calculated results or the like by calculation, a measuring portion which measures the position (the displacement) or the like of the pawl structures 10 on the engaged condition in the moving direction based on the detection signal output from the position sensor 37 and so on. The program or the like stored in the storage portion include the after-mentioned attitude control program.

As the control portion 39, specifically, the construction that a CPU, a ROM, a RAM, a HDD or the like are connected together with a bus, or the configuration making up of one-chip LSI or the like are utilized. The control portion 39 of the present embodiment, which is exclusive goods, is also substitutable for the one which the aforementioned program or the like are stored in the commercially available personal computer, workstation and so forth.

The control portion 39 controls the respective solenoid valves 35 so that the shift lengths of the positions of the pawl structures 10 on the engaged condition in the moving directions detected by the position sensors 37 from the preset reference positions are smaller than the given acceptable amounts preliminary determined for the shift lengths.

The control portion 39 controls the solenoid valve 35 by carrying out the given calculation or the like in accordance with the attitude control program stored in the storage portion as described above. In other words, in the attitude control of the work 20, the respective solenoid valves 35 are controlled by the control portion 39 based on the detection signals from the respective position sensors 37, so that the attitude of the work 20 clamped on the turbine housing portion 3 is controlled.

In the attitude control of the work 20, with reference to the positions of the pawl structures 10 on the engaged condition in the moving direction detected by the position sensors 37, the preset reference position (hereinafter, simply referred to as "the reference position" on the pawl structure 10), is determined as follows.

In the present embodiment, as mentioned previously, the position sensors 37 detect the gaps G1 between the apical surfaces 11s of the pawl structures 10 (see FIG. 1), thereby detecting the positions (the displacements) of the pawl structures 10 in the moving directions. Consequently, the reference positions of the respective pawl structures 10 are determined by the largeness of the gap G1. Specifically, the given values on the largeness of the gaps G1 between the apical surfaces 11s and the position sensors 37 are preliminary determined, in the respective pawl structures 10, whereby the reference positions of the respective pawl structures 10 are established.

Hereinafter, the reference position of the first pawl structure 10a is defined as a reference value La on the gap G1 between the first position sensor 37a and the apical surface 11s of the first pawl structure 10a (see FIG. 3). More specifically, the condition that the gap G1 between the first pawl structure 10a moving to the moving direction and the first position sensor 37a in place at the same time is the reference value La is the one that the first pawl structure 10a is at the reference position. Similarly, the reference position of the second pawl structure 10b is defined as the reference value Lb on the gap G1 between the second position sensor 37b and the apical surface 11s of the second pawl structure 10b, and the reference position of the third pawl structure 10 c is defined as the reference value Lc on the gap G1 between the third position sensor 37c and the apical surface 11s of the third pawl structure 10c (see FIG. 3).

The reference positions of the respective pawl structures 10, i.e., the respective values of the reference values, La, Lb and Lc are set up based on the prescribed reference attitude with reference to the attitude of the work 20 toward the turbine housing portion 3 (hereinafter, referred to as "the work attitude"), with the work 20 clamped on the turbine housing portion 3 (hereinafter, referred to as "the clamped condition"). In other words, the positions of the respective pawl structures 10 in the moving directions (the values of the gaps G1) are set up as the reference positions of the respective pawl structures 10 (the reference values, La, Lb and Lc), when the there are the given reference attitudes in the work attitudes on the clamped condition and the work attitudes become the given reference attitudes. Accordingly, the respective pawl structures 10 are located at the reference positions, so that the work attitudes become the given reference attitudes.

For example, the reference positions of the respective pawl structures 10 are set up as follows. Specifically, as the present embodiment, in the construction that the work 20 is supported in the turbine housing portion 3 so that the direction of the rotating shaft line of the work rotating portion is the approximately horizontal direction, the reference positions of the respective pawl structures 10 are established, so that the positions of the respective pawl structures 10 in the moving direction (the direction of the rotating shaft line of the work rotating portion) are approximately the same among three pawl structures 10.

In the attitude control of the works 20, the solenoid valves 35 are controlled in such a way that the shift lengths of the pawl structures 10 from the reference positions are smaller than the given acceptable values that are preliminarily set up. The shift lengths (the differences) of the pawl structures 10 from the reference positions are the shift lengths of the pawl structures 10 on the engaged condition from the reference values, La, Lb and Lc from the moving directions. The predetermined acceptable values are preliminarily set up, with respect to the shift lengths of the pawl structures 10 from the reference positions in the moving directions (hereinafter, simply referred to as "the shift lengths in the pawl structures 10).

Specifically, when each of the shift lengths of the respective pawl structures 10 from the reference values La, Lb and Lc are defined as $\Delta La$, $\Delta Lb$ and $\Delta Lc$, the respective solenoid valves 35 are controlled so that the values of the respective shift lengths $\Delta La$, $\Delta Lb$ and $\Delta Lc$ are smaller than the above-mentioned predetermined acceptable values, whereby the positions of the respective pawl structures 10 on the engaged condition in the moving directions are controlled. Briefly, in the attitude control of the work 20, the positions of the respective pawl structures 10 on the engaged condition in the moving directions are controlled, via the respective solenoid valves 35, so that the attitude of the work 20 clamped by three pawl structures 10 is controlled.

Consequently, when all of the predetermined acceptable values on the respective pawl structures 10 are $\Delta Lx$, each of the positions of the respective pawl structures 10 on the engaged condition in the moving directions, in the attitude control of the work 20, are allowable in the range of the reference value $La \pm \Delta Lx$, the reference value $Lb \pm \Delta Lx$ and the reference value $Lc \pm \Delta Lx$. The shift lengths of the pawl structures 10 are set up as much smaller values than the moving ranges of the pawl structures 10 in the moving directions (for example, about a few μm to a few dozens μm).

As seen from the above, the respective values used in the attitude control of the work 20, i.e., the reference values La, Lb and Lc so as to define the reference positions of the respective pawl structures 10, and the acceptable values on the shift lengths $\Delta La$, $\Delta Lb$ and $\Delta Lc$ from the respective reference values are preliminarily set up and memorized in the storage portion or the like in the control portion 39.

Figure 4:
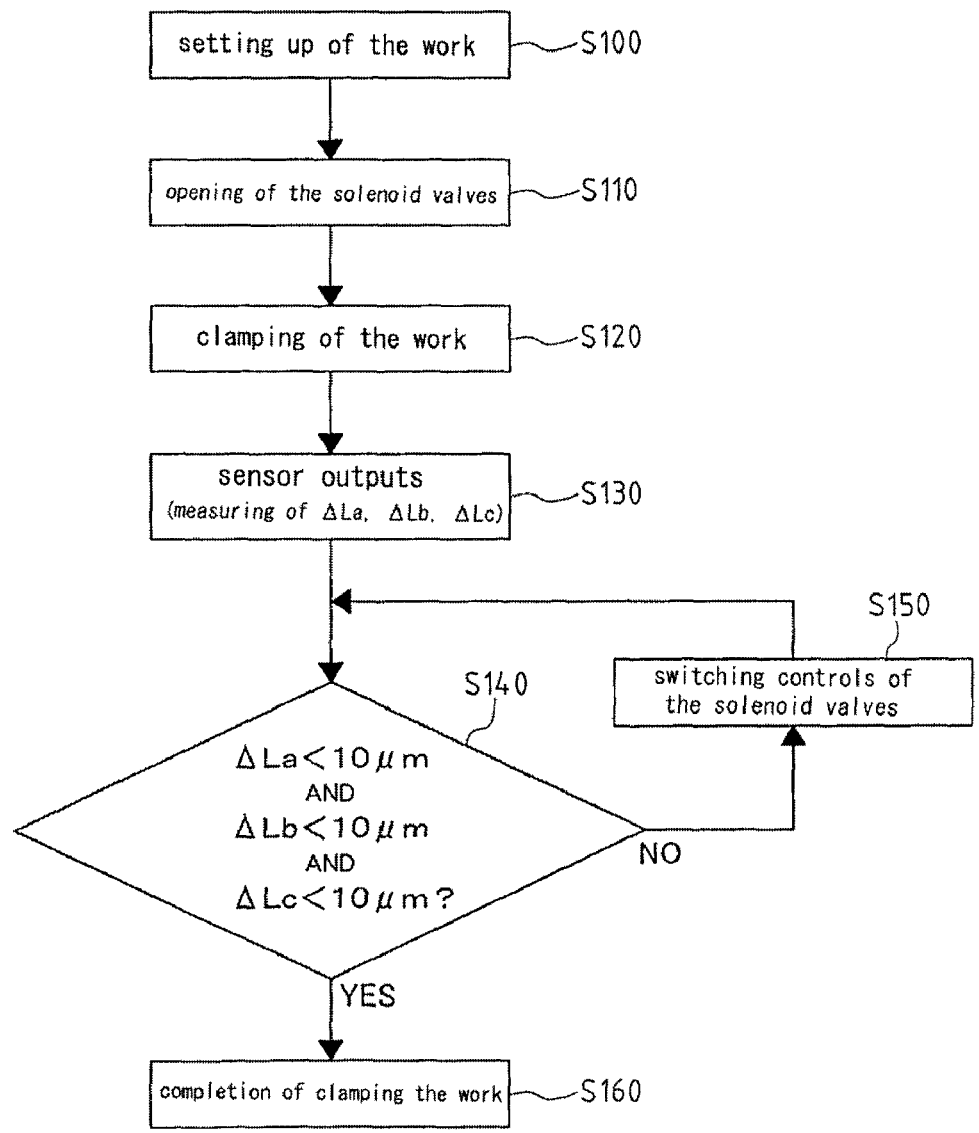
FIG. 4 is a flow diagram of the positional control for the work.

The attitude control of the work 20 will be described with reference to a flow diagram of the attitude control of the work 20 as shown in FIG. 4. Incidentally, in the attitude control of the work 20 as described below, all of the acceptable values on the shift lengths $\Delta La$, $\Delta Lb$ and $\Delta Lc$ of the respective pawl structures 10 are defined as 10 μm.

In the attitude control of the work 20, first, the work 20 is set (Step S100). More specifically, the flange portion 24a of the center housing 24 in the work 20 is fixed on the supporting recessed portion 3b forming the supporting surface 3a in the turbine housing portion 3, whereby the work 20 is supported on the supporting surface 3a. In this regard, at this stage, the pawl structures 10 are at the given waiting positions moving to the direction opposite to the work fixing direction, so as not to oppose the fixing of the work 20 on the turbine housing portion 3.

When the work 20 is set up, the solenoid valves 35 provided in each of the cylinder mechanisms 30 are opened (Step S110). Specifically, the pressure oils supplied from the oil tanks by the oil pumps are supplied to the first cylinder chambers 31a in the respective cylinder mechanisms 30 via the solenoid valves 35 on the opened conditions. Accordingly, the respective pawl structures 10 are pulled from the aforementioned given waiting positions, and are moved to the work fixing directions so as to be engaged on the set work 20.

The respective pawl structures 10 on the engaged condition are biased to the work fixing directions due to the pressure oils supplied from the first cylinder chambers 31a. Accordingly, the work 20 is on the clamped condition (Step S120). When the work 20 is on the clamped condition, the respective solenoid valves 35 are occasionally closed for the meantime. The clamped condition of the work 20 in this case is referred to as "the tentative clamped condition".

In the tentative clamped condition of the work 20, sensor outputs from the respective position sensors 37 are performed, and the shift lengths $\Delta La$, $\Delta Lb$ and $\Delta Lc$ of the respective pawl structures 10 are measured, based on the sensor outputs (Step S130). In other words, after the work 20 is on the tentative clamped condition, the largeness of the gaps G1 in the respective pawl structures 10 are measured based on the detection signals from the respective position sensors 37. The shift lengths $\Delta La$, $\Delta Lb$ and $\Delta Lc$ of the respective pawl structures 10 from the reference values La, Lb and Lc are measured, on the basis of the measurements of the gaps G1 of the respective pawl structures 10.

Subsequently, the shift lengths $\Delta La$, $\Delta Lb$ and $\Delta Lc$ of the respective pawl structures 10 measured in the Step S130 are evaluated where all of them are smaller 10 μm as the acceptable values (Step S140). In other words, the shift lengths $\Delta La$, $\Delta Lb$ and $\Delta Lc$ of the respective pawl structures 10 are evaluated whether they meet all the conditions of $\Delta la < 10$ μm, $\Delta Lb < 10$ μm, and $\Delta Lc < 10$ μm.

In the Step S140, when the shift lengths $\Delta La$, $\Delta Lb$ and $\Delta Lc$ of the respective pawl structures 10 are evaluated that all of them are smaller than 10 μm as the acceptable values, the clamped condition of the work 20 is completed (Step S160). Briefly, in this case, as the positions of the respective pawl structures 10 on the engaged condition in the moving direction are within error ranges allowed for the reference positions and the work attitude is the one within the error ranges allowed for the aforementioned given reference attitude, the clamped condition of the work 20 is completed. Accordingly, the attitude control of the work 20 is terminated.

Meanwhile, in the Step S140, when the shift lengths $\Delta La$, $\Delta Lb$ and $\Delta Lc$ of the respective pawl structures 10 are not evaluated that all of them are smaller than 10 μm as the acceptable values, the switching controls of the solenoid valves 35 are performed (Step S150). Specifically, when the shift length $\Delta La$ of the first pawl structure 10a is not evaluated that it is smaller than 10 μm, the position of the first pawl structure 10a in the moving direction is adjusted so that the shift length $\Delta La$ becomes smaller, by controlling the switching of the first solenoid valve 35a. Similarly, when the shift length $\Delta Lb$ of the second pawl structure 10b is not evaluated that it is smaller than 10 μm, the position of the second pawl structure 10b in the moving direction is adjusted so that the shift length $\Delta Lb$ becomes smaller, by controlling the switching of the second solenoid valve 35b. When the shift length $\Delta Lc$ of the third pawl structure 10c is not evaluated that it is smaller than 10 μm, the position of the third pawl structure 10c in the moving direction is adjusted so that the shift length $\Delta Lc$ becomes smaller, by controlling the switching of the third solenoid valve 35c.

In the Step S150, when the switching control in any of the solenoid valves 35 are performed and the position of the corresponding pawl structure 10 in the moving direction is adjusted, the other pawl structures 10 may be displaced. Briefly, the positioning of the pawl structures 10 by the switching controls of the solenoid valves 35 may mutually affect each other among three pawl structures 10. For this reason, in the Step S140, the switching controls of the solenoid valves 35 in the Step S150 and the evaluation in the Step S140 are repeated, until the shift lengths $\Delta La$, $\Delta Lb$ and $\Delta Lc$ of three pawl structures 10 are evaluated that all of them are smaller than 10 μm.

Thus, the control portion 39 functions as the attitude control means so as to control the solenoid valves 35, so that the shift lengths of the positions of the pawl structures 10 on the engaged condition in the moving direction from the reference positions, which is detected by the position sensors 37, based on the detected values from the respective position sensors 37, are smaller than the given acceptable values that is preliminarily determined for the shift lengths. Specifically, the control portion 39 functions as the attitude control means, by performing the prescribed calculations or the like in accordance with the attitude control program stored in the storage portion.

As seen from the above, the reduction of the productivity in the production line of the turbocharger 2 can be prevented, and the variations in the attitudes of the work 20 supported on the turbine housing portion 3 can be reduced, by performing the attitude control of the work 20, thereby improving the accuracy of the unbalance correction.

Specifically, as the unbalance correction device 1 of the present embodiment, the clamp method by the pawl structures 10 is used for fixing the work 20 on the turbine housing portion 3, whereby the reduction of the productivity in the production line of the turbocharger 2 can be prevented, compared with the case where the bolt fixation is used for fixing the work 20.

Since the accident errors of the movements of three pawl structures 10 in the moving direction are sufficiently small values, in the attitude control of the work 20, the variations in the work attitudes can be decreased, in the construction that the turbine housing portion 3 is used as a common jig for plurality of works 20. Accordingly, the variations in the locking positions (the clamped positions) of the works 20 by the pawl structures 10 can be reduced, thereby lowering the variations in the largeness of the vibrations of the works 20 themselves, the vibrations transmitted to the acceleration pickup 4 via the turbine housing portion 3 or the like. Consequently, the accuracies in the unbalance corrections of the works 20 can be advanced.

Incidentally, the unbalance correction device 1 of the present embodiment includes the solenoid valves 35 provided with the pipings so as to supply the pressure oils into the first cylinder chambers 31a, as clamping control means provided in the respective cylinder mechanisms 30, but the above-mentioned clamping control means are not limited to them. The above-mentioned clamping control means may be the ones, which are provided in the respective cylinder mechanisms 30, so as to control the distances moving the pawl structures 10 to the moving directions by the cylinder mechanisms 30 and the biasing forces so as to bias the pawl structures 10 to the work fixing directions.

As the above-mentioned clamping control means, for example, two solenoid valves provided on the pipings so as to supply the pressure oils to each of the first cylinder chambers 31a and the second cylinder chambers 31b, may be used, in the cylinder mechanisms 30 constructed as the double-acting cylinders described above. Also, another valve systems or the like, performing the switching of supplying/disengaging, the adjusting of the flow volumes, in the pressure oils supplied to at least any of the or the first cylinder chambers 31a and the second cylinder chambers 31b or the like, may be used, as the above-mentioned clamping control means.

The unbalance correction device 1 of the present embodiment includes the position sensors 37 comprised as the contact-free gap sensors, as the position detecting means provided in the respective pawl structures 10, but the above-mentioned position detecting means are not limited to them. The above-mentioned position detecting means may be the ones, which are provided in the respective pawl structures 10, detecting the positions of the pawl structures 10 on the engaged condition in the moving directions.

As the above-mentioned position detecting means, for example, another straight line position sensors, such as proximity switch or contact gap sensors may be used, as long as they have the enough accuracies to detect the shift lengths of the pawl structures 10 in the tentative clamped condition of the work 20 (for example, the accuracies in the order of a few μm to a few dozens μm).

In the meantime, in the unbalance correction device 1 of the present embodiment, the work 20 are clamped and fixed on the turbine housing portion 3 by three pawl structures 10.

As described above, in the unbalance correction device 1 comprising the construction that the clamp method by the pawl structures 10 are used for fixing the work 20 on the turbine housing portion 3, the pawl structures 10 as the members clamping the work 20 are vibrated to the turbine housing portion 3 (at natural frequency different from the device body including and integral with the turbine housing portion 3), with rotation of the work rotating portion.

More specifically, in the unbalance correction device 1 including the construction that the clamp method is used as mentioned previously, the pawl structures 10 are vibrated to the device body that the respective members including the trestle 5 and the turbine housing portion 3 provided thereon are integrally comprised, with rotation of the work rotating portion. Basically, the device body and the pawl structures 10 have different natural frequencies, in the unbalance correction device 1.

In the pawl structures 10, the pawl portions 11 need to be portions that have sufficient intensities and rigidities for fixing the work 20, so as to fix the work 20 by the locking portions 13 as mentioned before.

Figure 5:
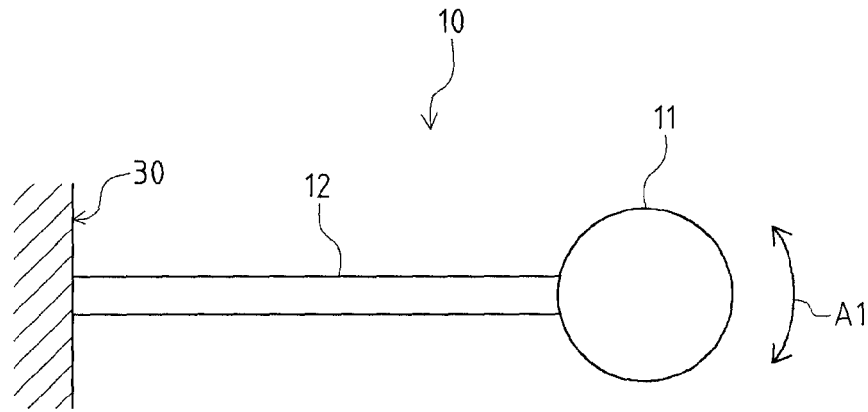
FIG. 5 is a pattern diagram showing a construction of a pawl structure.

Thus, as shown in the pattern diagram of FIG. 5, the pawl structure 10 has the pawl portion 11 as a heavy load on the other end side (the apical end) of the thin (small-diameter) rod portion 12 provided in the approximately horizontal direction and supported on one end thereof by the cylinder mechanism 30. Due to this construction, the pawl portion 11 is vibrated via the rod portion 12, with rotation of the work rotating portion, thereby causing the relative vibration of the pawl structure 10, to the cylinder mechanism 30 included in the above-mentioned device body in the unbalance correction device 1 (see an arrow A1). Accordingly, the pawl structure 10 vibrates at the natural frequency different from the device body.

The vibration of the pawl structure 10 caused due to the rotation of the work rotating portion in the unbalance correction device 1 will be described with reference to FIGS. 6 and 7.

In the unbalance correction device 1 of the present embodiment, the pawl structure 10 can be said to be floating by the fluid (the air in the present embodiment) in the cylinder case 31 of the cylinder mechanism 30. In other words, the pawl structure 10 can be said to be floating relative to the device body of the unbalance correction device 1.

In this regard, the unbalance correction device 1 includes a mass as the device body which is one large mass (hereinafter, referred to as "the body mass"), and a mass as the pawl structure 10 which is comprised of three small masses (hereinafter, referred to as "the pawl mass", as the mass (the mass body).

Figure 7:
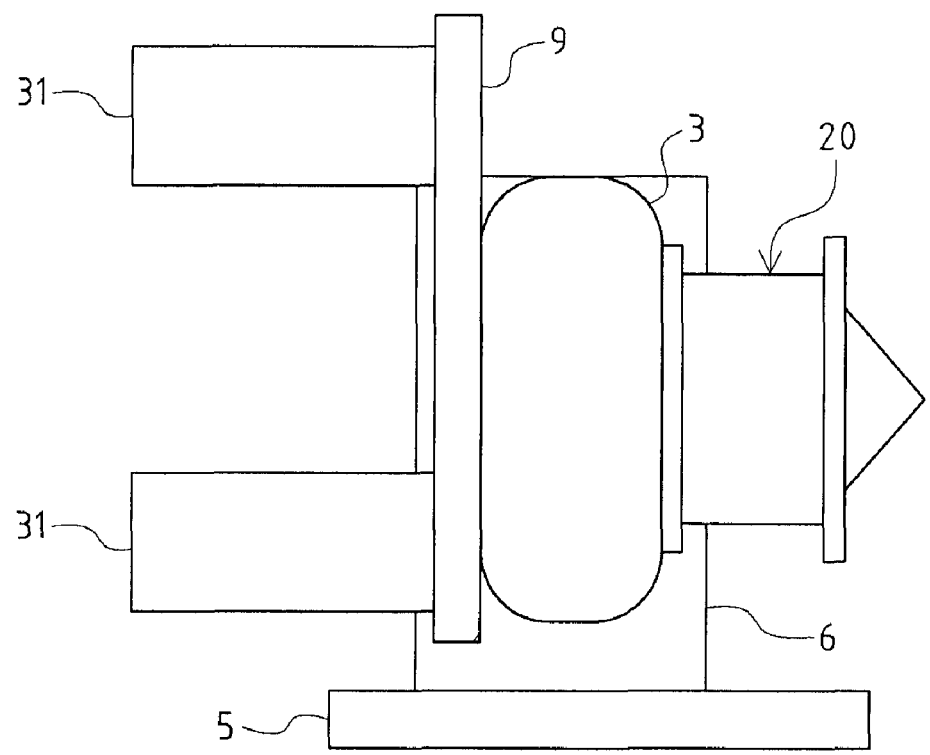
FIG. 7 is a diagram showing the respective masses (mass bodied) for modeling the unbalance correction device according to the first embodiment of the present invention.
Figure 7:
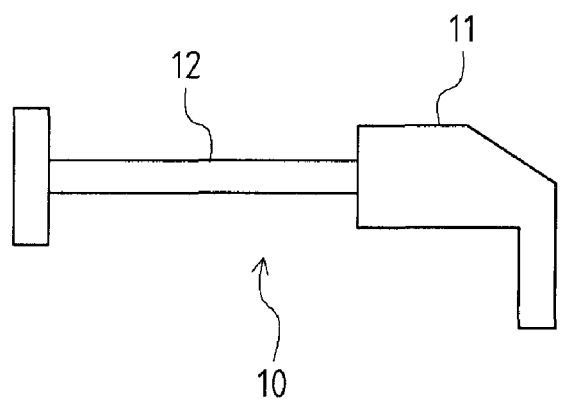

Specifically, in the unbalance correction device 1 of the present embodiment, as shown in FIG. 7 (a), the body mass includes a trestle 5, a supporting wall 6, a turbine housing portion 3, a work 20, a cylinder plate 9 and a cylinder case 31, and is formed as one mass that they are integrally constructed by the bolt fixation or the like. The pawl mass, as shown in FIG. 7(b), has a pawl portion 11 and a rod portion 12, and becomes the mass as one pawl structure 10 that they are integrally constructed. Therefore, the unbalance correction device 1 has three pawl masses comprising of the pawl mass as the first pawl structure 10a (the first pawl mass), the pawl mass as the second pawl structure 10b (the second pawl mass) and the pawl mass as the third pawl structure 10c (the third pawl mass).

Thus, by using the concept that the unbalance correction device 1 includes one body mass and three pawl masses, in the unbalance correction device 1, the respective pawl structures 10 can be replaced by the single-degree-of-freedom vibration model in the device body.

Figure 6:
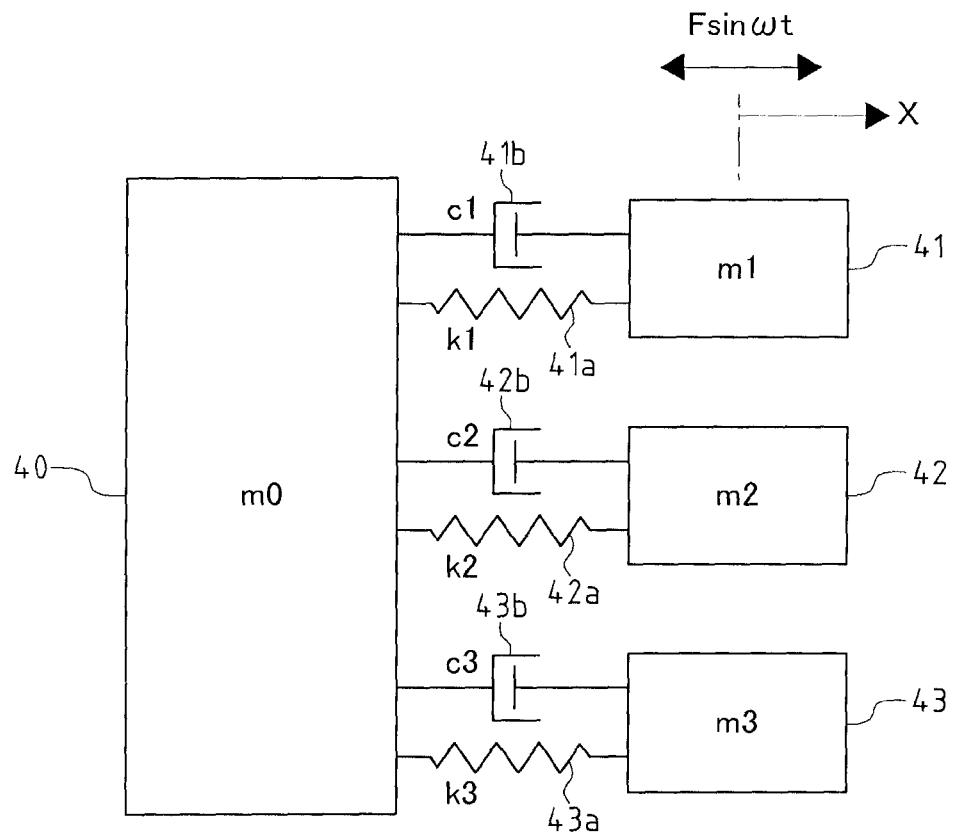
FIG. 6 is a diagram of single-degree-of-freedom system model of the respective pawl structure for the device body.

Specifically, as shown in FIG. 6, the unbalance correction device 1 which is modeled as mentioned above has mass m1 of the first pawl mass 41, mass m2 of the second pawl mass 42 and mass m3 of the third pawl mass 43, with reference to mass m0 of the body mass 40. The first pawl mass 41 is connected via a spring constant k1 of spring 41a and a damping constant c1 of damper 41b to the body mass 40. Similarly, the second pawl mass 42 is connected via a spring constant k2 of spring 42a and a damping constant c2 of damper 42b to the body mass 40, and The third pawl mass 43 is connected via a spring constant k3 of spring 43a and a damping constant c3 of damper 43b to the body mass 40. Incidentally, the body mass 40 is connected to the floor surface 7 (see FIG. 1) at the given spring constant and damping constant.

In this respect, in the first pawl mass 41, the spring constant k1 shows a total rigidity in the system of the mass m1. Similarly, in the second pawl mass 42, the spring constant k2 shows a total rigidity in the system of the mass m2, and in the third pawl mass 43, the spring constant k3 shows a total rigidity in the system of the mass m3. Incidentally, the total rigidity in the respective pawl masses 41 to 43 include the rigidity against the reaction force acting on the pressing surface 13a (see FIG. 1), during the clamp by the pawl structures 10, with the work 20 fixed on the turbine housing portion 3 (hereinafter, referred to as "the clamp rigidity"). The clamp rigidity varies depending on the largeness in the force that the pawl structure 10 is biased by the cylinder mechanism 30 (the pressing force from the locking portion 13).

In the first pawl mass 41, the damping constant c1 shows a total damping in the system of the mass m1. Similarly, in the second pawl mass 42, the damping constant c2 shows a total damping in the system of the mass m2, and in the third pawl mass 43, the damping constant c3 shows a total damping in the system of the mass m3.

In this regard, the total mass of the respective pawl structures 10, the total rigidity and the total mass will be described.

Figure 8:
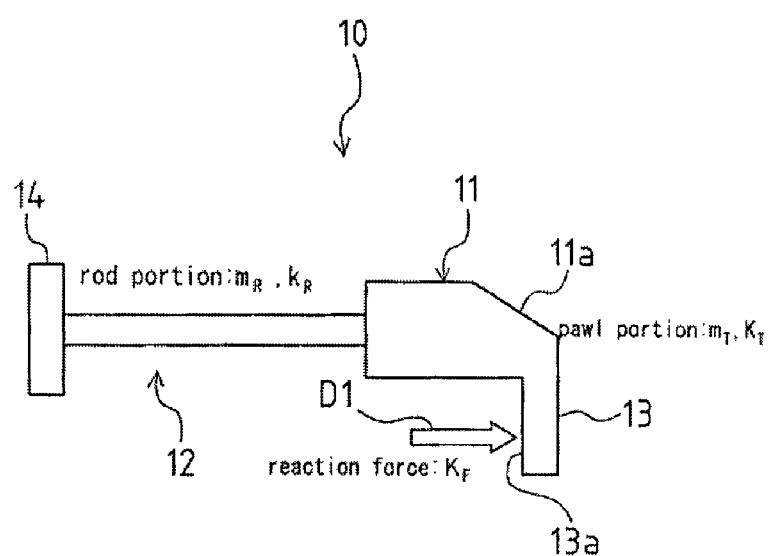
FIG. 8 is a diagram showing the pawl structure.

As shown in FIG. 8, the total mass of the pawl structure 10 means a sum of the mass of the pawl portion 11 in the pawl structure 10 and that of the rod portion 12. Briefly, if the total mass of the pawl structure 10 is mall, the mass of the pawl portion 11, $m_T$ the mass of the rod portion 12, $m_R$, $m_{all} = m_T + m_R$.

The total rigidity (the spring constant) of the pawl structure 10 includes the rigidity of the pawl portion 11, the rigidity of the rod portion 12 in the pawl structure 10 and the clamp rigidity (see an arrow D1). When the total rigidity of the pawl structure 10 is $k_{all}$, the rigidity of the pawl portion 11, $k_T$, the rigidity of the rod portion 12, $k_R$, the clamp rigidity, $k_F$, the following formula (1) is established:

$$1/k_{all} = (1/k_T) + (1/k_R) + (1/k_F) \tag{1}$$

Therefore, $$k_{all} = k_T k_R k_F / (k_R k_F + k_F k_T + k_T k_R)$$

The total damping of the pawl structure 10 means the damping coefficient of the pawl structure 10 supported in the moving and biasing manner, by the cylinder mechanism 30 constituted as the hydraulic cylinder. Specifically, the pawl structure 10 supported via the oils in the cylinder case 31 receives the viscous resistance (the viscous damping) caused by the relative movement to the oils when it is vibrated. The viscous resistance converts the kinetic energy of the pawl structure 10 into the thermal energy, so as to exert the pawl structure 10 on the damping force (the viscous damping force). The damping force acting on the pawl structure 10 is in proportion to the vibration velocity of the pawl structure 10. The proportional constant to the velocity of the damping force is the damping coefficient (the viscous coefficient) of the pawl structure 10 having the pawl portion 11 and the rod portion 12 in an integrated manner as mentioned before, thereby forming the total damping of the pawl structure 10.

In the aforementioned vibration model of the pawl structure 10 (see FIG. 6), the mass m1 shows the total mass of the first pawl structure 10a, and the mass m2 shows the total mass of the second pawl structure 10b, as well as the mass m3 the total mass of the third pawl structure 10c, respectively. The spring constant k1 shows the total rigidity of the first pawl structure 10a, and the spring constant k2 shows the total rigidity of the second pawl structure 10b, as well as the spring constant k3 the total rigidity of the third pawl structure 10c, respectively. The damping coefficient c1 shows the total damping of the first pawl structure 10a, and the damping coefficient c2 shows the total damping of the second pawl structure 10b, as well as the damping coefficient c3, the total damping of the third pawl structure 10c, respectively.

As seen from the above, the vibrations of the respective pawl structures 10 in the moving directions with rotation of the work rotating portion can be considered as single-degree-of-freedom system forced vibration having the damping (the viscous damping) for the device body. In other words, the periodical external force as the forced vibration force acts on the respective pawl structures 10 represented by the respective pawl masses 41 to 43 (the pawl system), with rotation of the work rotating portion, whereby the respective pawl structures 10 vibrate to the device body represented as the body mass 40 (the body system) with damping in the moving directions.

Therefore, when the coordinate (the displacement to the reference position) in the moving direction of the pawl structure 10 is X, and the periodical external force as the forced vibration force acting on the pawl structure 10 with rotation of the work rotating portion is F sin ωt (ω: the angular frequency, t: time), the following formula (2) is established as a common motion equation showing single-degree-of-freedom system vibration with damping.

[Formula 1]

$$m\ddot{x} + c\dot{x} + kx = F\sin\omega t \tag{2}$$
$$\dot{x} = \frac{dx}{dt}$$
$$\ddot{x} = \frac{d^2x}{dt^2}$$

Incidentally, in the formula (2), the m corresponds to the total mass of the pawl structure 10, and the c corresponds to the total damping (the damping coefficient) of the pawl structure 10, as well as the k corresponds to the total rigidity (the spring constant) of the pawl structure 10.

In the formula (2), when the total mass, the total damping and the total rigidity of the pawl structure 10 are preliminarily showed by the measurement or the line, the excitation force (the largeness/direction) acting on the pawl structure 10 with rotation of the work rotating portion is derived due to the displacement x of the pawl structure 10 from the reference position.

Specifically, when excitation force acting on the first pawl structure 10a is Fa, and the excitation force acting on the second pawl structure 10b is Fb, as well as the excitation force acting on the third pawl structure 10c is Fc, with reference to the excitation forces acting on the respective pawl structures 10 with rotation of the work rotating portion, the following formulas (3) to (5) are established, based on the above-mentioned formula (2).

[formula 2]

$$m1\ddot{x} + c1\dot{x} + k1x = F_a \tag{3}$$

[formula 3]

$$m2\ddot{x} + c2\dot{x} + k2x = F_b \tag{4}$$

[formula 4]

$$m3\ddot{x} + c3\dot{x} + k3x = F_c \tag{5}$$

Thus, the excitation forces acting on the respective pawl structures 10 are derived from the aforementioned formulas (3) to (5), with respect to the vibrations of the respective pawl structures 10 in the moving directions on the device body with rotation of the work rotating portion.

In this regard, in the unbalance correction device 1, the forces negating the excitation forces acting on the respective pawl structures 10 with rotation of the work rotating portion are exerted on the respective pawl structures 10 as the damping forces, for the unbalance correction, whereby the active damping controls restraining the natural vibrations (behavior) of the respective pawl structures 10 to the device body are performed. The unbalance correction device 1 of the present embodiment includes the following construction, so as to perform the damping controls for the respective pawl structures 10. Incidentally, with regard to the following description, in the damping controls of the respective pawl structures 10, the vibration direction of the pawl structure 10 as the damping object is defined as the moving direction of the pawl structure 10 (the lateral direction in FIG. 1), and the direction is defined as the direction of the X-axis. Briefly, in the following description, the "vibration" on the pawl structure 10 means the one in the moving direction of the pawl structure 10 (in the direction of the X axis).

Figure 9:
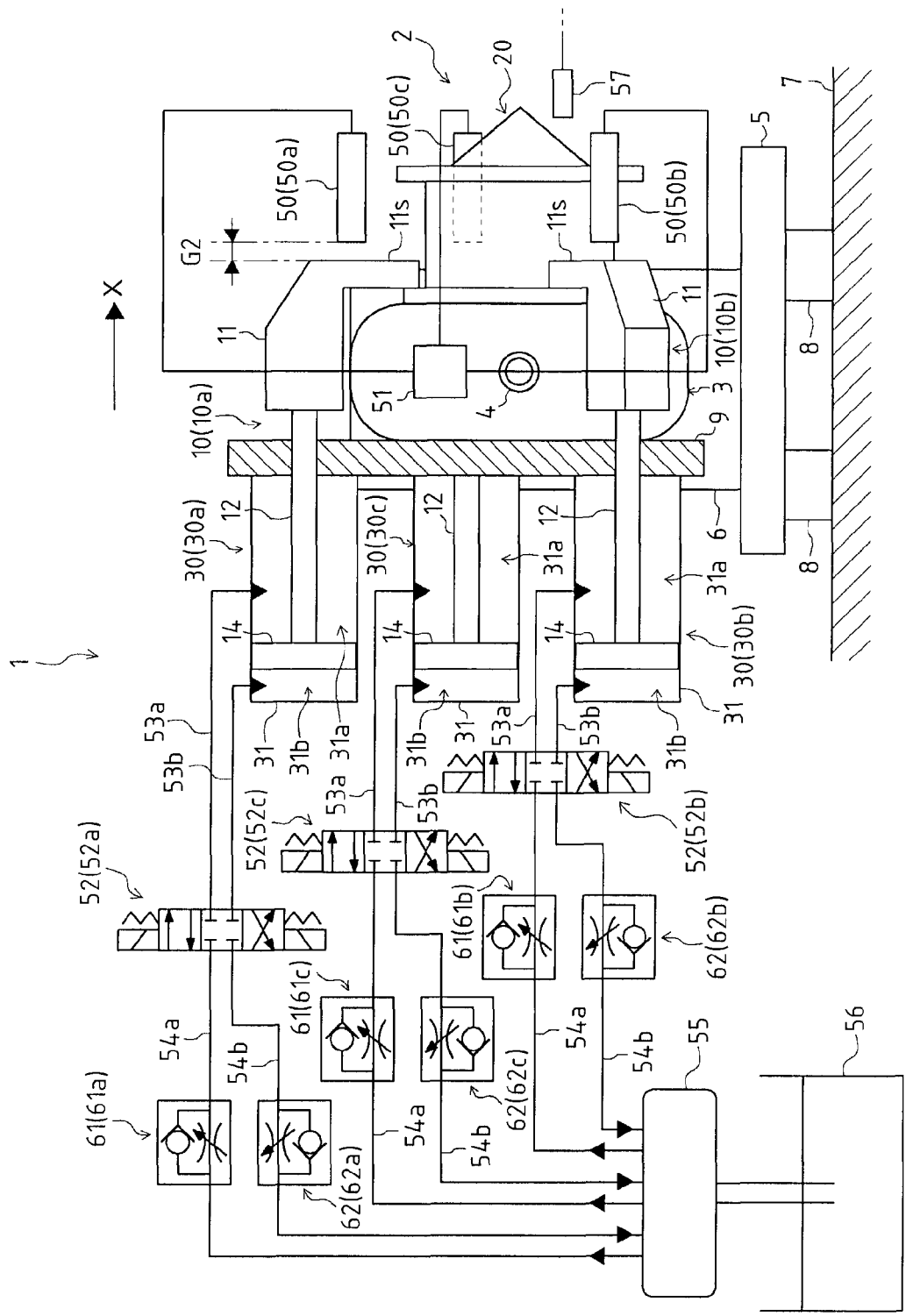
FIG. 9 is a diagram showing a device configuration for damping control of the pawl structure in the unbalance correction device according to the first embodiment of the present invention.

As shown in FIG. 9, the unbalance correction device 1 is provided in the respective pawl structures 10 with displacement sensors 50. In other words, the unbalance correction device 1 of the present embodiment includes three displacement sensors 50. Incidentally, in the FIG. 9, for convenience of explanation, the position of the third cylinder mechanism 30c in the unbalance correction device 1 is represented by displacing from the original position as shown in FIG. 2.

The displacement sensor 50 detects the displacement (the displacement magnitude and the displacement direction) of the pawl structure 10 with the work 20 clamped on the turbine housing portion 3, due to the vibration with rotation of the work rotating portion. The displacement sensor 50 is comprised as the contact-free gap sensor, which detects the displacement due to the vibration of the pawl structure 10 as the object to be measured, by detecting the gap between the pawl structures 10 thereof in the moving direction.

In the present embodiment, the displacement sensor 50 detects the apical surfaces 11s, as the end surface of the pawl portion 11, which is an end face on one end of the pawl structure 10 in the moving direction. In other words, the displacement sensor 50 detects the displacement due to the vibration of the pawl structure 10, by detecting the gap G2 between the apical surfaces 11s of the pawl structure 10 (see FIG. 9). For example, a eddy current sensor, capacitance sensor, a laser sensor or an ultrasonic sensor or the like can be utilized, as the displacement sensor 50.

The displacement sensor 50 detects the displacement due to the relative vibration to the device body, regarding the vibration of the pawl structure 10. Specifically, the displacement sensor 50 is provided so that the sensor 50 itself vibrates integrally with device body, or the vibration of the device body is added to the detection value by the displacement sensor 50 or the like, whereby the sensor 50 detects the displacement due to the relative vibration to the device body of the pawl structure 10.

In the present embodiment, the displacement sensor 50 has a reference position portion 51 in the turbine housing portion 3. Briefly, in the present embodiment, the displacement sensor 50 detects the displacement due to the vibration of the pawl structure 10, using the turbine housing portion 3 having the reference position portion 51 as a reference position. In other words, the displacement sensor 50 detects the displacement due to the relative vibration of the pawl structure 10 to the turbine housing portion 3. The reference positions for the displacement sensor 50 are not especially limited, as long as they are any positions in the device body including the turbine housing portion 3 and comprised integral with it.

The default position (the reference position as X=0) of the pawl structure 10 for detecting the displacement due to the vibration of the pawl structure 10 by the displacement sensor 50 becomes the position of the pawl structure 10, at the time when the clamping of the work 20 on the turbine housing portion 3 has been finished using the pawl structure 10. Therefore, for example, as mentioned above, when the attitude control of the work 20 is performed, the positions of the respective pawl structures 10 at the time when the clamping for the work 20 has been finished in the attitude control of the work 20 become the default positions of the pawl structures 10 for the respective displacement sensor 50.

As just described, the displacement sensors 50 are disposed in the respective pawl structures 10 and function as the displacement sensing means which detect the displacements due to the vibrations of the pawl structures 10, with the work 20 clamped on the turbine housing portion 3, to the device body with rotation of the work rotating portion.

Hereinafter, when three displacement sensors 50 are distinctly described according to the pawl structures 10 provided thereof, the displacement sensor 50 disposed in the first pawl structure 10a is defined as "the first displacement sensor 50a", the displacement sensor 50 disposed in the second pawl structure 10b is defined as "the second displacement sensor 50b", as well as the displacement sensor 50 disposed in the third pawl structure 10c is defined as "the third displacement sensor 50c". The vibratory displacement of the first pawl structure 10a detected by the first displacement sensor 50a is defined as Xa, and the vibratory displacement of the second pawl structure 10b detected by the second displacement sensor 50b is defined as Xb, as well as the vibratory displacement of the third pawl structure 10c detected by the third displacement sensor 50c is defined as Xb is defined as Xc.

As shown in FIG. 9, the unbalance correction device 1 is provided in the respective cylinder mechanisms 30 with solenoid changeover valves 52. In other words, the unbalance correction device 1 of the present embodiment includes three solenoid changeover valves 52.

The solenoid changeover valves 52 change over the directions to which the pawl structures 10 are moved (the directions to which the pawl structures 10 are biased) in the moving directions thereof. The concrete procedure goes as follows.

More specifically, as mentioned above, the cylinder mechanism 30 is comprised as the double-acting cylinder having the first cylinder chamber 31a and the second cylinder chamber 31b in the cylinder case 31. As shown in FIG. 9, the first cylinder chamber 31a is continuously connected at the doorway of the oil thereof to the first oil passage 53a. The supply of the pressure oil to the first cylinder chamber 31a and the discharge (the retracting) of the oil from the first cylinder chamber 31a are performed, through the first oil passage 53a. Similarly, the second cylinder chamber 31b is continuously connected at the doorway of the oil thereof to the second oil passage 53b. The supply of the pressure oil to the second cylinder chamber 31b and the discharge (the retracting) of the oil from the second cylinder chamber 31b are performed, through the second oil passage 53b.

As shown in FIG. 9, each of the first oil passage 53a and the second oil passage 53b provided at the respective cylinder mechanisms 30 are connected to a supplying oil passage 54a and a detracting oil passage 54b, via the solenoid changeover valves 52. These supplying oil passage 54a and a detracting oil passage 54b are connected to an oil tank 56 via an oil pump 55. Briefly, the oils stored in the oil tank 56 are supplied from the supplying oil passage 54a via the solenoid changeover valves 52 to each of the cylinder mechanisms 30, using the oil pump 55. The oils retracted from each of the cylinder mechanisms 30 are retracted from the retracting oil passage 54b via the solenoid changeover valves 52 to the oil tank 56.

In this regard, when the pawl structures 10 are moved and biased in the directions to which they are pulled (the work fixing directions), the pressure oils via the solenoid changeover valves 52 are supplied from the first oil passages 53a into the first cylinder chamber 31a and the oils in the second cylinder chambers 31b is retracted from the second oil passages 53b via the solenoid changeover valves 52. On the other hand, when pawl structures 10 are moved and biased in the directions to which they are pushed out (the directions opposite to the work fixing directions), the pressure oils via the solenoid changeover valves 52 are supplied from the second oil passages 53b into the second cylinder chambers 31b and the oils in the first cylinder chambers 31a are retracted from the first oil passage 53a via the solenoid changeover valves 52.

In the above-mentioned constructions supplying/discharging the oils for the respective cylinder mechanisms 30, the solenoid changeover valves 52 change over the supplies of the pressure oils to the first cylinder chambers 31a (the retracting of the oils from the second cylinder chambers 31b) and the supplies of the pressure oils to the second cylinder chambers 31b (the retracting of the oils from the first cylinder chambers 31a).

The solenoid changeover valve 52 is constituted as so-called solenoid operating four ports changeover valve. Specifically, in the solenoid changeover valve 52, the solenoid (the electromagnet) is operated via the relay, based on the given control signal (the electric signal), and the spool is moved by the force thereof, thereby changing over the flow passage in the hydraulic circuit. The solenoid changeover valve 52 is comprised as so-called three-position valve. Briefly, in the solenoid changeover valve 52, the spool is changed over at three points and the flow passages corresponding to the positions of the respective spools are formed.

The changeover of the flow passage by the solenoid changeover valve 52 in the unbalance correction device 1 of the present embodiment will be described with reference to FIG. 11.

In the solenoid changeover valve 52 comprised as the aforementioned three position valve, three conditions are changed over, the conditions comprising of the continuous connection condition (the first condition) of the first oil passage 53a and the supplying oil passage 54a as well as the second oil passage 53b and the retracting oil passage 54b, and the continuous connection condition (the second condition) of the first oil passage 53a and the retracting oil passage 54b, as well as the second oil passage 53b and the supplying oil passage 54a, and the blocking condition (the unconnected condition) of the flow passage (the third condition).

Specifically, the solenoid changeover valve 52 has four ports to which each of the first oil passage 53a, the second oil passage 53b, the supplying oil passage 54a and the retracting oil passage 54b are continuously connected. In this regard, as shown in FIG. 11, with respect to four ports in the solenoid changeover valve 52, the port connected to the first oil passage 53a is defined as a port Pa1, and the port connected to the second oil passage 53b is defined as a port Pb1, and the port connected to the supplying oil passage 54a, a port Pa2, as well as the port connected to the retracting oil passage 54b, a port Pb2.

Figure 11:
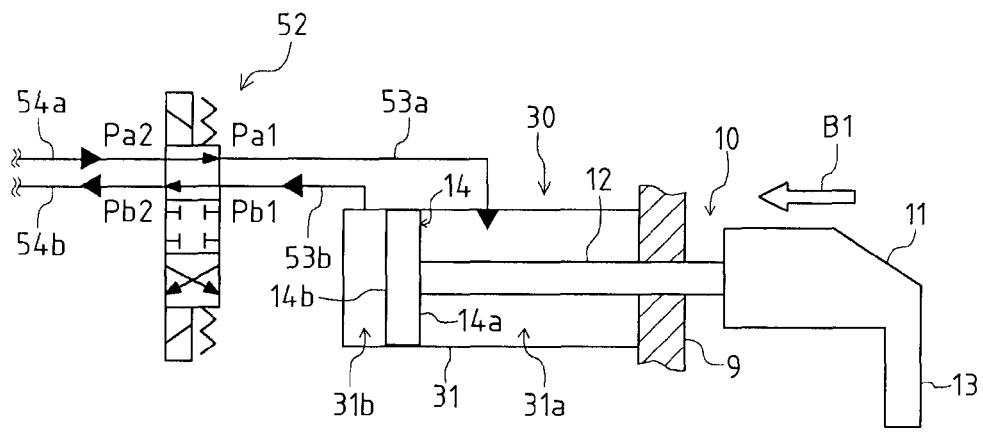
FIG. 11 is an illustration diagram for a changeover of a flow passage by a solenoid changeover valve.
Figure 11:
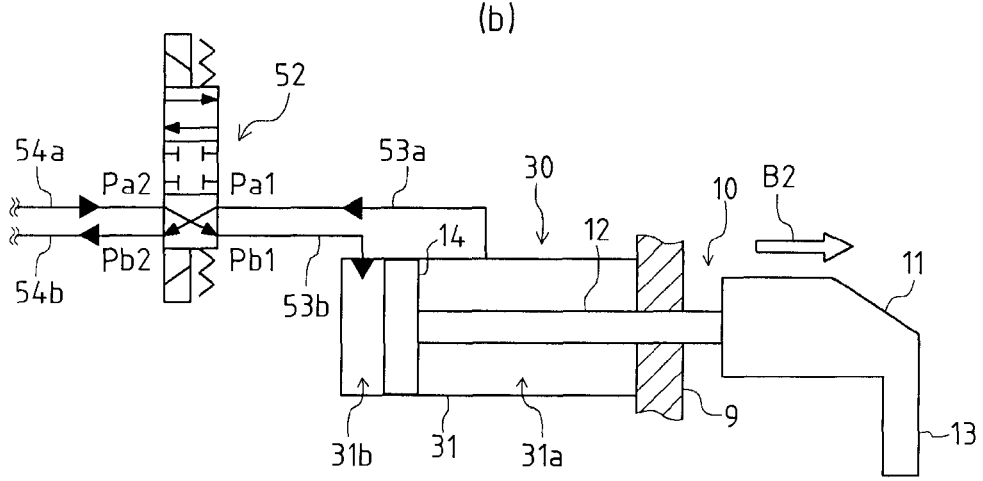
Figure 11:
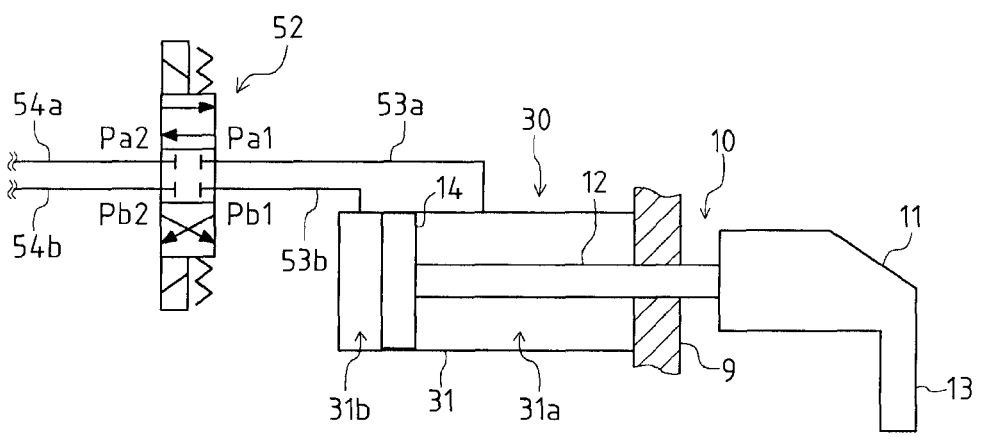

FIG. 11 (a) shows the above-mentioned first condition in the solenoid changeover valve 52. In the solenoid changeover valve 52 on this condition, the respective ports are connected so that the port Pa2 is connected to the port Pa1 and the port Pb1 is connected to the port Pb2. Specifically, the supplying oil passage 54a and the first oil passage 53a are continuously connected, whereby the pressure oil is supplied into the first cylinder chamber 31a, and the second oil passage 53b and the retracting oil passage 54b are continuously connected, whereby the oil in the second cylinder chamber 31b is retracted. Accordingly, the pawl structure 10 is moved and biased in the direction to which it is pulled (the work fixing direction) (see an arrow B1).

FIG. 11 (b) shows the aforementioned second condition in the solenoid change over valve 52. In the solenoid changeover valve 52 on this condition, the port Pa2 is connected to the port Pb1, and the port Pa1 is connected to the port Pb2. Briefly, the supplying oil passage 54a and the second oil passage 53b are continuously connected, whereby the pressure oil is supplied in the second cylinder chamber 31b, as well as the first oil passage 53a and the retracting oil passage 54b are continuously connected, whereby the oil in the first cylinder chamber 31a is retracted. Accordingly, the pawl structure 10 is moved and biased in the pushed direction (the direction opposite to the work fixing direction) (see an arrow B2).

FIG. 11 (c) shows the aforementioned third condition in the solenoid changeover valve 52. In the solenoid changeover valve 52 on this condition, the respective ports are covered and blocked by the spools. Briefly, all of the first oil passage 53a, the second oil passage 53b, the supplying oil passage 54a and the retracting oil passage 54b are blocked in the respective ports, and the supply/discharge of the oils are blocked in the cylinder mechanism 30. Therefore, on this condition, the hydraulic pressures in the first cylinder chamber 31a and the second cylinder chamber 31b of the cylinder mechanism 30 are retained.

Since the switching of the flow passages by the solenoid changeover valve 52 are performed by switching the positions of the spools as mentioned above, hereinafter, in the switching of the flow passages by the solenoid changeover valve 52, the above-mentioned first condition is defined as the position P1 (see FIG. 11 (a)), and the above-mentioned second condition is defined as the position P2 (see FIG. 11 (b)), as well as the above-described third condition, the position PN (see FIG. 11 (c)). Briefly, the solenoid changeover valve 52 is on any conditions of the positions P1, P2 and PN, so that the switching of the flow passages is performed using the solenoid changeover valve 52. Accordingly, the moving and biasing direction is switched in the moving direction of the pawl structure 10.

As seen from the above, the solenoid changeover valves 52 are provided in the respective cylinder mechanisms 30 and function as the direction switching means for switching the moving and biasing directions in the moving directions of the pawl structures 10 by the cylinder mechanisms 30.

Hereinafter, when three solenoid changeover valves 52 are distinctly described according to the cylinder mechanisms 30 provided, the solenoid changeover valve 52 disposed at the first cylinder mechanism 30a is defined as "the first solenoid changeover valve 52a", and the solenoid changeover valve 52 disposed at the second cylinder mechanism 30b is defined as "the second solenoid changeover valve 52b, as well as the solenoid changeover valve 52 disposed at the third cylinder mechanism 30c, "the third solenoid changeover valve 52c".

In the unbalance correction device 1, supplying flow control valves 61 and retracting flow control valves 62 are provided in the respective cylinder mechanisms 30. In other words, the unbalance correction device 1 of the present embodiment includes three supplying flow control valves 61 and three retracting flow control valves 62.

The supplying flow control valves 61 control the flow rates of the pressure oils supplied from the oil tans 56 to the cylinder mechanisms 30 by the oil pumps 55. Specifically, as shown in FIG. 9, the supplying flow control valves 61 are provided at the supplying oil passages 54a and control the flow rates of the pressure oils supplied to the cylinder mechanisms 30 between the oil pumps 55 and the solenoid changeover valves 52.

The retracting flow control valves 62 control the flow rates of the oils retracted from the cylinder mechanisms 30 to the oil tanks 56. Specifically, as shown in FIG. 9, the retracting flow control valves 62 are provided at the retracting oil passages 54b and control the flow rates of the oils retracted from the cylinder mechanisms 30 between the solenoid changeover valves 52 and the oil pumps 55.

Each of the supplying flow control valves 61 and the retracting flow control valves 62 are comprised as one-way restrictors having check valves. That is, in the supplying flow control valves 61 the flows in the supplying direction to the cylinder mechanisms 30 become the control flows, and the flows in the opposite directions thereof become the free flows. Meanwhile, in the retracting flow control valves 62, the flows in the retracting directions from the cylinder mechanisms 30 become the control flows, and the flows in the opposite directions thereof become the free flows.

As mentioned above, the flow rates of the oils supplied to and discharged from the cylinder mechanisms 30 via the solenoid changeover valves 52 are controlled, by the supplying flow control valves 61 and the retracting flow control valves 62, thereby controlling the largeness of the biasing forces acting on the pawl structures 10 by the cylinder mechanisms 30. More specifically, by controlling the flow rates of the oils using the supplying flow control valves 61 and the retracting flow control valves 62, when the solenoid changeover valves 52 are on the positions P1, the largeness of the biasing forces acting on the directions pulling the pawl structures 10 by the cylinder mechanisms 30 is controlled, and when the solenoid changeover valves 52 are on the positions P2, the largeness of the biasing forces acting on the directions pushing the pawl structures 10 by the cylinder mechanisms 30 is controlled.

Thus, the supplying flow control valves 61 and the retracting flow control valves 62 are provided at the respective cylinder mechanisms 30, and function as the biasing force control means for controlling the biasing forces biasing the pawl structures 10 by the cylinder mechanisms 30, in the moving and biasing directions of the pawl structures 10 defined by the solenoid changeover valves 52.

Hereinafter, when three supplying flow control valves 61 are distinctly described according to the cylinder mechanisms 30 provided, the supplying flow control valve 61 disposed at the first cylinder mechanism 30*a* is defined as "the first supplying flow control valve 61*a*", and the supplying flow control valve 61 disposed at the second cylinder mechanism 30*b* is defined as "the second supplying flow control valve 61*b*", as well as the supplying flow control valve 61 disposed at the third cylinder mechanism 30*c*, "the third supplying flow control valve 61*c*". Similarly, the retracting flow control valve 62 disposed at the first cylinder mechanism 30*a* is defined as "the first retracting flow control valve 62*a*", and the retracting flow control valve 62 disposed at the second cylinder mechanism 30*b* is defined as "the second retracting flow control valve 62*b*", as well as the retracting flow control valve 62 disposed at the third cylinder mechanism 30*c*, "the third retracting flow control valve 62*c*".

In the unbalance correction device 1, the work 20 on the clamped condition is provided with a rotation sensor 57 for detecting the rotation of the work rotating portion thereof. As the rotation sensor 57, for example, contact-free rotational displacement (rotational angle) sensor such as optical sensor or magnetic sensor are utilized.

The control construction of the damping control for the pawl structure 10 in the unbalance correction device 1 of the present embodiment equipped with the above-described constitutions will be described with reference to FIG. 10.

Figure 10:
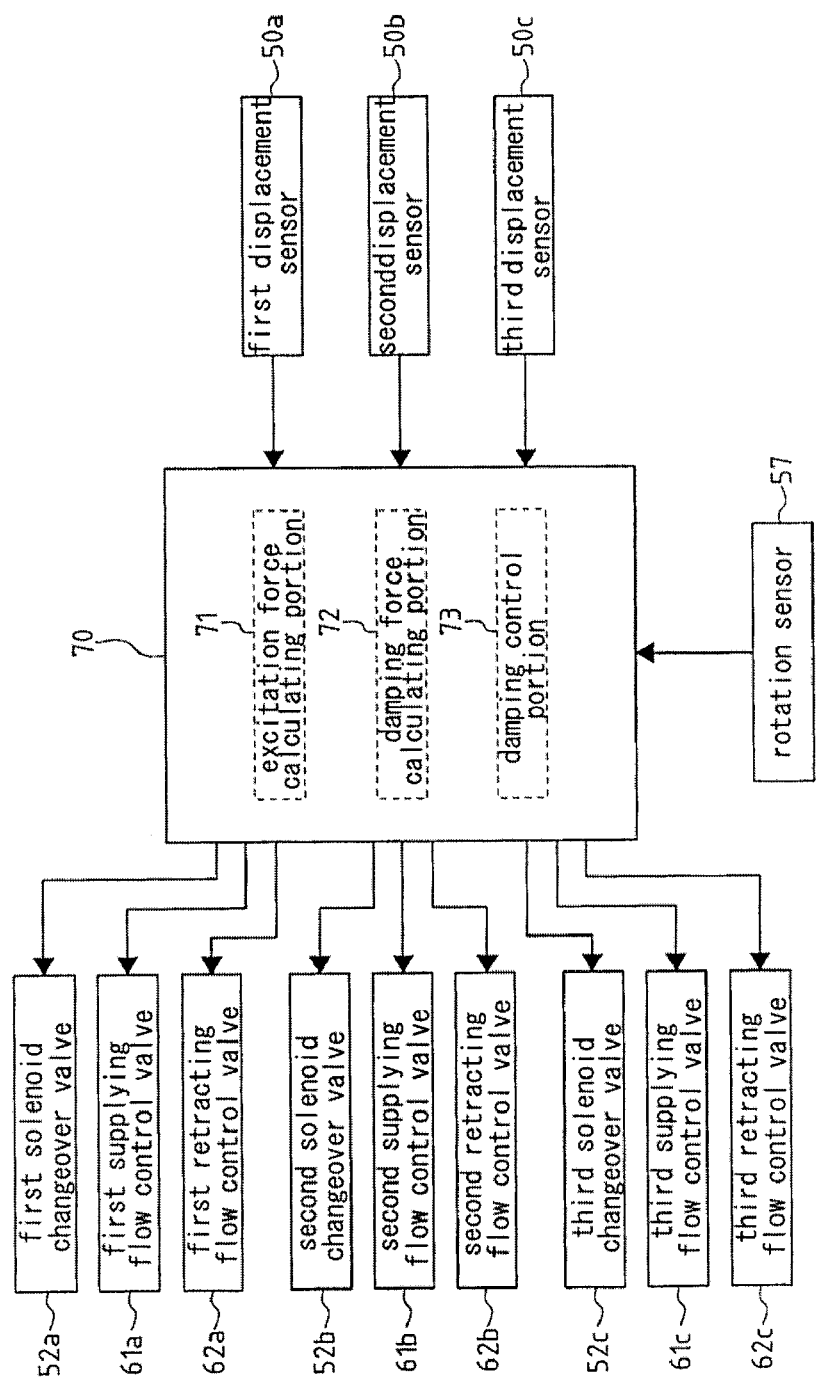
FIG. 10 is a diagram showing controlling construction for damping control of the pawl structure in the unbalance correction device according to the first embodiment of the present invention.

As shown in FIG. 10, the unbalance correction device 1 of the present embodiment includes a control system 70 so as to perform the damping control for the pawl structure 10. The control system 70 controls the respective solenoid changeover valves 52, the respective supplying flow control valves 61 and the retracting flow control valves 62, based on the detection signals output from the respective displacement sensors 50. Accordingly, the biasing forces acting on the pawl structures 10 by the cylinder mechanisms 30 are controlled, thereby damping the vibrations of the pawl structures 10 to the device body (the turbine housing portion 3).

The control system 70 is connected to the respective displacement sensors 50, the respective solenoid changeover valves 52, the respective supplying flow control valves 61 and the respective retracting flow control valves 62. The control system 70 receives the signals on the displacements due to the vibrations of the pawl structures 10 clamping the work 20, detected by the respective displacement sensors 50. Accordingly, the control system 70 obtains the information on the displacements due to the vibrations of the pawl structures 10 clamping the work 20. The control system 70 issues the control signals to the respective solenoid changeover valves 52, the respective supplying flow control valves 61 and the retracting flow control valves 62. Briefly, the control system 70 issues the signals so as to switch the flow passages for the respective solenoid changeover valves 52 (the positions of the solenoid changeover valves 52). Accordingly, the control system 70 performs the switching controls of the respective solenoid changeover valves 52. The control system 70 sends the signals for controlling the flow rates (the valve opening degrees) to the respective supplying flow control valves 61 and the respective retracting flow control valves 62. Accordingly, the control system 70 performs the conditioned controls for the respective supplying flow control valves 61 and the respective retracting flow control valves 62.

The control system 70 independently controls the respective solenoid changeover valves 52, the respective supplying flow control valves 61 and the respective retracting flow control valves 62, based on the detection signals from the respective displacement sensors 50. More specifically, the control system 70 controls the first solenoid changeover valve 52*a*, the first supplying flow control valve 61*a* and the first retracting flow control valve 62*a*, based on the detection signal from the first displacement sensor 50*a*, and controls the second solenoid changeover valve 52*b*, the second supplying flow control valve 61*b* and the second retracting flow control valve 62*b*, based on the detection signal from the second displacement sensor 50*b*, as well as controls the third solenoid changeover valve 52*c*, the third supplying flow control valve 61*c* and the third retracting flow control valve 62*c*, based on the detection signal from the third displacement sensor 50*c*. Consequently, the cylinder mechanisms 30 acting the biasing forces on the pawl structures 10 clamping the work 20 are independently controlled, thereby damping the vibrations of the respective pawl structures 10 to the device body (the turbine housing portion 3).

The control system 70 is connected to the rotation sensor 57. The control system 70 receives the signal on the rotational displacement (the rotational angle) of the work rotating portion in the work 20 on the clamped condition, detected by the rotation sensor 57. Accordingly, the control system 70 acquires the information on the rotational displacement (the rotational angle) of the work rotating portion in the work 20 on the clamped condition.

The control system 70 has a storage portion which stores a program or the like, an expanding portion which expands the program or the like, a calculating portion which performs the predefined calculation according to the program or the like, a filing portion which files the calculated results or the like by calculating portion, a measuring portion which measures the displacements due to the vibrations of the pawl structures 10 clamping the work 20 or the like, based on the detection signals output from the displacement sensors 50 and so on. The program or the like stored in the aforementioned storage portion include an after-mentioned excitation force calculation program, a damping force calculation program and a damping control program.

As the control system 70, specifically, the construction that a CPU, a ROM, a RAM, a HDD or the like are connected together with a bus, or the configuration making up of one-chip LSI or the like are utilized. The control system 70 of the present embodiment, which is exclusive goods, is also substitutable for the one which the aforementioned program or the like are stored in the commercially available personal computer, workstation and so forth.

The control system 70 has an excitation force calculating portion 71, a damping force calculating portion 72 and a damping control portion 73.

The excitation force calculating portion 71 calculates the excitation forces acting on the pawl structures 10 in the moving directions with rotation of the work rotating portion, based on the displacements of the pawl structures 10 detected by the displacement sensors 50, as well as the total mass of the pawl structures 10, the total damping of the pawl structures 10 in the moving directions and the total rigidity of the pawl structures 10 in the moving directions.

The control system 70 exerts the predetermined calculation or the like according to the excitation force calculation program stored in the storage portion thereof, whereby the calculation of the excitation force by the excitation force calculating portion 71 is performed as mentioned above. Briefly, in the damping control of the pawl structure 10, the excitation forces acting with rotation of the work rotating portion, on the respective pawl structures 10 clamping the work 20 are calculated by the excitation force calculating portion 71.

When the excitation forces acting on the pawl structures 10 by the excitation force calculating portion 71 are calculated, the respective values of the displacements due to the vibrations, the total mass, the total damping and the total rigidity of the pawl structures 10 are utilized.

In this regard, the displacements due to the vibrations of the pawl structures 10 are detected using the displacement sensors 50. Basically, the displacements due to the vibrations of the pawl structures 10 are the ones (the x values) of the pawl structures 10 in the vibration directions (the X-axis direction, see FIG. 9), when the positions of the pawl structures 10 at the time of finishing the clamping of the work 20 are set up as the default positions (the reference positions as x=0), detected by the displacement sensors 50 as described above. In other words, the displacements due to the vibrations of the pawl structures 10 detected by the displacement sensors 50 become the ones when the pawl structures 10 receive the excitation forces.

The total mass of the pawl structures 10 are sum ($m_{all}$) of the masses of the pawl portions 11 and those of the rod portions 12 in the pawl structures 10. The total damping of the pawl structures 10 are damping coefficients for the vibrations of the pawl structures 10 supported on the cylinder mechanisms 30 comprised as the hydraulic cylinders in a moving and biasing manner. The total rigidity of the pawl structures 10 are the spring constants ($k_{all}$) on the vibrations derived from the above-mentioned formula (1), based on the rigidities of the pawl portions 11, those of the rod portions 12 and the clamp rigidities in the pawl structures 10.

The excitation force calculating portion 71 calculates the excitation forces acting on the respective pawl structures 10 clamping the work 20, using the aforementioned formulas (3) to (5), based on the above-described respective values on the vibrations of the pawl structures 10.

More specifically, the excitation force calculating portion 71 calculates the excitation force Fa acting on the first pawl structure 10*a*, using the formula (3), based on the mass m1 as the total mass, the damping coefficient c1 as the total damping and the spring constant k1 as the total rigidity, regarding the first pawl structure 10*a*. Similarly, the excitation force calculating portion 71 calculates the excitation force Fb acting on the second pawl structure 10*b*, using the formula (4), based on the mass m2, the damping coefficient c2 and the spring constant k2, regarding the second pawl structure 10*b*. The excitation force calculating portion 71 calculates the excitation force Ft acting on the third pawl structure 10*c*, using the formula (5), based on the mass m3, the damping coefficient c3 and the spring constant k3, regarding the third pawl structure 10*c*.

As seen from the above, the respective values used for calculating the excitation forces acting on the respective pawl structures 10, i.e., each values of the displacements due to the vibrations, the total mass, the total damping and the total rigidity of the pawl structures 10, by the excitation force calculating portion 71, are preliminarily set up and memorized in the storage portion or the like of the control system 70.

Thus, the excitation force calculating portion 71 functions as the excitation force calculating means for calculating the excitation forces acting on the pawl structures 10 in the moving directions with rotation of the work rotating portion, based on the displacements of the pawl structures 10, as well as the total mass of the pawl structures 10, the total damping of the pawl structures 10 in the moving directions and the total rigidity of the pawl structures 10 in the moving directions, detected by the displacement sensors 50. Specifically, the control system 70 functions as the excitation force calculating means by performing the predetermined calculation or the like according to the excitation force calculation program stored in the storage portion thereof.

The damping force calculating portion 72 calculates the forces of the opposite directions and the same sizes to the excitation forces calculated by the excitation force calculating portion 71, as the damping forces acting on the pawl structures 10.

The control system 70 carries out the predetermined calculations or the like according to the damping force calculation program stored in the storage portion thereof, whereby the calculations of the damping forces by the damping force calculating portion 72 are performed. Briefly, in the damping control for the pawl structures 10, the damping forces acting on the respective pawl structures 10 that clamps the work 20 and receives the excitation forces with rotation of the work rotating portion are calculated by the damping force calculating portion 72.

In the calculations of the damping forces acting on the pawl structures 10 by the damping force calculating portion 72, the values of the excitation forces calculated by the excitation force calculating portion 71 are utilized. In other words, the damping force calculating portion 72 calculates the forces counteracting the excitation forces calculated by the excitation force calculating portion 71, i.e., the forces of the opposite directions and the same sizes to the excitation forces calculated, as the damping forces acting on the pawl structures 10.

Therefore, when the values of the excitation forces calculated by the excitation force calculating portion 71 are, for example, Fx (N), the damping force calculating portion 72 calculates the damping forces acting on the pawl structures 10 as −Fx (N).

More specifically, the damping force calculating portion 72 calculates the damping force (−Fa) to the excitation force Fa calculated by the excitation force calculating portion 71

(see the formula (3)), with respect to the first pawl structure 10a. Similarly, the damping force calculating portion 72 calculates the damping force (−Fb) to the excitation force Fb (see the formula (4)), with respect to the second pawl structure 10b, and calculates the damping force (−Fc) to the excitation force Fc (see the formula (5)), with respect to the third pawl structure 10c.

As seen from the above, the damping force calculating portion 72 functions as the damping force calculating means for calculating the forces of the opposite directions and the same sizes to the excitation forces calculated by the excitation force calculating portion 71, as the damping forces acting on the pawl structures 10. Specifically, the control system 70 performs the given calculations or the like according to the damping force calculation program stored in the storage portion thereof, whereby the damping force calculating portion 72 functions as the aforementioned damping force calculating means.

The damping control portion 73 controls the solenoid changeover valves 52, the supplying flow control valves 61 and the retracting flow control valves 62, so that the damping forces calculated by the damping force calculating portion 72 exerts the pawl structures 10.

The control system 70 carries out the given calculations or the like according to the damping control program stored in the storage portion thereof, whereby the controls of the solenoid changeover valves 52, the supplying flow control valves 61 and the retracting flow control valves 62 by the damping control portion 73 are performed. Briefly, in the damping control of the pawl structures 10, the directions and the largeness of the biasing forces for the pawl structures 10 by the respective cylinder mechanisms 30 are controlled, so that the damping forces on the respective pawl structures 10 calculated by the damping force calculating portion 72 exert the respective pawl structures 10, by the controls of the respective solenoid changeover valves 52, the respective supplying flow control valves 61 and the respective retracting flow control valves 62, using the damping control portion 73.

In the controls for the solenoid changeover valves 52 by the damping control portion 73, the flow passages (the positions of the solenoid changeover valves 52) are switched, so that the directions of the biasing forces acting on the pawl structures 10 by the cylinder mechanisms 30 become the directions of the damping forces calculated by the damping force calculating portion 72 (the directions opposite to the ones of the excitation forces calculated by the excitation force calculating portion 71.

Therefore, when the directions of the damping forces calculated by the damping force calculating portion 72 are the ones pulling the pawl structures 10 (− direction in the X-axis), the damping control portion 73 switches the solenoid changeover valves 52 to the positions P1. Meanwhile, the directions of the damping forces calculated by the damping force calculating portion 72 are the ones pushing the pawl structures 10 (+ direction in the X-axis), the damping control portion 73 switches the solenoid changeover valves 52 to the positions P2.

In the controls for the supplying flow control valves 61 and the retracting flow control valves 62 by the damping control portion 73, the valve opening degrees of the respective flow control valves 61, 62 are controlled, so that the largeness of the biasing forces acting on the pawl structures 10 by the cylinder mechanisms 30 are the ones of the damping forces calculated by the damping force calculating portion 72 (the same largeness as the excitation forces calculated by the excitation force calculating portion 71).

The largeness of the biasing forces acting on the pawl structures 10 by the cylinder mechanisms 30 are the ones of the forces acting on the piston portions 14 of the pawl structures 10 by the cylinder mechanisms 30. The values of the forces acting on the piston portions 14 are schematically calculated by the multiplications of the pressures (the hydraulic pressures) acting on the piston portions 14 and the effective areas in the piston portions 14.

Therefore, when the biasing forces for the pawl structures 10 by the cylinder mechanisms 30 exert in the directions pulling the pawl structures 10, the largeness of the biasing forces are calculated by the multiplications of the pressures acting from the first cylinder chambers 31a to the piston portions 14 and the areas (the effective areas) of the surfaces 14a on the sides forming the first cylinder chambers 31a of the piston portions 14 (see FIG. 11 (a)). When the biasing forces for the pawl structures 10 by the cylinder mechanisms 30 exert in the directions pushing the pawl structures 10, the largeness of the biasing forces are calculated by the multiplications of the pressures acting from the second cylinder chambers 31b to the piston portions 14 and the areas (the effective areas) of the surfaces 14b on the sides forming the second cylinder chambers 31b of the piston portions 14 (see FIG. 11 (a)).

Briefly, the pressures acting on the piston portions 14 are controlled, so that the largeness of the biasing forces acting on the pawl structures 10 by the cylinder mechanisms 30 become the ones of the damping forces calculated by the damping force calculating portion 72. The pressures acting on the piston portions 14 are adjusted by controlling the flow rates of the oils due to the supplying flow control valves 61 and the retracting flow control valves 62. Hereinafter, with regard to the pressures acting on the piston portions 14, the pressures that the largeness of the biasing forces acting on the pawl structures 10 by the cylinder mechanisms 30 become the ones of the damping forces calculated by the damping force calculating portion 72 are defined as "the adjustment pressures".

In other words, the damping control portion 73 adjusts the valve opening degrees of the supplying flow control valves 61 and the retracting flow control valves 62, so as to exert the adjustment pressures on the piston portions 14. The adjustment pressures exerting on the piston portions 14 include friction resistances of the piston portions 14 in the cylinder mechanisms 30, back pressure resistances so as to flow out the oils retracted from one cylinder chamber or the like.

In the controls (the adjustments of the valve opening degrees) of the supplying flow control valves 61 and the retracting flow control valves 62 by the damping control portion 73, the discharge pressure of the oil pump 55, the pressure losses in the pipings forming the respective oil passages of the first oil passage 53a, the second oil passage 53b, the supplying oil passage 54a and the retracting oil passage 54b, the diameters of the pipings forming the respective oil passages or the like are considered.

In other words, the damping control portion 73 calculates the valve opening degrees of the respective supplying flow control valves 61 and the retracting flow control valves 62, based on the respective values of the effective areas of the piston portions 14 (the areas of the above-mentioned surfaces 14a, 14b), the discharge pressure of the oil pump 55, the pressure losses and the diameters in the pipings forming the respective oil passages, or the like, and controls the respective flow control valves 61, 62 so that they have calculated valve opening degrees. Incidentally, the respective values of the effective areas of the piston portions 14 or the like are preliminarily set up and memorized at the storage portion thereof or the like in the control system 70 when needed.

The controls of the solenoid changeover valves 52, the supplying flow control valves 61 and the retracting flow control valves 62 by the damping control portion 73 as described above are independently performed for the respective valves provided with the respective cylinder mechanisms 30. More specifically, the damping control portion 73 controls the first solenoid changeover valve 52a, the first supplying flow control valve 61a and the first retracting flow control valve 62a provided with the first cylinder mechanism 30a, with respect to the damping control for the first pawl structure 10a. Similarly, the damping control portion 73 controls the second solenoid changeover valve 52b, the second supplying flow control valve 61b and the second retracting flow control valve 62b provided with the second cylinder mechanism 30b, with respect to the damping control for the second pawl structure 10b. The damping control portion 73 controls the second solenoid changeover valve 52b, the second supplying flow control valve 61b and the second retracting flow control valve 62b provided with the second cylinder mechanism 30b, with respect to the damping control for the second pawl structure 10b. The damping control portion 73 controls the third solenoid changeover valve 52c, the third supplying flow control valve 61c and the third retracting flow control valve 62c provided with the third cylinder mechanism 30c, with respect to the damping control for the third pawl structure 10c.

Thus, the damping control portion 73 functions as the damping control means for controlling the solenoid changeover valves 52, the supplying flow control valves 61 and the retracting flow control valves 62, so that the damping forces calculated by the damping force calculating portion 72 exert the pawl structures 10. Specifically, the control system 70 performs the predetermined calculations according to the damping control program stored in the storage portion thereof, whereby the damping control portion 73 functions as damping control means.

Figure 12:
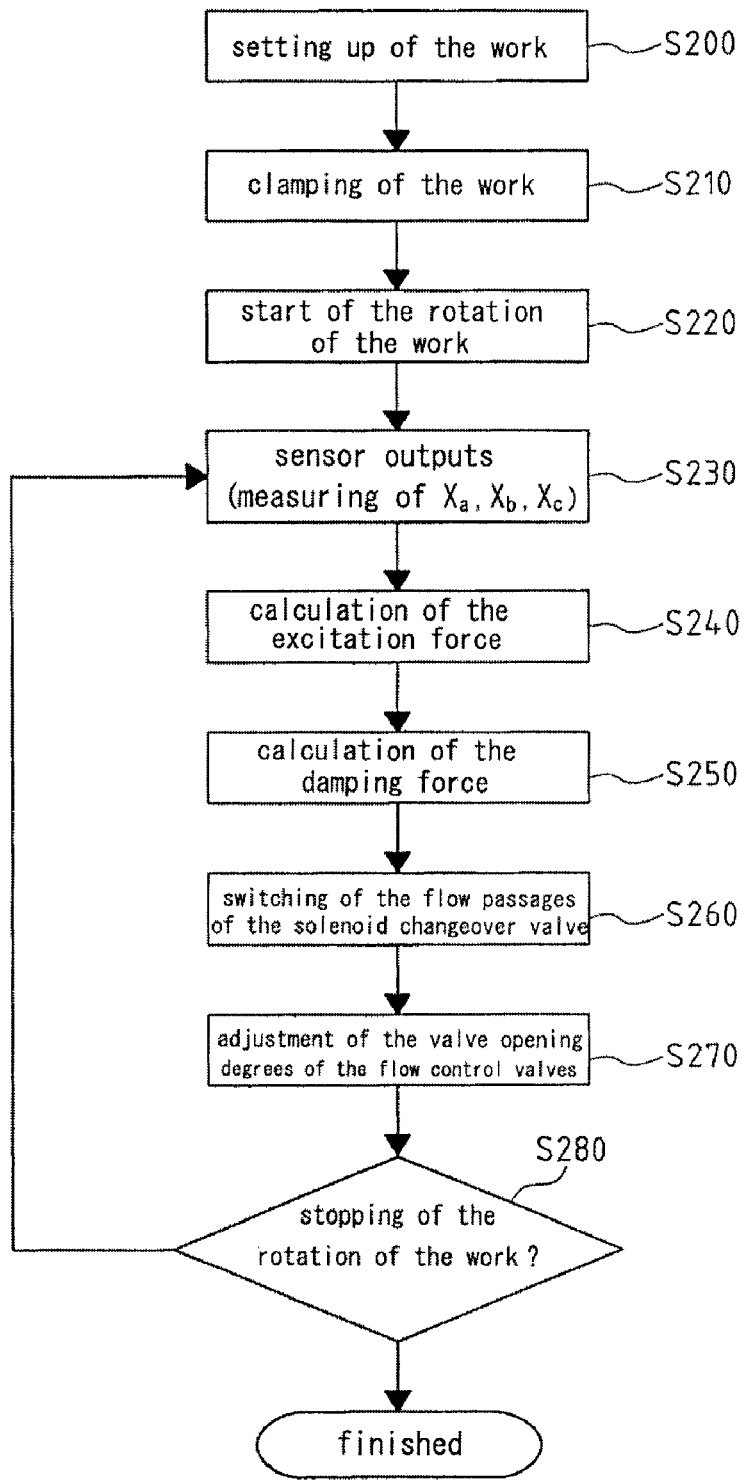
FIG. 12 is a flow diagram of the damping control for the pawl structure according to the first embodiment.

The damping control for the pawl structure 10 will be described, with reference to the flow diagram on the damping control for the pawl structure 10 as shown in FIG. 12.

In the damping control for the pawl structure 10, first the work 20 is set up (Step S200). Briefly, the flange portion 24a of the center housing 24 in the work 20 is fixed into the supporting recessed portion 3b forming the supporting surface 3a in the turbine housing portion 3, so that the work 20 is supported on the supporting surface 3a.

After the work 20 has been set up, the work 20 is on the clamped condition by the respective pawl structures 10 (Step S210). Specifically, the pressure oils are supplied from the oil tank 56 to the first cylinder chambers 31a of the respective cylinder mechanisms 30 using the oil pump, whereby the respective pawl structures 10 are pulled and moved to the work fixing directions, so as to be on the engaged condition on the work 20 set up and to be biased to the work fixing directions. Accordingly, the clamping for the work 20 is finished.

In this regard, when the attitude control for the work 20 as mentioned above is performed, the clamping for the work 20 at the Step S210 corresponds to that of the Step S160 in the flow diagram as shown in FIG. 4. In this case, the solenoid valves 35 disposed with the respective cylinder mechanisms 30 (see FIGS. 1 and 3) are provided with the first oil passages 53a or the supplying oil passages 54a as the pipings so as to supply the pressure oils to the first cylinder chambers 31a.

When the clamping of the work 20 has been finished at the Step S210, the respective solenoid changeover valves 52 are on the position PN by the control system 70. In other words, when the clamping of the work 20 has been finished, the supply/discharge of the oils are blocked in the respective cylinder mechanisms 30 and the oil pressures of the first cylinder chambers 31a and the second cylinder chambers 31b in the respective cylinder mechanisms 30 are constantly retained.

When the clamping of the work 20 has been finished, the rotation of the work rotating portion is started (Step S220). In other word, the same compressed air as the discharge air from the engine is supplied to the turbine housing portion 3, and, via the turbine rotor 22, the work rotating portion including it is rotated at the unbalance correction rotation numbers.

When the work rotating portion is rotated at the unbalance correction rotation numbers, the sensor outputs are performed from the respective displacement sensors 50, and the displacements Xa, Xb and Xc due to the vibrations of the respective pawl structures 10 are measured, based on the sensor outputs (Step S230). In other words, after the work 20 has been on the clamped condition, the largeness of the gaps G2 in the respective pawl structures 10 are measured based on the detection signals from the respective displacement sensors 50. The displacements Xa, Xb and Xc due to the vibrations of the respective pawl structures 10 are measured, based on the measurements on the largeness of the gaps G2 in the respective pawl structures 10.

Subsequently, the excitation forces acting on the respective pawl structures 10 with the rotation of the work rotating portion are calculated, using the displacements Xa, Xb and Xc due to the vibrations of the respective pawl structures 10 measured at the Step S230 (Step S240). Specifically, the excitation forces acting on the respective pawl structures 10 clamping the work 20 are calculated, using the aforementioned formulas (3) to (5), based on the displacements Xa, Xb and Xc due to the vibrations of the respective pawl structures 10, the total mass m1, m2, m3, the total damping c1, c2, c3, and the total rigidity k1, k2, k3 of the respective pawl structures 10 by the excitation force calculating portion 71. In this regard, the X in the formula (3) corresponds to the displacement Xa due to the vibration of the first pawl structure 10a, and the X in the formula (4) corresponds to the displacement Xb due to the vibration of the second pawl structure 10b, as well as the X in the formula (5) corresponds to the displacement Xc due to the vibration of the third pawl structure 10c.

Next, the damping forces acting on the respective pawl structures 10 are calculated, using the excitation forces calculated at the Step S240 (Step S250). Briefly, by the damping force calculating portion 72, the damping forces acting on the respective pawl structures 10 are calculated, as the forces counteracting the excitation forces, based on the excitation forces acting on the respective pawl structures 10.

The switchings of the flow passages in the respective solenoid changeover valves 52 are performed, so that the damping forces calculated at the Step S250 exert the respective pawl structures 10 (Step S260). That is, the respective solenoid changeover valves 52 are switched at the position P1 or P2 by the damping control portion 73 so that the directions of the biasing forces acting on the respective pawl structures 10 by the cylinder mechanisms 30 become the ones of the damping forces calculated, whereby the switchings of the flow passages are performed.

The valve opening degrees of the respective supplying flow control valves 61 and the respective retracting flow control valves 62 are adjusted, so that the damping forces calculated at the Step S250 exert the respective pawl structures 10 (Step S270). Briefly, the valve opening degrees of the respective supplying flow control valves 61 and the respective retracting flow control valves 62 are adjusted by the damping control portion 73, so that the largeness of the biasing forces acting on the respective pawl structures 10 by the cylinder mechanisms 30 become the ones of the damping forces calculated (so that the pressures acting on the piston portions 14 become the above-mentioned adjustment pressures), whereby the adjustments of the flow rates are performed.

The controls for the respective solenoid changeover valves 52, the respective supplying flow control valves 61 and the respective retracting flow control valves 62, based on the detection signals from the displacement sensors 50 as mentioned before (Steps, S230 to S270), i.e., the damping controls for the respective pawl structures 10 are performed, until the rotation of the work rotating portion is stopped (Step S280). In this respect, the stopping of the rotation of the work rotating portion is detected by the rotation sensor 57.

Thus, by the damping control for the respective pawl structures 10, the reduction of the productivity in the production line of the turbocharger 2 can be prevented, and the vibrations of the respective pawl structures 10 as the members for fixing the work 20 on the turbine housing portion 3 can be restrained, thereby enhancing the accuracy in the unbalance correction.

More specifically, as mentioned above, the reduction of the productivity in the production line of the turbocharger 2 can be prevented, using the clamp method by the pawl structures 10 for fixing the work 20 on the turbine housing portion 3.

The vibrations of the respective pawl structures 10 as the members for fixing the work 20 on the turbine housing portion 3 can be reduced, whereby the claming force for the work 20 (the force that the work 20 is pressed on the turbine housing portion 3) can be stabilized, so as to prevent the work 20 from vibrating largely with the rotation of the work rotating portion. As a result, the accuracy in the unbalance correction for the work 20 can be improved.

Incidentally, the unbalance correction device 1 of the present embodiment includes the displacement sensors 50 comprised as the contact-free gap sensors, as the displacement detecting means provided with the respective pawl structures 10, but the displacement detecting means are not limited to this. As the displacement detecting means, the means that are provided with the respective pawl structures 10 and detect the displacements in the moving directions due to the vibrations of the pawl structures 10 clamping the work 20 on the turbine housing portion 3 to the device body with the rotation of the work rotating portion may be utilized.

As the displacement detecting means, for example, the other straight line position sensors, such as proximity switch or contact gap sensors, may be utilized, as long as they have enough accuracies (for example, the accuracies in the order of a few μm to a few dozens μm) to detect the displacements due to the vibrations of the pawl structures 10 clamping the work 20.

The unbalance correction device 1 of the present embodiment includes the solenoid changeover valves 52 comprised as the solenoid control four ports changeover valves, as the direction switching means provided with the respective cylinder mechanisms 30, but the direction switching means are not limited to them. As the direction switching means, the means that are provided with the respective cylinder mechanisms 30 and switch the moving and biasing directions in the moving directions of the pawl structures 10 by the cylinder mechanisms 30 may be utilized.

As the direction switching means, for example, the changeover valves having other constructions, such as the pilot operated changeover valves may be utilized.

The unbalance correction device 1 of the present embodiment includes the supplying flow control valves 61 and the retracting flow control valves 62 comprised as one-way restrictors having check valves, as the biasing force control means provides with the respective cylinder mechanisms 30, but the biasing force control means are not limited to them. As the biasing force control means, the means that are provided with the respective clamping members 30 and control the biasing forces biasing the pawl structures 10 by the cylinder mechanisms 30, in the moving and biasing directions of the pawl structures 10 defined by the solenoid changeover valves 52 may be utilized.

As the biasing force control means, for example, the flow control valves having other constructions, such as the flow control valves may be utilized.

The second embodiment of the unbalance correction device according to the present invention will be described. Incidentally, the descriptions of the portions common to the unbalance correction device 1 of the first embodiment are arbitrarily abbreviated, using the same referential marks or the like.

Figure 13:
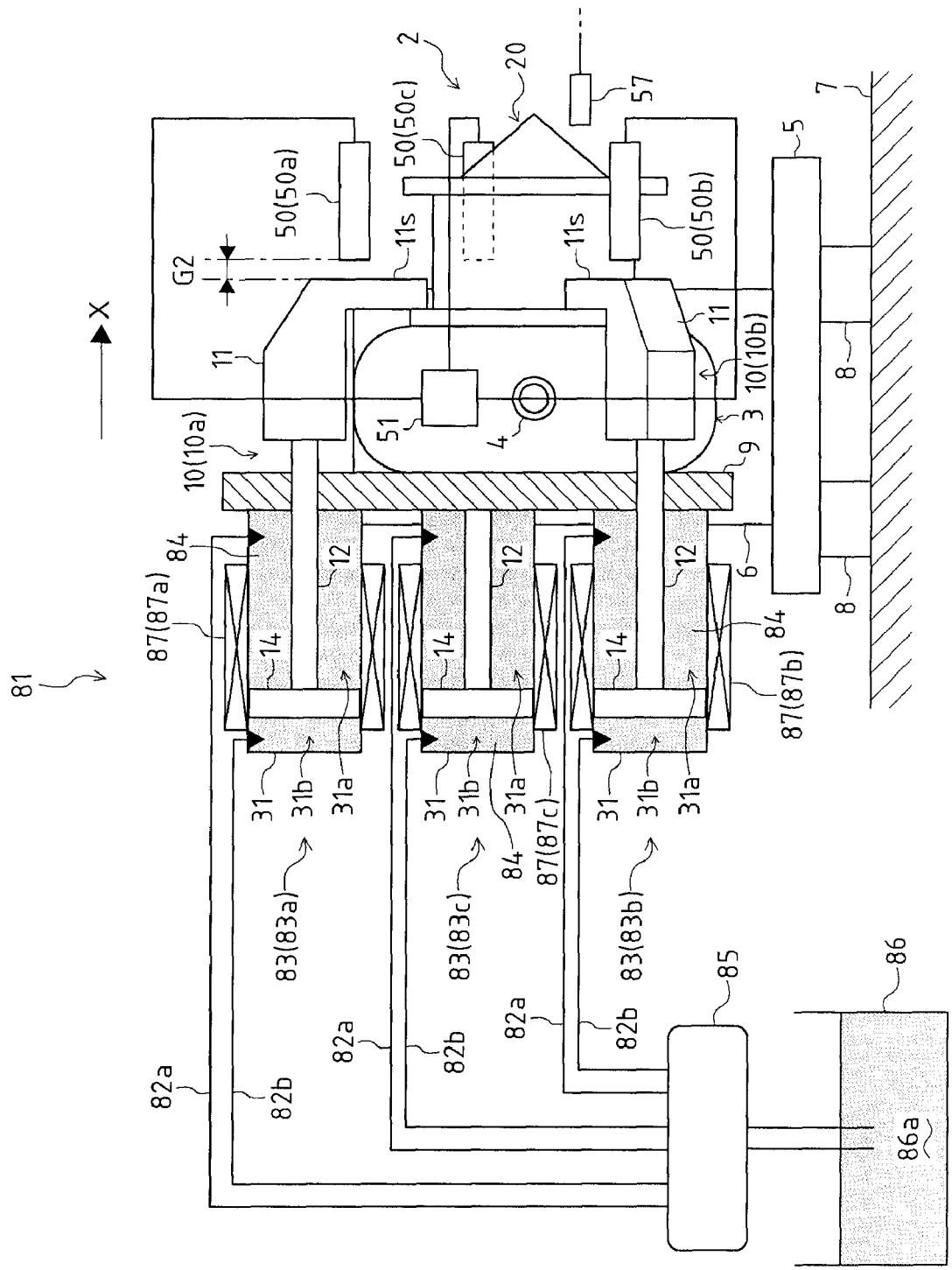
FIG. 13 is a diagram showing a device configuration for damping control of the pawl structure in the unbalance correction device according to the second embodiment of the present invention.

As shown in FIG. 13, an unbalance correction device 81 according to the present embodiment includes magnetic fluid cylinder mechanisms 83 comprised as fluid pressure cylinder mechanisms using magnetic fluid as working fluids, in place of the cylinder mechanisms 30 in the unbalance correction device 1 of the first embodiment as described above. Specifically, the magnetic fluid cylinder mechanisms 83, which are provided with the respective pawl structures 10, function as the moving and biasing means for moving the pawl structures 10 in the moving directions and for biasing the pawl structures 10 on the engaged condition to the work fixing directions.

In the magnetic fluid cylinder mechanisms 83, magnetic fluid 84 are used, as the working fluids filled in the cylinder cases 31 forming the first cylinder chambers 31a and the second cylinder chambers 31b via the piston portions 13 of the rod portions 12 in the pawl structures 10.

In this regard, the magnetic fluid means the fluids having both behaviors of liquidities as liquid property and ones as magnetic body. Specifically, in the magnetic fluid, magnetic microparticles having approximately 10 nm in diameter, such as magnetite, ferrite such as manganese-zinc ferrite, iron, nickel, cobalt are diffused into solvent such as water, organic solvent, paraffin, by the action of surfactant agent.

The magnetic fluid cylinder mechanisms 83 are constituted as the double-acting cylinders similar to the cylinder mechanisms 30. More specifically, as shown in FIG. 13, the first cylinder chambers 31a in the magnetic fluid cylinder mechanism 83 are continuously connected at the doorways of the magnetic fluid thereof to the first flow passages 82a. The supplies of the magnetic fluid to the first cylinder chambers 31a and the discharges (the retractions) of the magnetic fluid 84 from the first cylinder chambers 31a are performed, via the first flow passages 82a. Similarly, the second cylinder chambers 31b are continuously connected at the doorways of the magnetic fluid thereof to the second flow passages 82b. The supplies of the magnetic fluid to the second cylinder chambers 31b and the discharges (the retractions) of the magnetic fluid 84 from the second cylinder chambers 31b are performed, via the second flow passages 82b.

As shown in FIG. 13, the first flow passages 82a and the second flow passages 82b provided with the respective magnetic fluid cylinder mechanisms 83 are connected via a pump 85 to a tank 86. In other words, magnetic fluid 86a are stored in the tank 86, and the stored magnetic fluid 86a are supplied via the first flow passages 82a or the second flow passages 82b to the respective magnetic fluid cylinder mechanisms 83, using the pump 85. The magnetic fluid returned from the magnetic fluid cylinder mechanisms 83 are retracted via the first flow passages 82a or the second flow passages 82b to the tank 86.

Hereinafter, when three magnetic fluid cylinder mechanisms 83 are distinctly described according to the pawl structures 10 supporting in the moving and biasing manner, the magnetic fluid cylinder mechanism 83 supporting the first pawl structure 10a in the moving and biasing manner is defined as "the first magnetic fluid cylinder mechanism 83a", and the magnetic fluid cylinder mechanism 83 supporting the second pawl structure 10b in the moving and biasing manner is defined as "the second magnetic fluid cylinder mechanism 83b", as well as the magnetic fluid cylinder mechanism 83 supporting the third pawl structure 10c in the moving and biasing manner is defined as "the third magnetic fluid cylinder mechanism 83c".

Thus, in the unbalance correction device 81 equipped with the magnetic fluid cylinder mechanisms 83 as constructions supporting the pawl structures 10 in the moving and biasing manner, during the unbalance correction, the damping controls for restraining the natural frequencies (behaviors) of the respective pawl structures 10 to the device body are performed, by acting the damping forces due to the viscous resistances of the magnetic fluid in the magnetic fluid cylinder mechanisms 83 on the respective pawl structures 10, as the forces counteracting the excitation forces acting on the respective pawl structures 10 with the rotation of the work rotating portion. This is based on the following principle and behaviors of the magnetic fluid.

More specifically, the pawl structures 10 supported via the magnetic fluid 84 into the cylinder cases 31 in the magnetic fluid cylinder mechanisms 83 receive the viscous resistances caused by the relative movements thereof to the magnetic fluid 84, due to the vibrations thereof. The viscous resistances convert the kinetic energies of the pawl structures 10 into the heat energies, and act the damping forces on the pawl structures 10. Therefore, the viscous resistances to the pawl structures 10, i.e., the largeness of the damping forces exerting the pawl structures 10 are varied, by the changes in the viscosities of the magnetic fluid 84.

Meanwhile, the magnetic fluid changes the fluidities, i.e., the viscosities (the apparent viscosities) in accordance with the intensities of applied magnetic field, as behaviors thereof. This is based on the fact that when the flowing magnetic fluid receives the actions of magnetic field, the particles move to be chained in the directions of magnetic field, due to the magnetic dipole interaction of the magnetic microparticles.

Consequently, the unbalance correction device 1 of the present embodiment applies the magnetic field to the magnetic fluid 84 into the cylinder cases 31 in the cylinder mechanisms 83 and changes the intensities of the magnetic field so as to change the apparent viscosities of the magnetic fluid 84, as well as the device 1 acts the damping forces counteracting the excitation forces acting on the respective pawl structures 10 with the rotation of the work rotating portion, thereby performing the damping controls for restraining the vibrations of the respective pawl structures 10. The unbalance correction device 81 of the present embodiment comprises the following constructions so as to perform the damping controls for the respective pawl structures 10.

As shown in FIG. 13, in the unbalance correction device 81, the respective pawl structures 10 are provided with the displacement sensors 50. In other words, the unbalance correction device 81 of the present embodiment includes three displacement sensors 50. Incidentally, in FIG. 13, for convenience of explanation, the position of the third magnetic fluid cylinder mechanism 83c in the unbalance correction device 81 is represented at slightly different spaces from the original position (see FIG. 2). The displacement sensors 50 provided with the unbalance correction device 81 of the present embodiment, which are common portions to the unbalance correction device 1 of the first embodiment, will be not described.

As shown in FIG. 13, in the unbalance correction device 81, the respective magnetic fluid cylinder mechanisms 83 have cylinder coils 87. In other words, the unbalance correction device 81 of the present embodiment has three cylinder coils 87.

The cylinder coils 87 are so-called solenoid coils and are provided to be wound around the cylinder cases 31. Briefly, when the electric currents are carried on the cylinder coils 87, the magnetic field are applied to the magnetic fluid 84 into the cylinder cases 31 in the axial directions of the cylinder cases 31 (in the lateral directions in FIG. 13).

The largeness of the electric currents (The current value) carrying on the cylinder coils 87 are changed, whereby the intensities of magnetic field applied to the magnetic fluid 84 into the cylinder cases 31 are varied. Accordingly, the apparent viscosities (the fluidities) of the magnetic fluid 84 into the cylinder cases 31 are changed, thereby varying the largeness of the damping forces acting on the vibrating pawl structures 10.

Thus, the cylinder coils 87 are provided with the respective magnetic fluid cylinder mechanisms 83 and function as the magnetic field applying means for applying the magnetic field to the magnetic fluid 84.

Hereinafter, when three cylinder coils 87 are distinctly described according to the magnet fluid cylinder mechanisms 83 provided, the cylinder coil 87 provided with the first magnet fluid cylinder mechanism 83a is defined as "the first cylinder coil 87a", and the cylinder coil 87 provided with the second magnet fluid cylinder mechanism 83b is defined as "the second cylinder coil 87b", as well as the cylinder coil 87 provided with the third magnet fluid cylinder mechanism 83c is defined as "the third cylinder coil 87c".

The control construction of the pawl structures 10, in the unbalance correction device 81 of the present embodiment equipped with the above-mentioned constructions, will be described, with reference to FIG. 14.

Figure 14:
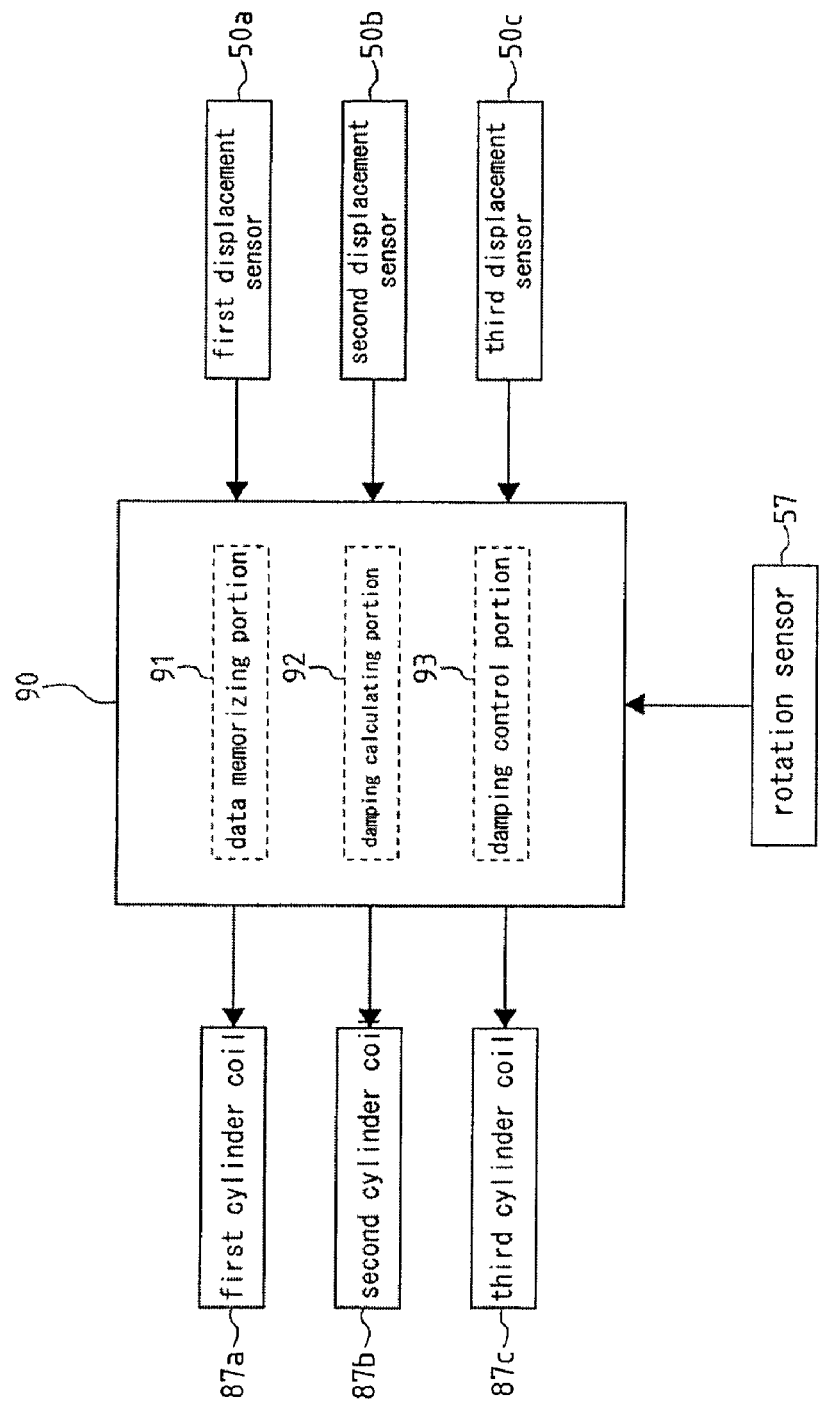
FIG. 14 is a diagram showing controlling construction for damping control of the pawl structure in the unbalance correction device according to the second embodiment of the present invention.

As shown in FIG. 14, the unbalance correction device 81 of the present embodiment includes a control system 90 for performing the damping control of the pawl structures 10. The control system 90 controls the intensities of magnetic field applied to the magnetic fluid 84 in the cylinder cases 31 by the respective cylinder coils 87 based on the detection signals output from the respective displacement sensors. Substantively, the intensities of magnetic field applied to the magnetic fluid 84 in the cylinder cases 31 by the respective cylinder coils 87 are controlled, by adjusting the largeness of electric currents (the current values) supplied (input) from the control system 90 to the cylinder coils 87. Accordingly, the damping forces acting on the pawl structures 10 in the magnetic fluid cylinder mechanisms 83 are controlled, thereby damping the vibrations of the pawl structures 10 to the device body (the turbine housing portion 3).

The control system 90 is connected to the respective displacement sensors 50 via signal line or the like. The control system 90 is connected to the respective cylinder coils 87 via lead wires or the like. The control system 90 receives signals on displacements due to the vibrations of the pawl structures 10 clamping the work 20, detected by the respective displacement sensors 50. Accordingly, the control system 90 acquires information on the displacements due to the vibrations of the pawl structures 10 clamping the work 20. The control system 90 supplies electric currents to the respective cylinder coils 87 and controls the largeness of the electric currents depending on those of the magnetic field applied to the magnetic fluid 84.

The control system 90 independently controls the electric currents supplied to the respective cylinder coils 87, based on the detection signals from the respective displacement sensors 50. More specifically, the control system 90 controls the electric currents supplied to the first cylinder coil 87a, based on the detection signal from the first displacement sensor 50a, and controls the electric currents supplied to the second cylinder coil 87b, based on the detection signal from the second displacement sensor 50b, as well as controls the electric currents supplied to the third cylinder coil 87c based on the detection signal from the third displacement sensor 50c. Accordingly, the magnetic fluid cylinder mechanisms 83, which acts the pawl structures 10 clamping the work 20 on the damping forces due to the vibrations thereof, are independently controlled, thereby damping the vibrations of the respective pawl structures 10 to the device body (the turbine housing portion 3).

The control system 90 is connected to the rotation sensor 57. The control system 90 receives a signal on rotational displacement (rotational angle) of the work rotating portion in the work 20 on the clamped condition, detected by the rotation sensor 57. Accordingly, the control system 90 acquires information on the rotational displacement (the rotational angle) of the work rotating portion in the work 20 on the clamped condition.

The control system 90 has a storage portion which stores a program or the like, an expanding portion which expands the program or the like, a calculating portion which performs the predefined calculation according to the program or the like, a filing portion which files the calculated results or the like by the calculating portion, a measuring portion which measures the displacements due to the vibrations of the pawl structures 10 clamping the work 20 or the like, based on the detection signals output from the displacement sensors 50, a power supplying portion which supplies (input) the electric currents to the cylinder coils 87. The program or the like stored in the storage portion include after-mentioned damping calculation program, a damping control program and data on the relationship between the intensities of the magnetic field applied to the magnetic fluid 84 by the cylinder coils 87 and the total damping (the damping coefficient) of the pawl structures 10 in the moving directions.

As the control system 90, specifically, the construction that a CPU, a ROM, a RAM, a HDD or the like are connected together with a bus, or the configuration making up of one-chip LSI or the like are utilized. The control system 90 of the present embodiment, which is exclusive goods, is also substitutable for the one which the aforementioned program or the like are stored in the commercially available personal computer, workstation and so forth.

The control system 90 has a data memorizing portion 91, a damping calculating portion 92 and a damping control portion 93.

The data memorizing portion 91 memorizes pre-calculated data on the relationship between the intensities of the magnetic field applied to the magnetic fluid 84 by the cylinder coils 87 and the total damping (the damping coefficient) (hereinafter, referred to as "data on the relationship between the intensities of the magnetic field and the damping".

The data memorizing portion 91 memorizes data on the relationship between electric current values I supplied to the cylinder coils 87 and viscosity μ of the magnetic fluid 84, as data on the relationship between the intensities of the magnetic field and the damping.

In other words, as mentioned above, the intensities of the magnetic field applied to the magnetic fluid 84 by the cylinder coils 87 depend on the largeness of the electric currents flowing along the cylinder coils 87. The damping coefficient due to the vibrations of the pawl structures 10 is a proportional constant to the vibration velocity on the damping forces (the viscous damping forces) acting on the vibrating pawl structures 10, and become the viscous resistance (the viscous damping) for the vibrating pawl structures 10, i.e., the viscosity (the viscous coefficient) μ of the magnetic fluid 84. In this regard, the data memorizing portion 91 memorizes the data on the relationship between the intensities of the magnetic field and the damping in the respective magnetic fluid cylinder mechanisms 83, as the pre-calculated data on the relationship between the electric current values I supplied to the cylinder coils 87 and the viscosity μ of the magnetic fluid 84 (hereinafter, referred to as "the relationship between the electric current values I and the viscosity μ".

Figure 15:
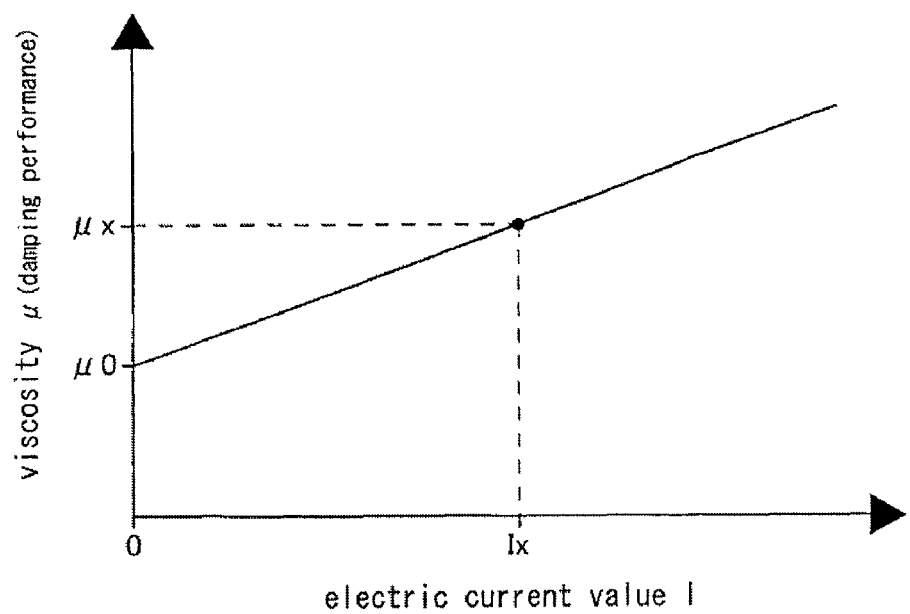
FIG. 15 is a diagram showing an example of a correlation between the current value I for supplying to a cylinder coil and the viscosity μ of a magnetic fluid.

The relationship between the electric current values I and the viscosity μ, for example, becomes the one as shown in FIG. 15. In this example, the relationship between the electric current values I and the viscosity μ is the proportional one, and the graph showing the relationship between the electric current values I and the viscosity μ becomes in a linear fashion. This is based on the fact that the magnetization curve showing the relationship between the magnetic field and the magnetization of the magnetic fluid 84, which shows non-ferromagnetic properties, becomes in a linear fashion. In other words, the magnetic field and the magnetization are proportional in the magnetic body, which shows non-ferromagnetic property. The magnetic field is substitutable for the supply currents to the cylinder coils 87 (the electric current values I), and the magnetization is substitutable for the viscosity μ of the magnetic fluid 84. Briefly, the magnetic fluid 84 used as the working fluids in the magnetic fluid cylinder mechanisms 83 of the present embodiment show non-ferromagnetic properties, and the relationship between the electric current values I and the viscosity μ becomes the proportional one, as shown in FIG. 15. The relationship between the electric current values I and the viscosity μ in the magnetic fluid 84 is preliminarily calculated, and is memorized as, for example, mapped data in the data memorizing portion 91. Thus, the data on the relationship between the intensities of the magnetic field and the damping are memorized as the ones on the relationship between the electric current value I and the viscosity μ of the magnetic fluid 84, in the data memorizing portion 91.

In this respect, as shown in FIG. 15, the viscosity μ0 when the electric current value I is zero is the one of the magnetic fluid 84 when the magnetic field is not applied to the magnetic fluid 84 in the respective magnetic fluid cylinder mechanisms 83 (during the non-magnetic field). In other words, the viscosity μ0 becomes the default value on the viscosity μ of the magnetic fluid 84.

The data memorizing portion 91 memorizes the data on the relationship between the electric current values I and the viscosity μ, in the respective magnetic fluid cylinder mechanisms 83.

More specifically, the data memorizing portion 91 memorizes the data on the relationship between the electric current value I supplied to the first cylinder coil 87a and the viscosity μ of the magnetic fluid 84 into the cylinder case 31 in the first magnetic fluid cylinder mechanism 83a, with respect to the first magnetic fluid cylinder mechanism 83a. Similarly, the data memorizing portion 91 memorizes the data on the relationship between the electric current value I supplied to the second cylinder coil 87b and the viscosity μ of the magnetic fluid 84 in the second magnetic fluid cylinder mechanism 83b, with respect to the second magnetic fluid cylinder mechanism 83b, and the data memorizing portion 91 memorizes the data on the relationship between the electric current value I supplied to the third cylinder coil 87c and the viscosity µ of the magnetic fluid 84 in the third magnetic fluid cylinder mechanism 83c, with respect to the third magnetic fluid cylinder mechanism 83c.

As described above, the data memorizing portion 91 functions as the memorizing means for memorizing the pre-calculated data on the relationship between the intensity of the magnetic field and the damping. Specifically, the control system 90 memorizes the data on the relationship between the intensity of the magnetic field and the damping in the ROM or the like, whereby the data memorizing portion 91 functions as the memorizing means.

The damping calculating portion 92 calculates the total damping (the damping coefficient) of the pawl structures 10 in the moving directions, by which the excitation forces acting on the pawl structures 10 in the moving directions with the rotation of the work rotating portion are counteracted, based on the displacements of the pawl structures 10 detected by the displacement sensors 50, as well as the total mass of the pawl structures 10 and the total rigidity of the pawl structures 10 in the moving directions.

The control system 90 performs the given calculations or the like according to the damping calculation program stored in the storage portion thereof, whereby the damping coefficients are calculated by the damping calculating portion 92. Briefly, in the damping control for the pawl structures 10, the total damping, by which the excitation forces acting on the respective pawl structures 10 clamping the work 20 with the rotation of the work rotating portion are counteracted, are calculated by the damping calculating portion 92. In other words, the damping coefficients of the pawl structures 10 correspond to the damping ones calculated by the damping calculating portion 92, so that the excitation forces acting on the pawl structures 10 are counteracted.

The respective values such as the displacements due to the vibrations of the pawl structures 10 detected by the displacement sensors 50, the total mass and the total rigidity of the pawl structures 10 are utilized for calculating the damping coefficients by the damping calculating portion 92. That is to say, the damping calculating portion 92 calculates the damping coefficients of the pawl structures 10, by which the excitation forces acting on the pawl structures 10 with the rotation of the work rotating portion are counteracted (by which the values of excitation forces become zero) (hereinafter, referred to as "the damping coefficients counteracting the excitation forces".

Therefore, the damping calculating portion 92 calculates the damping coefficients counteracting the excitation forces acting on the respective pawl structures 10, assuming that the excitation forces acting on the respective pawl structures 10 are zero, i.e, if the respective Fa, Fb, and Fc are the following values: Fa=0, Fb=0, Fc=0 in each of the aforementioned formulas (3) to (5). More specifically, the damping calculating portion 92 calculates the damping coefficients counteracting the excitation forces acting on the respective pawl structures 10, according to the following formulas (6) to (8) derived if the respective Fa, Fb, and Fc are the following values: Fa=0, Fb=0, Fc=0 in each of the aforementioned formulas (3) to (5), when the damping coefficient counteracting the excitation forces acting on the first pawl structure 10a is Ca, and the damping coefficient counteracting the excitation forces acting on the second pawl structure 10b is Cb, as well as the damping coefficient counteracting the excitation forces acting on the third pawl structure 10c is Cc.

[formula 5]
$$c_a = \left| \frac{-m1\ddot{X}_a - k1X_a}{\dot{X}_a} \right| \quad (6)$$

[formula 6]
$$c_b = \left| \frac{-m2\ddot{X}_b - k2X_b}{\dot{X}_b} \right| \quad (7)$$

[formula 7]
$$c_c = \left| \frac{-m3\ddot{X}_c - k3X_c}{\dot{X}_c} \right| \quad (8)$$

Incidentally, since the values of the damping coefficients Ca, Cb and Cc of the respective pawl structures 10 are the ones corresponding to the viscosities (the viscous coefficients) of the magnetic fluid 84 as mentioned above, they become absolute values (positive values).

Thus, the damping calculating portion 92 calculates the damping coefficients counteracting the excitation forces acting on the respective pawl structures 10, using the above-mentioned formulas (6) to (8), based on the respective values such as the displacements due to the vibrations of the pawl structures 10 detected by the displacement sensors 50, the total mass and the total rigidity of the pawl structures 10.

More specifically, the damping calculating portion 92 calculates the damping coefficient Ca counteracting the excitation forces acting on the first pawl structures 10a, using the formula (6), based on the displacement Xa detected by the displacement sensor 50, the mass m1 as the total mass and the spring constant k1 as the total rigidity, with respect to the first pawl structure 10a. Similarly, the damping calculating portion 92 calculates the damping coefficient Cb counteracting the excitation forces acting on the second pawl structures 10b, using the formula (7), based on the displacement Xb detected by the displacement sensor 50, the mass m2 as the total mass and the spring constant k2 as the total rigidity, with respect to the second pawl structure 10b. The damping calculating portion 92 calculates the damping coefficient Cc counteracting the excitation forces acting on the third pawl structures 10c, using the formula (8), based on the displacement Xc detected by the displacement sensor 50, the mass m3 as the total mass and the spring constant k3 as the total rigidity, with respect to the third pawl structure 10c.

The damping coefficients acting on the respective pawl structures 10 that receive the excitation forces with the rotation of the work rotating portion correspond to the damping ones calculated by the damping calculating portion 92 as described above, thereby changing the damping forces acting on the pawl structures 10 and counteracting the excitation forces acting on the pawl structures 10.

As seen from the above, the damping calculating portion 92 functions as the damping calculating means for calculating the total damping (the damping coefficients) of the pawl structures 10 in the moving directions, which counteract the excitation forces acting on the pawl structures 10 in the moving directions with the rotation of the work rotating portion, based on the displacements of the pawl structures 10 detected by the displacement sensors 50, as well as the total mass of the pawl structures 10 and the total rigidity of the pawl structures 10 in the moving directions. Specifically, the control system 90 performs the given calculations or the like according to the damping calculation program stored in the storage portion thereof, whereby the damping calculating portion 92 functions as the damping calculating means.

The damping control portion 93 controls the cylinder coils 87, so that the intensities of the magnetic field applied to the magnetic fluid 84 become the ones of the magnetic field corresponding to the total damping (the damping coefficients) calculated by the damping calculating portion 92, based on the data on the relationship between the intensities of the magnetic field and the damping memorized in the data memorizing portion 91.

The control system 90 performs the predetermined calculations or the like according to the damping control programs stored in the storage portion thereof, whereby, the aforementioned controls of the cylinder coils 87 by the damping control portion 93, specifically, the controls of the electric currents flowing along the cylinder coils 87 are performed. In other words, in the damping controls for the pawl structures 10, the largeness of the electric currents supplied to the respective cylinder coils 87 are controlled by the damping control portion 93, so that the intensities of the magnetic field applied to the magnetic fluid 84 in the cylinder cases 31 are controlled. Accordingly, the viscosities (the viscous coefficients) μ of the magnetic fluid 84, i.e., the damping coefficients are controlled, thereby controlling the largeness of the damping forces (the viscous damping forces) acting on the pawl structures 10 receiving the actions of the excitation forces.

When the cylinder coils 87 are controlled by the damping control portion 93, the data on the relationship between the electric current values I and the viscosities μ memorized in the data memorizing portion 91 are utilized, so that the electric current values I supplied to the cylinder coils 87 are calculated. As the viscosities μ corresponding to the electric current values I supplied to the cylinder coils 87, i.e., the damping coefficients, the values of the damping coefficients calculated by the damping calculating portion 92 are utilized. Specifically, as shown in FIG. 15, when the viscosities corresponding to the values of the damping coefficients calculated by the damping calculating portion 92 are μx, the electric currents of the electric current values Ix corresponding to the viscosities μx are supplied to the cylinder coils 87, based on the relationship between the electric current values I and the viscosities μ memorized in the data memorizing portion 91.

The electric currents of the electric current values corresponding to the values of the damping coefficients (the values of the viscosities) calculated by the damping calculating portion 92 flow along the cylinder coils 87, so that the intensities of the magnetic field applied to the magnetic fluid 84 become the ones of the magnetic field corresponding to the total damping (the damping coefficients) calculated by the damping calculating portion 92. Accordingly, the values of the damping forces (the viscous damping forces) acting on the pawl structures 10 become the ones counteracting the excitation forces acting on the pawl structures 10, due to the viscosity changes of the magnetic fluid 84.

The controls for the cylinder coils 87 by the damping control portion 93 as mentioned above are independently performed in each of the cylinder coils 87 provided with the respective magnetic fluid cylinder mechanisms 83. More specifically, the damping control portion 93 controls (the electric currents supplied to) the first cylinder coil 87a provided with the first magnetic fluid cylinder mechanism 83a, with respect to the damping control for the first pawl structures 10a. Similarly, the damping control portion 93 controls the second cylinder coil 87b provided with the second magnetic fluid cylinder mechanism 83b, with respect to the damping control for the second pawl structures 10b, and the damping control portion 93 controls the third cylinder coil 87c provided with the third magnetic fluid cylinder mechanism 83c, with respect to the damping control for the third pawl structures 10c.

Thus, the damping control portion 93 functions as the damping control means for controlling the cylinder coils 87, so that the intensities of the magnetic field applied to the magnetic fluid 84 become the one of the magnetic field corresponding to the total damping (the damping coefficients) calculated by the damping calculating portion 92. Specifically, the control system 90 performs the given calculations or the like according to the damping control programs stored in the storage portion thereof, whereby the damping control portion 93 functions as the damping control means.

Figure 16:
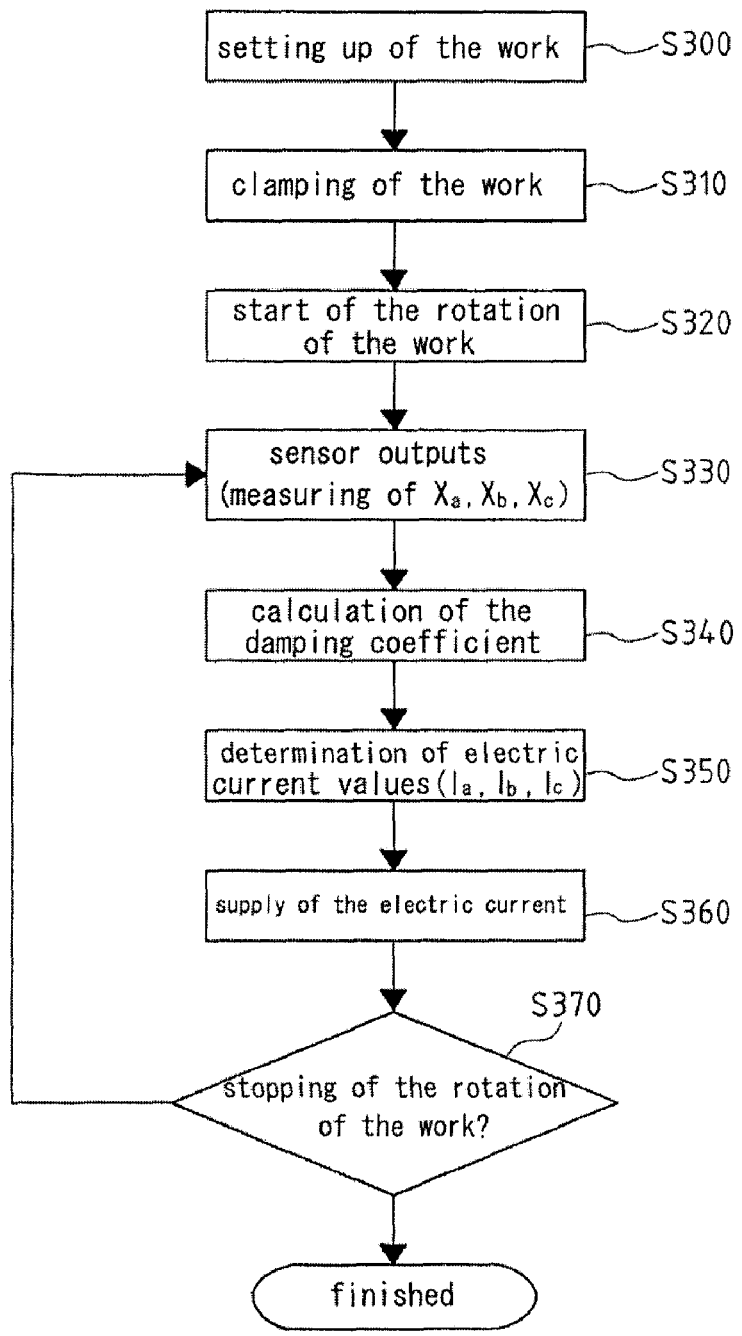
FIG. 16 is a flow diagram of the damping control for the pawl structure according to the second embodiment.
Figure 17:
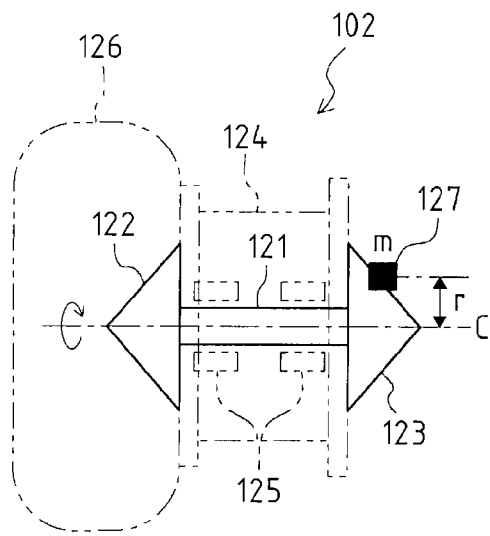
FIG. 17 is an illustration diagram for a generating mechanism of troubles caused due to the unbalance in a turbocharger.
Figure 17:
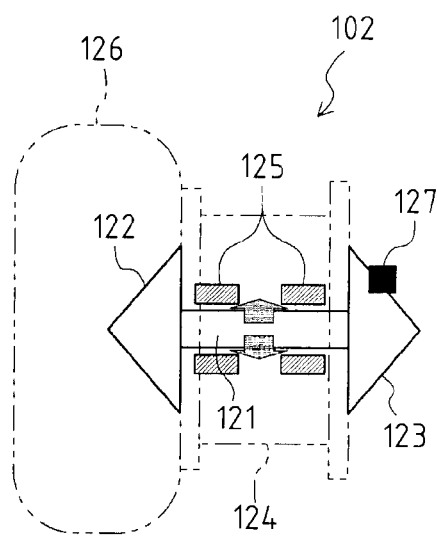
Figure 17:
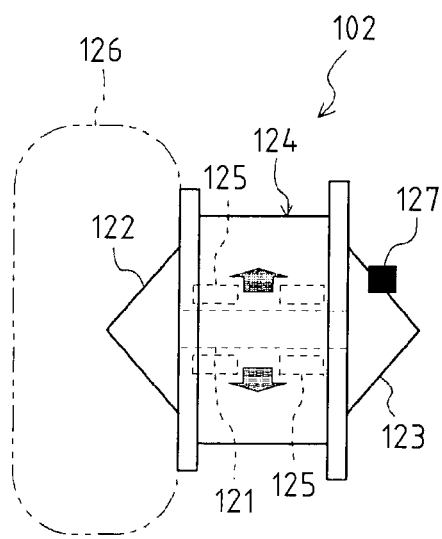
Figure 17:
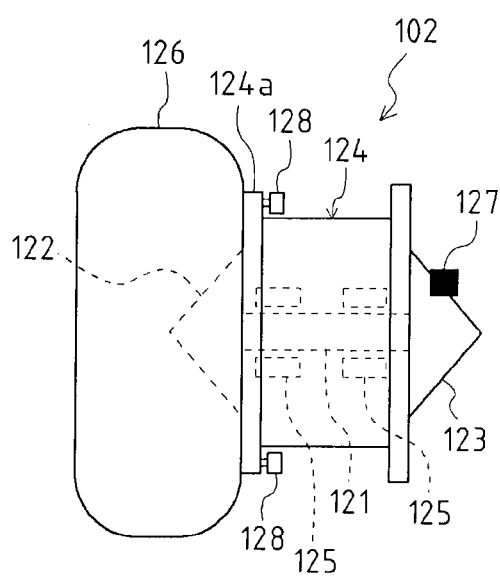
Figure 18:
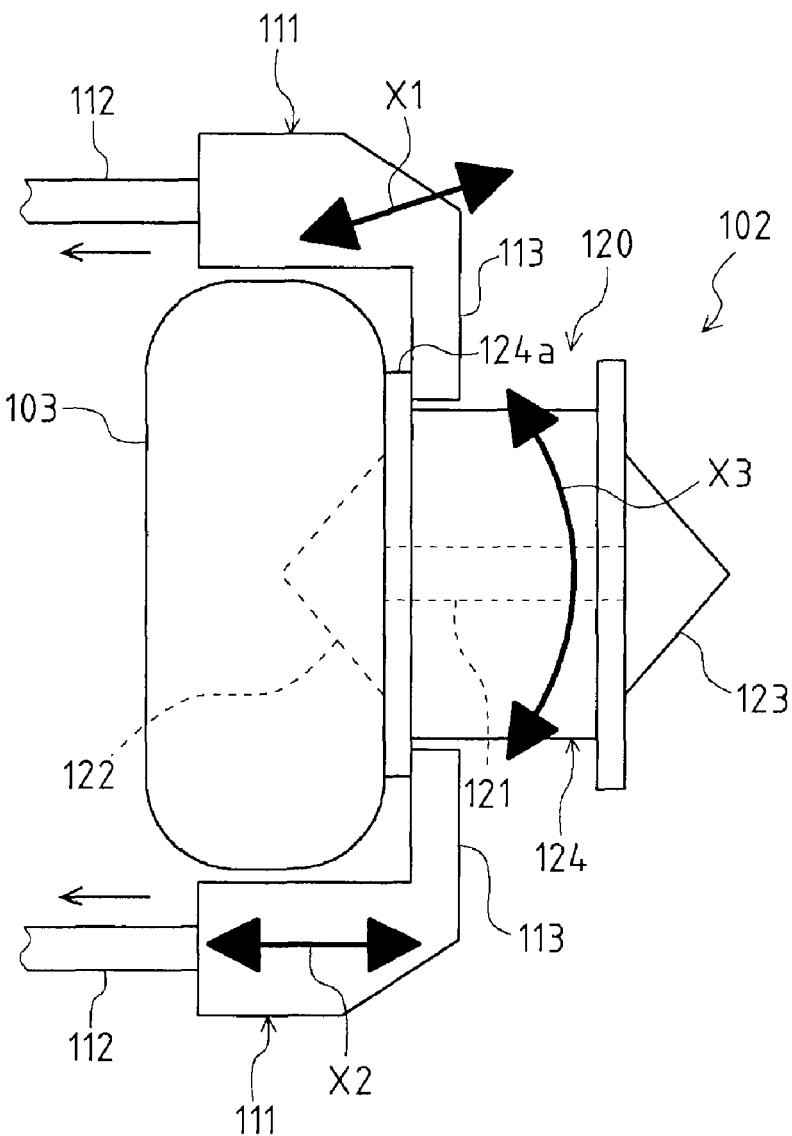
FIG. 18 is a diagram showing the condition of the turbocharger during the unbalance correction.
Figure 19:
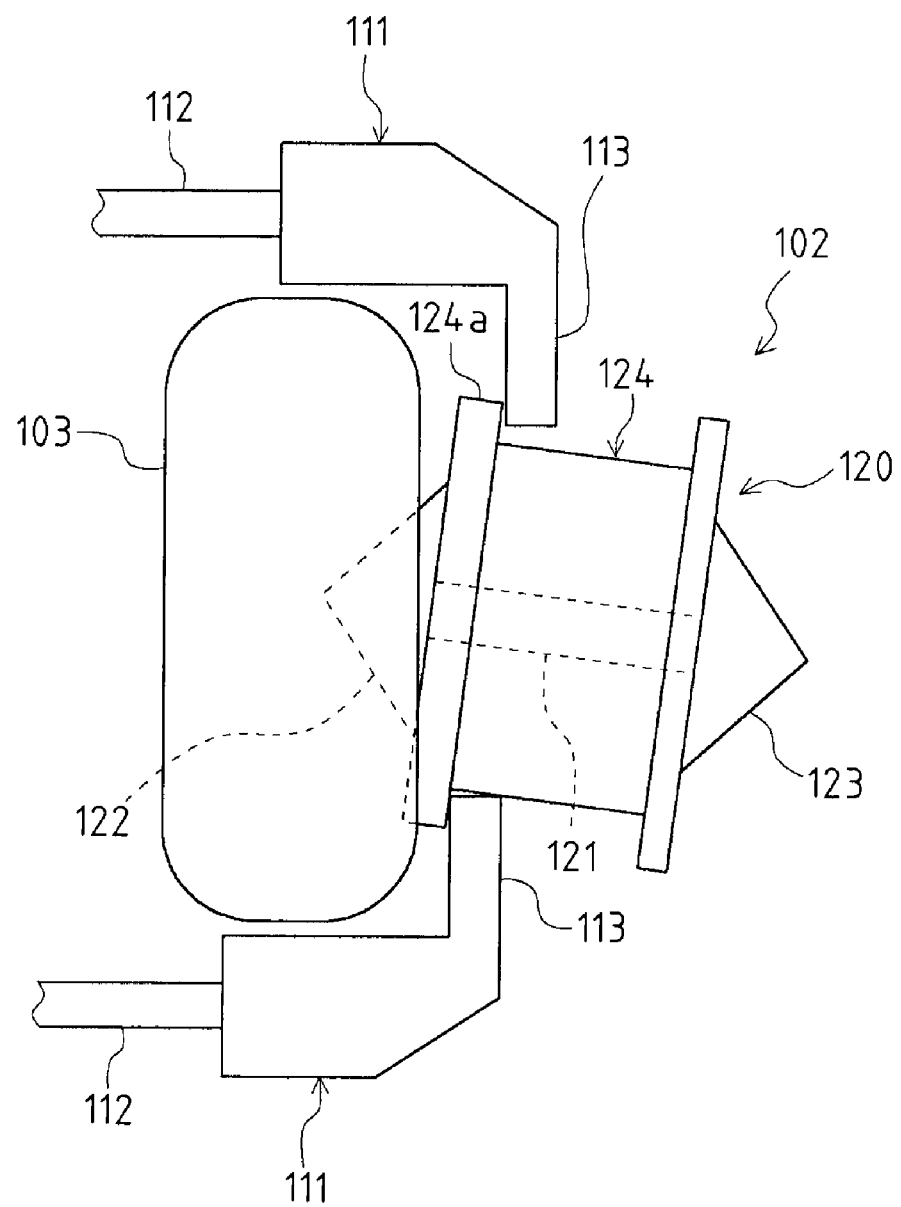
FIG. 19 is a diagram showing the tilt of the working position.

The damping controls for the pawl structures 10 will be described, with reference to the flow diagram of the damping control for the pawl structures 10 as shown in FIG. 16.

In the damping control for the pawl structure 10, first the work 20 is set up (Step S300). The work 20, which is set up, is on the clamped condition by the respective pawl structures 10 (Step S310). More specifically, the magnetic fluid are pumped from the tank 86 to the first cylinder chamber 31a the respective magnetic fluid cylinder mechanisms 83 using the pump 85, whereby the respective pawl structures 10 are pulled and moved to the work fixing directions, so as to be on the engaged condition to the work 20 set up and be biased to the work fixing directions. Accordingly, the clamping of the work 20 is finished.

In this regard, the clamping of the work 20 at the Step S310 corresponds to the one at the Step S160 in the flow diagram as shown in FIG. 4. In this case, the solenoid valves 35 provided with the respective magnetic fluid cylinder mechanisms 83 (see FIGS. 1 and 3) are provided with the first flow passage 82a as the piping for supplying the pressure oils to the first cylinder chamber 31a.

At the Step S310, when the clamping of the work 20 has been finished, the supplies/discharges of the magnetic fluid to the respective magnetic fluid cylinder mechanisms 83 are blocked by the valve mechanisms (not shown), and the pressures of the magnetic fluid into the first cylinder chamber 31a and the second cylinder chamber 31b in the respective magnetic fluid cylinder mechanisms 83 are kept constant.

After the clamping of the work 20 has been finished, the rotation of the work rotating portion is started (Step S320).

When the work rotating portion are rotated at the unbalance correction rotation numbers, the sensor outputs are performed from the respective displacement sensors 50, and the displacements Xa, Xb and Xc due to the vibrations of the respective pawl structures 10 are measured, based on the sensor outputs (Step S330).

Subsequently, the damping coefficients counteracting the excitation forces are calculated, based on the displacements Xa, Xb and Xc due to the vibrations of the respective pawl structures 10 measured at the Step S330 (Step S340). Specifically, by the damping calculating portion 92, damping coefficients ca, cb and cc counteracting the excitation forces acting on the respective pawl structures 10 are calculated, using the aforementioned formulas (6) to (8), based on the displacements Xa, Xb and Xc due to the vibrations of the pawl structures 10 detected by the displacement sensors 50, the total mass m1, m2 and m3 and the total rigidity k1, k2 and k3 of the respective pawl structures 10.

Next, the largeness of the electric currents supplied to the respective cylinder coils 87 are determined, according to the damping coefficients calculated at the Step S340 (Step S350). Specifically, the electric current values Ia, Ib and Ic corresponding to the values of the damping coefficients (the values of the viscosities) calculated by the damping calculating portion 92 are determined by the damping control portion 93, based on the data on the relationship between the electric current values I and the viscosities μ memorized in the data memorizing portion 91. In this regard, the electric current value Ia is the value of the first cylinder coil 87*a*, and the electric current value Ib is the value of the second cylinder coil 87*b*, as well as the electric current value Ic is the value of the third cylinder coil 87*c*.

The electric currents of the electric current values determined at the Step S350 are supplied to the respective cylinder coils 87 (Step S360). Specifically, from the power supplying portion in the control system 90, the electric current of the electric current value Ia is supplied to the first cylinder coil 87*a*, and the electric current of the electric current value Ib is supplied to the second cylinder coil 87*b*, as well as the electric current of the electric current value Ic is supplied to the third cylinder coil 87*c*, respectively.

Accordingly, the magnetic field are applied to the magnetic fluid 84 in the respective magnetic fluid cylinder mechanisms 83, and the viscosities of the magnetic fluid 84 are increased, thereby acting the damping forces (the viscous damping forces) on the respective pawl structures 10. In this respect, the intensities of the magnetic field applied to the magnetic fluid 84 are the ones of the magnetic field corresponding to the total damping (the damping coefficients) calculated by the damping calculating portion 92, and the damping forces acting on the respective pawl structures 10 become the largeness counteracting the excitation forces acting on the pawl structures 10.

The controls for (the electric currents supplied to) the respective cylinder coils 87 based on the detection signals from the displacement sensors 50 (Steps S330 to S360), i.e., the damping controls for the respective pawl structures 10 are performed, until the rotation of the work rotating portion is stopped (Step S370). In this respect, the stopping in the rotation of the work rotating portion is detected by the rotation sensor 57.

As described above, the unbalance correction device 81 of the present embodiment performing the damping controls for the respective pawl structures 10 can achieve the effect of simplifying the device configuration, in addition to the effect obtained in case of the first embodiment.

More specifically, the damping controls for the respective pawl structures 10 in the present embodiment are performed, only by the electric controls for the respective cylinder coils 87, with the supplies/discharges of the magnetic fluid to the respective magnetic fluid cylinder mechanisms 83 stopped. Consequently, in the damping controls for the respective pawl structures 10, the valve mechanisms such as the changeover valves, the flow control valves, so as to switch the supplies/discharges of the magnetic fluid to the magnetic fluid cylinder mechanisms 83 and control the flow rate thereof, are not needed. Accordingly, the effect of simplifying the device configuration can be achieved.

Incidentally, the unbalance correction device 81 of the present embodiment comprises the cylinder coils 87 wound around the cylinder cases 31, as the magnetic field applying means provided with the respective magnetic fluid cylinder mechanisms 83, but the magnetic field applying means are not limited to them. The means, which are provided with the respective magnetic fluid cylinder mechanisms 83 and apply the magnetic field to the magnetic fluid 84 into the cylinder cases 31, may be utilized, as the magnetic field applying means.

As the magnetic field applying means, for example, the construction that the cylinder coils are incorporated into the cylinder cases 31, the construction that conduit lines, which are continuously connected to at least any of the first cylinder chamber 31*a* and the second cylinder chamber 31*b* in the cylinder cases 31 and which flow the magnetic fluid to them, are differently provided from the main body of the cylinder cases 31, as well as the cylinder coils are wound around the conduit lines or the like may be utilized. In the present embodiment, the directions of the magnetic field applied to the magnetic fluid 84 into the cylinder cases 31 by the cylinder coils 87 are the axial ones of the cylinder cases 31 (the lateral directions in FIG. 13), but the directions of the magnetic field applied to the magnetic fluid 84 are not especially limited.

Industrial Applicability

The present invention is applicable in the unbalance correction device of the high-speed rotary apparatus used for correcting the unbalance of the rotating portion thereof, with respect to the high-speed rotary apparatus having the rotating portion rotating at relatively high speed, such as the turbocharger equipped with, for example, the automobile engine.

The invention claimed is:

1. A device for correcting an unbalance of a high-speed rotary apparatus, comprising a jig for supporting a work having a rotating portion and including means for detecting vibration, wherein when fixing the work to the jig where the rotating portion being rotatable, the rotating portion rotated at a given rotation number and performing an unbalance correction of the rotating portion, based on a detected value by the detecting means, the device comprising:
    a plurality of clamping members for clamping and fixing the work on the jig, with being biased in given directions where the work is fixed on the jig in the engaged condition where they are engaged with the work supported by the jig;
    a plurality of means for moving the clamping members in moving directions including the given directions and for biasing the clamping members on the engaged condition in the given directions, provided with respect to the each clamping members;
    a plurality of means for adjusting moving amounts of the clamping members in the moving directions by the moving and biasing means and biasing forces for the clamping members in the given directions, provided with respect to the each moving and biasing means;
    a plurality of means for detecting positions of the clamping members in the moving direction on the engaged condition, provided with respect to the each clamping members; and
    a plurality of means for controlling each of the adjusting means, such that shifting amounts of the positions in the moving direction of the clamping members, from the predetermined reference positions, on the engaged condition detected by the position detecting means, based on detected signals from the each position detecting means, become smaller than given acceptable values preliminarily determined for the shifting amounts.

2. The device according to claim 1, further comprising:
    means for detecting displacements of the vibrations in the moving directions of the clamping members clamping the work on the jig with respect to the device body integrally constructed including the jig with the rotation of the rotating portion, provided with respect to the each clamping members;
    means for switching moving and biasing directions in the moving directions of the clamping members by means of the moving and biasing means, provided with respect to the each moving and biasing means;
    means for controlling the biasing forces biasing the clamping members by means of the moving and biasing means in the moving and biasing directions of the clamping members defined by the switching means, provided with respect to the each moving and biasing means;

means for calculating excitation forces acting on the clamping members in the moving directions with the rotation of the rotating portion, based on the displacements of the clamping members detected by the displacement detecting means, as well as total mass of the clamping members, total damping of the clamping members in the moving directions and total rigidity of the clamping members in the moving directions;

means for calculating damping forces acting on the clamping members in an opposite directions and the same sizes to the excitation forces calculated by the excitation force calculating means; and means for controlling the switching means and biasing force controlling means, such that the damping forces calculated by the damping force calculating means act on the clamping members.

3. The device according to claim 1, wherein the moving and biasing means is constituted as a fluid pressure cylinder mechanism using magnetic fluid as the working fluid, the device further comprising:

means for detecting displacements of the vibrations in the moving directions of the clamping members clamping the work on the jig with respect to the device body integrally constructed including the jig with the rotation of the rotating portion, provided with respect to the each clamping members;

means for applying magnetic field to the magnetic fluid, provided with respect to the each moving and biasing means;

means for memorizing pre-calculated data for relationship between the total damping and an intensity of the magnetic field applied to the magnetic fluid by the magnetic field applying means;

means for calculating the total damping of the clamping members in the moving directions, counteracting the excitation forces acting on the clamping members in the moving directions with the rotation of the rotating portion, based on the displacements of the clamping members detected by the displacement detecting means, as well as the total mass of the clamping members and the total rigidity of the clamping members in the moving directions; and means for controlling the magnetic field applying means, such that the intensity of the magnetic field applied to the magnetic fluid corresponds to the total damping calculated by the damping calculating means, based on the data memorized by the data memorizing means.

4. A device for correcting an unbalance of a high-speed rotary apparatus, comprising a jig for supporting a work having a rotating portion and including means for detecting vibration, wherein when fixing the work to the jig where the rotating portion being rotatable, the rotating portion rotated at a given rotation number and performing an unbalance correction of the rotating portion, based on a detected value by the detecting means, the device comprising:

a plurality of clamping members for clamping and fixing the work on the jig, with being biased in given directions where the work is fixed on the jig in the engaged condition where they are engaged with the work supported by the jig;

a plurality of means for moving the clamping members in moving directions including the given directions and for biasing the clamping members on the engaged condition in the given directions, provided with respect to the each clamping members;

means for detecting displacements of the vibrations in the moving directions of the clamping members clamping the work on the jig with respect to the device body integrally constructed including the jig with the rotation of the rotating portion, provided with respect to the each clamping members;

means for switching moving and biasing directions in the moving directions of the clamping members by means of the moving and biasing means, provided with respect to the each moving and biasing means;

means for controlling the biasing forces biasing the clamping members by means of the moving and biasing means in the moving and biasing directions of the clamping members defined by the switching means, provided with respect to the each moving and biasing means;

means for calculating excitation forces acting on the clamping members in the moving directions with the rotation of the rotating portion, based on the displacements of the clamping members detected by the displacement detecting means, as well as total mass of the clamping members, total damping of the clamping members in the moving directions and total rigidity of the clamping members in the moving directions;

means for calculating damping forces acting on the clamping members in an opposite directions and the same sizes to the excitation forces calculated by the excitation force calculating means; and means for controlling the switching means and biasing force controlling means, such that the damping forces calculated by the damping force calculating means act on the clamping members.

5. A device for correcting an unbalance of a high-speed rotary apparatus, comprising a jig for supporting a work having a rotating portion and including means for detecting vibration, wherein when fixing the work to the jig where the rotating portion being rotatable, the rotating portion rotated at a given rotation number and performing an unbalance correction of the rotating portion, based on a detected value by the detecting means, the device comprising:

a plurality of clamping members for clamping and fixing the work on the jig, with being biased in given directions where the work is fixed on the jig in the engaged condition where they are engaged with the work supported by the jig;

a plurality of means for moving the clamping members constituted as a fluid pressure cylinder mechanism using magnetic fluid as the working fluid in moving directions including the given directions and for biasing the clamping members on the engaged condition in the given directions, provided with respect to the each clamping members;

means for detecting displacements of the vibrations in the moving directions of the clamping members clamping the work on the jig with respect to the device body integrally constructed including the jig with the rotation of the rotating portion, provided with respect to the each clamping members;

means for applying magnetic field to the magnetic fluid, provided with respect to the each moving and biasing means;

means for memorizing pre-calculated data for relationship between the total damping and an intensity of the magnetic field applied to the magnetic fluid by the magnetic field applying means;

means for calculating the total damping of the clamping members in the moving directions, counteracting the excitation forces acting on the clamping members in the moving directions with the rotation of the rotating portion, based on the displacements of the clamping members detected by the displacement detecting means, as well as the total mass of the clamping members and the total rigidity of the clamping members in the moving directions; and means for controlling the magnetic field applying means, such that the intensity of the magnetic field applied to the magnetic fluid corresponds to the total damping calculated by the damping calculating means, based on the data memorized by the data memorizing means.

* * * * *